US011816335B1

(12) United States Patent
Kumawat et al.

(10) Patent No.: US 11,816,335 B1
(45) Date of Patent: Nov. 14, 2023

(54) HIGH-THROUGHPUT REGULAR EXPRESSION PROCESSING WITH CAPTURE USING AN INTEGRATED CIRCUIT

(71) Applicant: Xilinx, Inc., San Jose, CA (US)

(72) Inventors: Sachin Kumawat, Foster City, CA (US); David K. Liddell, Longmont, CO (US); Paul R. Schumacher, Berthoud, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/660,808

(22) Filed: Apr. 26, 2022

(51) Int. Cl.
    *G06F 3/06* (2006.01)
(52) U.S. Cl.
    CPC ............ *G06F 3/061* (2013.01); *G06F 3/0655* (2013.01); *G06F 3/0673* (2013.01)
(58) Field of Classification Search
    None
    See application file for complete search history.

(56) References Cited

U.S. PATENT DOCUMENTS

| | | | |
|---|---|---|---|
| 5,787,273 A | 7/1998 | Runaldue | |
| 7,225,188 B1 | 5/2007 | Gai | |
| 7,523,434 B1 | 4/2009 | Taylor et al. | |
| 7,640,526 B1 | 12/2009 | Blodget et al. | |
| 8,402,409 B1 | 3/2013 | Janneck et al. | |
| 8,862,603 B1 | 10/2014 | Watson | |
| 9,218,862 B1 | 12/2015 | Grenier | |
| 10,289,093 B1 | 5/2019 | Lysaght et al. | |
| 10,613,875 B1 | 4/2020 | Lysaght et al. | |
| 2008/0270342 A1 | 10/2008 | Ruehle | |
| 2008/0271141 A1 | 10/2008 | Goldman | |
| 2011/0025376 A1 | 2/2011 | Gritke | |
| 2011/0302394 A1 | 12/2011 | Russell | |
| 2013/0311495 A1 | 11/2013 | Rossi | |
| 2015/0055481 A1 | 2/2015 | Guo | |

(Continued)

OTHER PUBLICATIONS

Eslami, F. et al., "Enabling Effective FPGA Debug using Overlays: Opportunities and Challenges," In 2nd Int'l. Workshop on Overlay Architectures for FPGAs (OLAF2016), Feb. 21, 2016, 6 pg.

(Continued)

*Primary Examiner* — Scott C Sun
(74) *Attorney, Agent, or Firm* — Kevin T. Cuenot

(57) ABSTRACT

A system includes a first multi-port RAM storing an instruction table. The instruction table specifies a regular expression for application to a data stream and a second multi-port RAM configured to store a capture table having capture entries decodable for tracking position information for a sequence of characters matching a capture sub-expression of the regular expression. The system includes a regular expression engine processing the data stream to determine match states by tracking active states for the regular expression and priorities for the active states by storing the active states of the regular expression in a plurality of priority FIFO memories in decreasing priority order. The system includes a capture engine operating in coordination with the regular expression engine to determine character(s) of the data stream that match the capture sub-expression based on the active state being tracked and decoding the capture entries of the capture table.

20 Claims, 33 Drawing Sheets

(56) References Cited

U.S. PATENT DOCUMENTS

2015/0067123 A1 3/2015 Goyal
2015/0161266 A1* 6/2015 Conradt .............. G06F 16/9535
707/706

OTHER PUBLICATIONS

Haenel, V., "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.
Catanzaro, B. et al., "SEJITS: Getting Productivity and Performance with Selective Embedded JIT Specialization," Programming Models for Emerging Architectures, vol. 1, No. 1, Oct. 2009, pp. 1-10.
Capalija, D. et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, 34 pg.
"Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.
"Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.
Alfke, P., "Created Uses of Block RAM," Xilinx, Inc., White Paper: Virtex and Spartan FPGA Families, WP335 (v1.0), Jun. 4, 2008, 5 pg.
Maxfield, M., "Tutorial: Linear Feedback Shift Registers (LFSRs)—Part 1," [online] EE Times © 2018 UBM Electronics, An AspenCore company, Dec. 20, 2006 [retrieved Mar. 13, 2018], retrieved from the Internet: <https://www.eetimes.com/document.asp?doc_id=1274550>, 5 pg.
"From Regular Expression to NFA to DFA ," [online] SNS Courseware, Compiler design—RE&DFA&NFA, [retrieved Oct. 20, 2017], retrieved from the Internet: <https://tajseer.files.wordpress.com/2014/06/re-nfa-dfa.pdf>, 9 pg.
"Regular Expression to NFA (Non-Deterministic Finite Automata)," [online] HackingOff.com © 2012 [retrieved Mar. 20, 2018], retrieved from the Internet: <http://hackingoff.com/compilers/regular-expression-to-nfa-dfa>, 1 pg.
"Convert simple regular expressions to deterministic finite automaton Regex => NFA => DFA," [online] CyberZHG's Toolbox [retreived Mar. 20, 2018], retrieved from the Internet: <https://cyberzhg.github.io/toolbox/nfa2dfa>, 2 pg.
"Deterministic finite automaton," [online] Wikipedia, the free encyclopedia, Nov. 29, 2017, retrieved from the Internet: <https://en.wikipedia.org/wiki/Deterministic_finite_automaton>, 6 pg.
Nakahara, H. et al., "A regular expression matching circuit based on a decomposed automaton," In International Symposium on Applied Reconfigurable Computing, Mar. 23, 2011, 12 pg.
"Non-Deterministic finite automaton," [online] Wikipedia, the free encyclopedia, Mar. 3, 2018, retrieved from the Internet: <https://en.wikipedia.org/wiki/Nondeterministic_finite_automaton>, 8 pg.
Yamagaki, N. et al., "High-speed regular expression matching engine using multi-character NFA," In IEEE International Conference on Field Programmable Logic and Applications, FPL 2008, Sep. 8, 2008, pp. 131-136.
Cox, R., "Regular expression matching can be simple and fast (but is slow in java, perl, php, python, ruby, . . . )", Apr. 27, 2022, retrieved from the Internet: https://swtch.com/~rsc/regexp/regexp1.html, 19 pg.
Thompson, K., "Programming techniques: Regular expression search algorithm," Communications of the ACM, vol. 11, No. 6, pp. 419-422, Jun. 1, 1968.
Van Lunteren, Jan, et al. "Designing a programmable wire-speed regular-expression matching accelerator." 2012 45th Annual IEEE/ACM International Symposium on Microarchitecture IEEE, 2012. pp. 461-472. (Year: 2012).
Gogte, Vaibhav, et al. "HARE: Hardware accelerator for regular expressions." 2016 49th Annual IEEE/ACM International Symposium on Microarchitecture (MICRO). IEEE, 2016. 12 total pages. (Year: 2016).
Sidhu, Reetinder, and Viktor K. Prasanna. "Fast regular expression matching using FPGAs." The 9th Annual IEEE Symposium on Field-Programmable Custom Computing Machines (FCCM'01). IEEE, 2001. 12 total pages. (Year: 2001).
Yang, Yi-Hua E., Weirong Jiang, and Viktor K. Prasanna. "Compact architecture for high-throughput regular expression matching on FPGA." Proceedings of the 4th ACM/IEEE Symposium on Architectures for Networking and Communications Systems. 2008. pp. 30-39. (Year: 2008).
Atasu, Kubilay, et al. "Hardware-accelerated regular expression matching with overlap handling on ibm poweren processor." 2013 IEEE 27th International Symposium on Parallel and Distributed Processing. IEEE, 2013. pp. 1254-1265. (Year: 2013).
Yun, Qu, Yi-Hua E. Yang, and Viktor K. Prasanna. "Multi-stream regular expression matching on FPGA." 2011 International Conference on Reconfigurable Computing and FPGAs. IEEE, 2011. pp. 86-91. (Year: 2011).
Sourdis, Ioannis, et al. "Regular expression matching in reconfigurable hardware." Journal of Signal Processing Systems 51.1 (2008): 99-121. (Year: 2008).

* cited by examiner

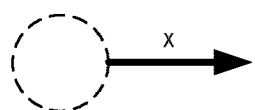
FIG. 2
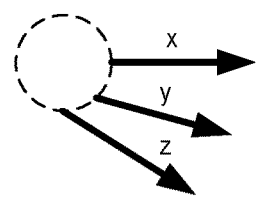
FIG. 3
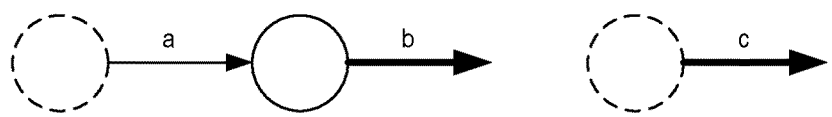
Concatenation
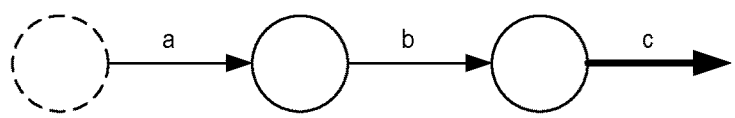
FIG. 4
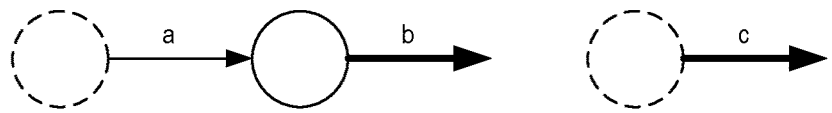
Add Placeholder
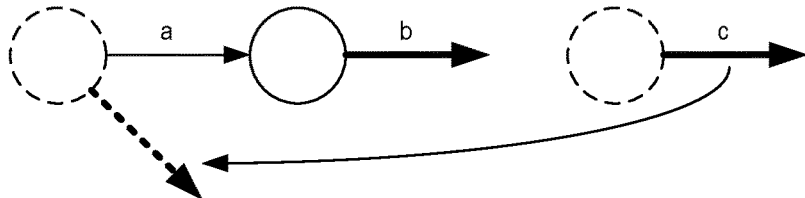
Patch (merge)
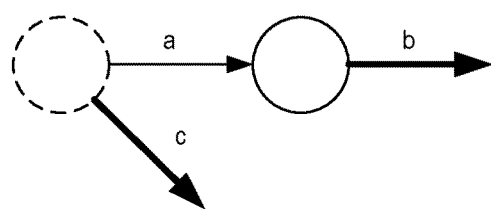
FIG. 5

122

| Address | | State Transition Instruction | |
|---|---|---|---|
| IN | CS | DIFF | NS |
| b | SI | 0 | S0 |
| $chars-b | SI | 0 | SI |
| a | S0 | 1 | S1 |
| $chars-a | S0 | 1 | SF0 |
| $term | S1 | 1 | SF1 |
| $chars-$term | S1 | 1 | SF0 |

1700

Generate a non-deterministic finite state automata (NFA) graph from a regular expression
1702

Transform the NFA graph into a hardware finite state automata (HFA) graph, wherein each node of the HFA graph, for any particular character, has at most one self-edge and at most one outbound edge, and wherein one or more nodes of the HFA graph has a self-edge and an outbound edge
1704

Generate, from the HFA graph, an instruction table including state transition instructions, wherein the state transition instructions are executable by a regular expression engine implemented in hardware to apply the regular expression to a data stream received by the hardware
1706

Receive a string by a regular expression processing system implemented in hardware within an integrated circuit, wherein the regular expression processing system is programmed with a regular expression and to detect a pattern defined by the regular expression within the string
1802

Detect an error condition occurring in the regular expression processing system during processing of the string
1804

Notify a data processing system communicatively linked to the integrated circuit that the error condition occurred during processing of the string
1806

In response to the notifying, invoke, by the data processing system, a software-based regular expression processor to process the string
1808

| IN (Character) | State | Next State | DIFF | EPS |
|---|---|---|---|---|
| a | 0 | 1 | true | true |
| 0x00 | 1 | 2 | true | true |
| 0x01 | 1 | 3 | true | true |
| 0x02 | 1 | 4 | true | false |
| b | 2 | 0xFE (match) | true | false |
| c | 3 | 0xFE | true | false |
| d | 4 | 0xFE | true | false |

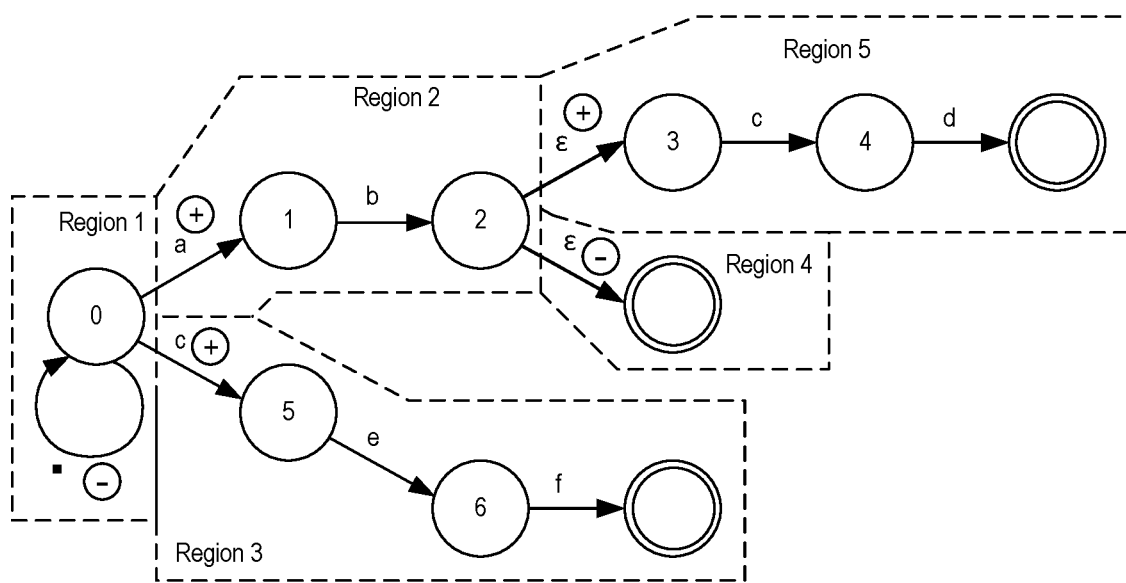
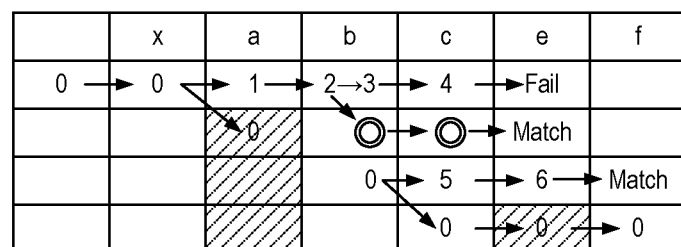
FIG. 27

4600

Generate a hardware finite state automata (HFA) graph for a regular expression, wherein the HFA graph is annotated with capture commands that, upon execution by hardware, update position information maintained for characters in a data stream that are matched to a capture sub-expression of the regular expression
4602

Generate, from the HFA graph, an instruction table including state transition instructions and a capture table including the capture commands
4604

Determine, from the data stream, one or more characters that match the capture sub-expression using a regular expression engine circuit tracking active states of the regular expression by decoding state transition instructions of the instruction table
4606

Determine position information for the one or more characters in the data stream using a capture engine circuit that decodes the capture commands from the capture table to update the position information in coordination with the active states tracked by the regular expression engine
4608

FIG. 46

HIGH-THROUGHPUT REGULAR EXPRESSION PROCESSING WITH CAPTURE USING AN INTEGRATED CIRCUIT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to a regular expression processing system for an IC.

BACKGROUND

A "regular expression" or "regex" is a text string that defines a search pattern. Typically, a processor, e.g., a central processing unit (CPU), is capable of executing an application that includes a regular expression engine. The regular expression engine, when executed, is capable of processing received input data using the regular expression to determine whether the data matches the search pattern defined by the regular expression. Regular expressions are widely used across many different industries. For example, regular expressions are often used in applications in the fields of bioinformatics, Structured Query Language (SQL) query and search, signal intelligence, and network processing (e.g., network intrusion and safety detections).

In many cases, CPUs lack the processing power and bandwidth necessary to perform regular expression processing in real time. As an example, CPUs are capable of providing data throughputs in the range of approximately 100-200 Mbps. This capability is often insufficient to provide regular expression processing that is responsive in real time.

SUMMARY

In one or more example implementations, a system includes a multi-port random-access memory (RAM) configured to store an instruction table. The instruction table specifies a regular expression for application to a data stream. The system includes a regular expression engine configured to process the data stream based on the instruction table. The regular expression engine includes a decoder circuit configured to determine validity of active states output from the multi-port RAM. The regular expression engine includes a plurality of active states memories operating concurrently. Each active states memory is configured to initiate a read from a different port of the multi-port RAM using an address formed of an active state output from the active states memory and a portion of the data stream. The regular expression engine includes switching circuitry configured to route the active states from the decoder circuit to the plurality of active states memories according, at least in part, to a load balancing technique and the validity of the active states.

In one or more example implementations, a method includes generating a non-deterministic finite state automata (NFA) graph from a regular expression. The method includes transforming the NFA graph into a hardware finite state automata (HFA) graph. Each node of the HFA graph, for any particular character, has at most one self-edge and at most one outbound edge. The method includes generating, from the HFA graph, an instruction table including state transition instructions. The state transition instructions are decoded by a regular expression engine implemented in hardware to apply the regular expression to a data stream received by the hardware.

In one or more example implementations, a method includes receiving a string by a regular expression processing system implemented in hardware within an integrated circuit. The regular expression processing system is programmed with an instruction table to detect a pattern, as defined by a regular expression, within the string. The method includes detecting an error condition occurring in the regular expression processing system during processing of the string. The method includes notifying a data processing system communicatively linked to the integrated circuit that the error condition occurred during processing of the string. The method can include, in response to the notifying, invoking, by the data processing system, a software-based regular expression processor to process the string.

In one or more example implementations, a system includes a multi-port RAM configured to store an instruction table. The instruction table specifies a regular expression for application to a data stream. The system includes a regular expression engine configured to process the data stream based on the instruction table. The regular expression engine includes a decoder circuit configured to determine validity of active states output from the multi-port RAM. The regular expression engine includes a plurality of priority first-in-first-out (FIFO) memories operating concurrently. Each priority FIFO memory is configured to initiate a read from a different port of the multi-port RAM using an address formed of an active state output from the priority FIFO memory and a portion of the data stream. Each priority FIFO memory is configured to track a plurality of active paths for the regular expression and a priority of each active path by, at least in part, storing entries corresponding to active states in each respective priority FIFO memory in decreasing priority order. The regular expression engine includes switching circuitry configured to selectively route the active states from the decoder circuit to the plurality of priority FIFO memories according to the priority order.

In one or more example implementations, a method includes generating an NFA graph from a regular expression. The method can include transforming the NFA graph into an HFA graph. Each node of the HFA graph, for any particular character, has at most one self-edge and at most one outbound edge. The method can include generating, from the HFA graph, an instruction table including state transition instructions. The instruction table includes an epsilon sub-table configured to specify epsilon edges of the HFA graph. The method includes searching a data stream for matches specified by the regular expression using a regular expression processing system implemented in hardware by, at least in part, decoding the state transition instructions of the instruction table and selectively decoding the state transition instructions of the epsilon sub-table.

In one or more example implementations, a method includes receiving a data stream by a regular expression processing system implemented in hardware within an integrated circuit. The regular expression processing system is programmed with an instruction table including state transition instructions and an epsilon sub-table configured to specify epsilon edges. The method includes searching the data stream for matches specified by the regular expression using the regular expression processing system, at least in part, by decoding the state transition instructions of the instruction table and selectively decoding the state transition instructions of the epsilon sub-table.

In one or more example implementations, a system includes a first multi-port RAM configured to store an instruction table. The instruction table specifies a regular expression for application to a data stream. The system includes a second multi-port RAM configured to store a capture table. The capture table specifies capture entries that are decodable for tracking position information for a sequence of characters of the data stream matching a capture sub-expression of the regular expression. The system includes one or more regular expression engine circuits each configured to process the data stream to determine match states by tracking active states for the regular expression and priorities for the active states by, at least in part, storing the active states of the regular expression in a plurality of priority FIFO memories in decreasing priority order. The system includes one or more capture engine circuits each configured to operate in coordination with a selected regular expression engine circuit to determine one or more characters of the data stream that match the capture sub-expression based on the active state being tracked by the regular expression engine circuit and decoding the capture entries of the capture table.

In one or more example implementations, a method includes generating an HFA graph for a regular expression. The HFA graph is annotated with capture commands that, upon execution by hardware, update position information maintained for characters in a data stream that are matched to a capture sub-expression of the regular expression. The method includes generating, from the HFA graph, an instruction table including state transition instructions and a capture table including the capture commands. A regular expression engine circuit can be configured, using the state transition table, to determine, from the data stream, one or more characters that match the capture sub-expression. A capture engine can be configured, using the capture table, to determine position information for the one or more characters in the data stream.

In one or more example implementations, a method includes storing, within a first multi-port RAM, an instruction table specifying a regular expression for application to a string of characters. The method includes storing, within a second multi-port RAM, a capture table specifying capture entries that are decodable for generating position information for a sequence of one or more characters of the string of characters matching a capture sub-expression of the regular expression. The method includes processing, using one or more regular expression engine circuits, the string to determine match states by tracking active states for the regular expression and priorities for the active states by, at least in part, storing the active states of the regular expression in a plurality of priority FIFO memories in decreasing priority order. The method includes determining, using one or more capture engine circuits each configured to operate in coordination with a selected regular expression engine circuit, position information for the one or more characters of the string that match the capture sub-expression based on the active state being tracked by the regular expression engine circuit and decoding instructions of the capture entries.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example of fragment processing corresponding to a literal character.

FIG. 3 illustrates an example of fragment processing corresponding to generic characters and/or a character class.

FIG. 4 illustrates an example of fragment processing for a concatenation operator.

FIG. 5 illustrates an example of fragment processing for an "OR" operator.

FIG. 17 illustrates an example method of operation for the regular expression compiler described in connection with FIG. 1.

FIG. 18 illustrates an example method of operation of the example computing environment described in connection with FIG. 15.

FIG. 27 illustrates certain operative features relating to path priority processing as performed by a regular expression processing system.

FIG. 46 is an example method of implementing a regular expression processing system capable of performing capture.

DETAILED DESCRIPTION

Figure 1:
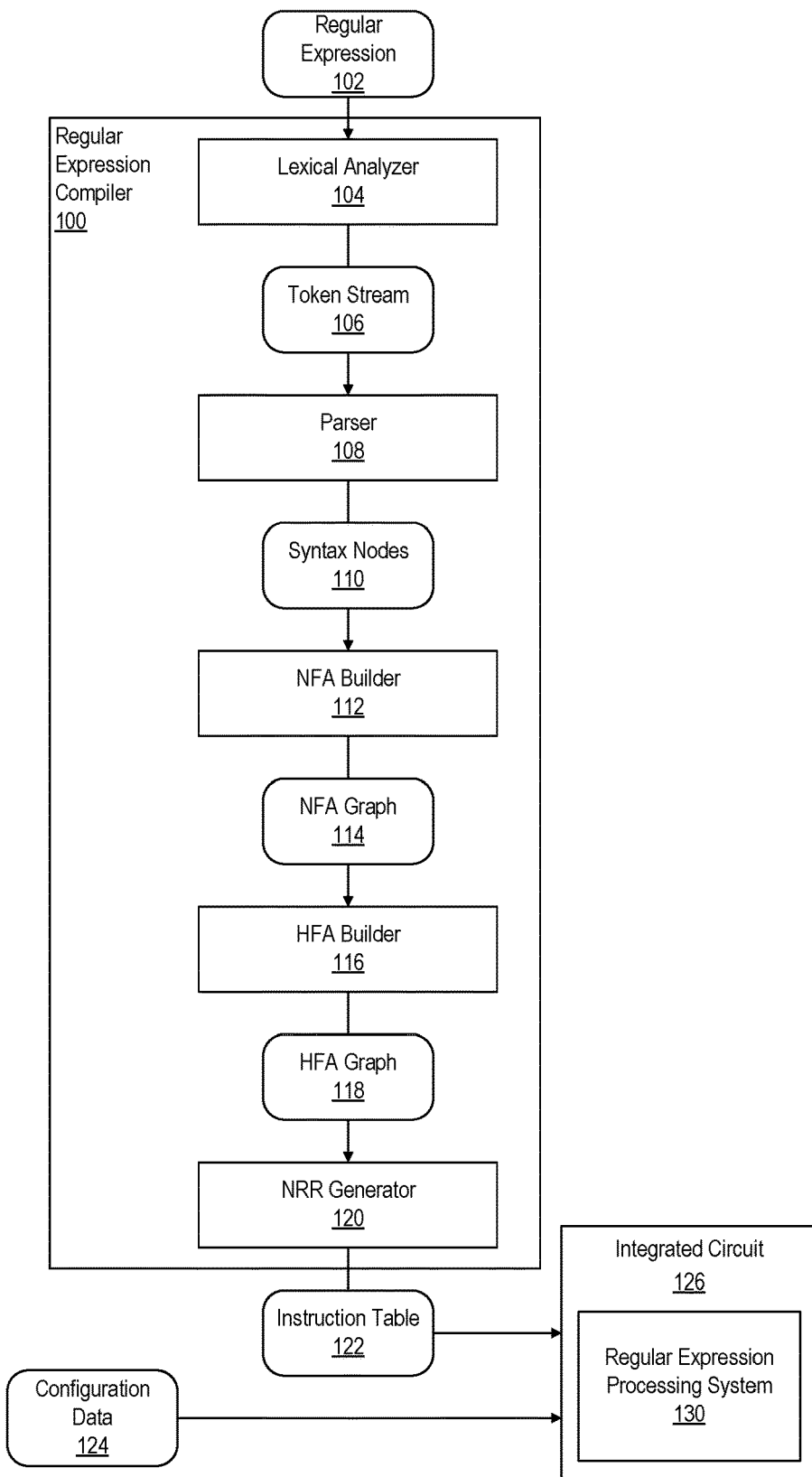
FIG. 1 illustrates an example compilation flow performed by a regular expression compiler.

This disclosure relates to integrated circuits (ICs) and, more particularly, to a regular expression, or "regex", processing system for an IC. In accordance with the inventive arrangements described within this disclosure, a circuit-based regular expression processing system is described. The regular expression processing system is capable of providing improved performance compared to other regular expression processing solutions that rely on central processing units (CPUs) executing program code. Further, the example implementations described herein leverage improved compiler functionality to support a larger number of regular expressions than are supported by existing regular expression processing circuits.

In one or more examples, the regular expression processing system provides an improved data path that achieves greater throughput for determining matches in a data stream for a given regular expression compared to other regular expression processing circuits. In one or more examples, the complexity of a dynamic scheduler is avoided. That is, a dynamic scheduler is not required to dispatch work in parallel. The example implementations described herein utilize pipelining to consume multiple streams per processing element (e.g., engine), thereby improving timing and throughput of the regular expression processing system.

In one aspect, the regular expression processing system is implemented as a type of non-deterministic finite automata (NFA) machine. An NFA machine can be mapped one-to-one with a unique finite automaton. An NFA machine, unlike other technologies that use backtracking, matches input strings in a beginning to ending fashion. Once an NFA machine is built from a regular expression, any new character of an input string transitions the NFA machine from a current set of active states to a next set of active states. When the NFA machine encounters, or hits, one of the final states, the NFA machine indicates that the regular expression is matched.

In accordance with the inventive arrangements described herein, the regular expression processing system utilizes a table of state transition instructions to detect matches in received data for a given regular expression. The regular expression processing system is capable of processing a data stream (e.g., an input string) by transitioning through the state transition instructions of the table, which are stored in a multi-port memory. The table is specific to a particular regular expression. The multi-ported nature of the memory is leveraged to provide improved, e.g., faster, processing of the streaming input strings. The regular expression processing system is runtime configurable in that different tables of state transition instructions corresponding to different regular expressions may be loaded into the multi-port memory over time and during runtime (e.g., in real time) of the IC to begin applying such other regular expressions to received input data to detect matches in the input data.

In one or more other example implementations, the regular expression processing system is capable of tracking active paths of the regular expression while processing the data stream. Different paths may be created and stored in the regular expression engines along with priority data for the paths. This allows the regular expression processing system to implement and follow, in hardware, path preferences that are included in the regular expression language. As such, the regular expression processing system is capable of indicating the particular path taken in cases where matches are determined from a data stream for a given regular expression.

In one or more example implementations, the regular expression processing system is capable of performing matching operations as described herein and capture operations. In addition to detecting whether a particular portion of a data stream (e.g., a string) matches a specified regular expression, the regular expression processing system is capable of capturing sub-strings of the data stream that match capture sub-expressions of the regular expression. The inventive arrangements described within this disclosure provide a hardware implementation of a regular expression processing system capable of performing capture that efficiently utilizes memory and other circuit resources of the IC in which the hardware is implemented.

FIG. 1 illustrates an example compilation flow performed by a regular expression compiler 100. The regular expression compiler 100 may be implemented as computer-executable program code that may be executed by a data processing system. An example of a data processing system is described herein in connection with FIG. 15 (e.g., data processing system 1500). In the example of FIG. 1, regular expression compiler 100 includes a lexical analyzer 104, a parser 108, an NFA builder 112, a hardware deterministic finite automata (HFA) builder 116, and an NFA Rules Register (NRR) generator 120.

In the example, a regular expression 102 is provided to lexical analyzer 104. Lexical analyzer 104 operates on the regular expression 102 to generate a token stream 106, e.g., a stream of lexical tokens. Parser 108 consumes and operates on the token stream 106 to generate a plurality of syntax nodes 110. A "syntax node" is an abstraction of an element of the regular expression language. For example, in accordance with the inventive arrangements, for regular expressions, a "GenericChar" syntax node is created that represents a generic character. The generic character may be either "." or a bracket-enclosed expression such as "[a-z]". Other examples of syntax nodes include operators such as "*" and "?". A syntax node may be represented in a high-level programming language (e.g., C++) as a class object and has members specific to the type of syntax node. For example, a generic character syntax node would have a list of the characters that are included. An operator syntax node has a field indicating whether the operator is greedy or lazy.

In one example, the parser 108 is implemented as a recursive descent parser with a single production encompassing all expressions and a second production to collect character class (e.g., "[a-zA-z0-9]") tokens into a single syntax node. A recursive descent parser is a type of top-down parser that uses a parsing strategy that first looks at the highest level grammar rule and works down through the non-terminal of the grammar rules. In an example, the parser 108 uses a simple grammar rule that accepts a sequence of general regular expression tokens from the token stream 106, and a second grammar rule that accepts regular expression tokens that make up a character class, also from the token stream, to output a sequence of infix syntax nodes. The parser 108 then uses the Shunting-yard Algorithm to convert that sequence of infix syntax nodes into a Reverse Polish Notation (RPN) vector of syntax nodes (e.g., syntax nodes 110). In general, the Shunting-yard Algorithm is a method of parsing a mathematical expression specified in infix notation that is capable of producing either a postfix notation string, also known as RPN, or an abstract syntax tree (AST). In general, the lexical analyzer 104 and the parser 108 of the regular expression compiler 100 operate according to standard computer science practices.

NFA builder 112 operates on the syntax nodes 110 to build an NFA graph 114. That is, syntax nodes are the inputs to the fragment-building process performed by NFA builder 112. When the NFA builder 112 sees a GenericChar type of syntax node, for example, NFA builder 112 creates a corresponding fragment, an example of which is illustrated in FIG. 3. A "fragment" is a portion of a graph having states and edges. A fragment also has a start state and a list of the end edges.

NFA builder 112 is capable of generating an NFA graph 114 from the fragments created from the syntax nodes 110 using a modified version of a technique described in Cox, "Regular Expression Matching Can Be Simple And Fast," 2007, which is incorporated herein by reference. In general, NFA builder 112 is capable of incrementally accreting fragments together into larger fragments until all of the syntax nodes 110 have been consumed and just one fragment remains that represents the entire NFA graph 114. During fragment building, as performed by NFA builder 112, a fragment stack holds constructed fragments.

In one aspect, the NFA graph 114 that is built is one that is better suited to a hardware or a circuit-based implementation (e.g., as opposed to software executed by a processor). Rather than building each state of the NFA graph 114 to have at most one outbound edge for a character, in the instant case, the NFA builder 112 builds states to have multiple outbound edges. That is, the NFA builder 112 is capable of building states having multiple outbound edges, e.g., one outbound edge for each character. The edge is labeled with the character. Additionally, states of NFA graph 114 may include self-edges. A self-edge is an edge having a destination that is the same state as the start state. In addition, the use of empty, or epsilon, edges is minimized. Epsilon edges are typically expensive in terms of performance. The structural differences to the NFA graph 114 described herein to support a hardware implementation lead to further differences in how the NFA graph 114 is processed.

An example implementation of the process used by NFA builder 112 to generate NFA graph 114 is illustrated below as pseudo code in Example 1.

Example 1

```
For each syntaxNode in syntaxNodeVector
    switch syntaxNode.type case Literal: //patch operation
        s=new State( )
        e=new Edge(from=s, to=null, char=syntaxNode.char)
        f=new Fragment(startState=s, endEdges={e})
        fragStack.push(f)
    case GenericChar:
        s=new State( )edgeVec={ }
        foreach c in syntaxNode.chars
            edgeVec.append(new    Edge(from=s,    to=null,
                char=c))
        f=new Fragment(startState=s, endEdges=edgeVec)
        fragStack.push(f)
    case Concat: //concatenation operation
        arg2=fragStack.pop( )
        arg1=fragStack.pop( )
        patch(edges=arg1.endEdges,
            targetState=arg2.startState)
        f=new            Fragment(startState=arg1.startState,
            arg2.endEdges)
        fragStack.push(f)
    case Or: //Or operation
        arg2=fragStack.pop( )arg1=fragStack.pop( )
        if arg1.startState.hasInboundEdges( )
            arg1.split( )
        if arg2.startState.hasInboundEdges( )
            arg2.split( )
        e=arg1.addPlaceholderEdge( )
        patch(edges={e}, targetState=arg2.startState)
        arg1.endEdges+=arg2.endEdges
        fragStac.push(arg1)
    case Question: //? operation
        arg=fragStack.pop( )
        if arg.startState.hasInboundEdges( )
            arg.split( )
```

```
    arg.addPlaceholderEdge( )
    fragStack.push(arg)
case Star: //*operation
    arg=fragStack.pop( )
    f=new Fragment(startState=arg.startState, endEdges=
        { })
    arg.addPlaceholderEdge( )
    patch(edges=arg.endEdges, targetState=f.startState)
    fragStack.push(f)
case Plus: //+ operation
    arg=fragStack.pop( )
    f=new Fragment(startState=arg.startState, endEdges=
        { })
    s=arg.startState
    arg.split( )
    e=s.addPlaceholderEdge( )
    f.endEdges+=e
    patch(edges=arg.endEdges, targetState=s)
    fragStack.push(f)
```

The process illustrated in Example 1 causes NFA builder 112 to loop over the syntax nodes of the RPN vector. Each syntax node 110 is handled according to type. There are two different types which include operand syntax nodes and operator syntax nodes. Operand syntax nodes include literals (e.g., "a" in a regular expression), generic characters (e.g., "."), and character classes (e.g., "[a-z]"). Operator syntax nodes combine operands. Examples of operator syntax nodes include "*", "+", and concatenation (adjacency of two operands, as in "a[a-z]").

The process of Example 1 is capable of translating each operand into an equivalent fragment. The fragment is pushed onto the top of the fragment stack. For a given operator, the NFA builder 112 takes one or two operands (e.g., the "arguments" to the operator) from the stack, combines the operands according to the type of operator, and pushes the resulting combined fragment onto the stack. When the end of the syntax node vector has been reached, there will be only one remaining fragment on the stack. To that final NFA fragment, the NFA builder 112 concatenates a "match state" thereto to produce the complete NFA graph 114. A match state is a state with a flag (e.g., a "match flag") that is set to indicate that reaching that state amounts to matching the entire regular expression.

FIGS. 2-8 illustrate the handling of various fragments as generated by the NFA builder 112. In the figures, each circle represents a state, while each arrow appended to a circle represents an edge. Literals may be annotated on edges. For purposes of illustration start states of fragments are shown with dashed lines. Edges that are considered part of an end edge set are shown as bolded or thicker lines. Edges of an end edge set of a fragment point away from a state of the fragment and are not attached to a destination state.

FIG. 2 illustrates an example of fragment processing corresponding to a literal character. In the example of FIG. 2, for a literal character "x", the fragment produced by NFA builder 112 includes a single state having a single outbound edge labeled with the character "x". The state becomes the start state of the fragment and the edge becomes the end edge set of the fragment.

FIG. 3 illustrates an example of fragment processing corresponding to generic characters and/or a character class. In general, NFA builder 112 handles generic characters as a set of literal characters. The fragment of FIG. 3 generated by the NFA builder 112 contains one state with multiple outbound edges. More particularly, there is one outbound edge per character. Referring to the Perl Compatible Regular Expression (PCRE) Standard, the dot (".") generic character means "any possible character from \x00 through \xff and has edges for each of those possibilities. For a character class there is an outbound edge for each of the characters in the character class. For example, for the character class "[a-z]", there is an outbound edge for each character from "a" through "z". As with the literal character in the example of FIG. 2, the resulting start state of the fragment is the newly created state. The end edge set of the fragment is the set of all created outbound edges.

FIG. 4 illustrates an example of fragment processing for a concatenation operator. This example demonstrates the concatenation of a fragment representing the regular expression "ab" and a fragment representing "c". A concatenation operator takes two operands and chains the two operands together. The end edges of the first operand become connected to the start state of the second operand using a "patch" operation referred to in Example 1 and described hereinbelow. The new or resulting fragment formed by NFA builder 112 has a start state which is the start state of the first operand and has an end edge set that is the end edge set of the second operand. The edge with literal "b" is no longer considered part of the end edge set of the resulting fragment.

FIG. 5 illustrates an example of fragment processing for an "OR" operator. This example demonstrates the "OR" operator applied to a fragment representing the regular expression "ab" and a fragment representing "c". An "OR" operator combines two operands in such a way that the start state of the resulting fragment combines edges from both operands.

The NFA builder 112 further adds a "placeholder edge," which is illustrated with a dashed line, to the start state of the first operand. A placeholder edge is a meta-edge which does not represent a character. The placeholder edge serves to hold a place for a later "merge" operation. The "merge" operation is described as part of the patch operation described below. Next the NFA builder 112 patches the placeholder to the second operand. As illustrated, the literal "c" is added or patched to the placeholder. Because the edge being patched is a placeholder, the patch process understands that a merge operation is to be performed instead of a normal patch operation. During a merge operation, all of the outbound edges of the state to merge (in this example the "c" edge) are copied to the placeholder edge's state. Once merged, the placeholder edge is deleted. The result is that the start state of the first operand now contains the original edges (e.g., "a") plus the edges of the start state of the second operand (e.g., "c").

In addition to the operation described for this example, the NFA builder 112 is capable of checking the start state of each operand to determine whether the start states have any inbound edges. If so, the state is "split" according to a "split" operation described hereinbelow in greater detail. The NFA builder 112 performs splits to prevent false paths when merging edges from the start states of the two operands into one state.

Figure 6:
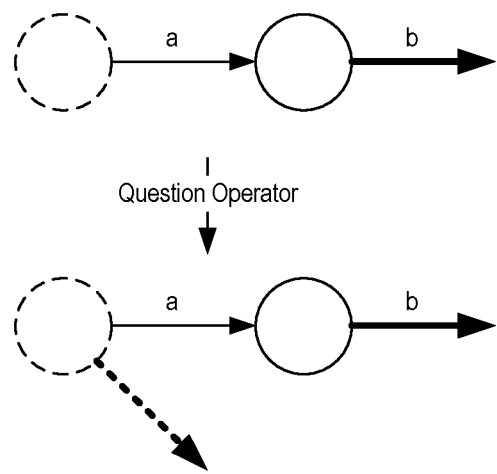
FIG. 6 illustrates an example of fragment processing for a question (?) operator.

FIG. 6 illustrates an example of fragment processing for a question (?) operator. This example demonstrates the question operator applied to a fragment representing the regular expression "ab", resulting in a fragment representing "(?:ab)?". Here, the "(?:)" operator simply groups "ab" into a single expression. The question operator indicates that there should be a choice of paths that include the original path(s) through the operand fragment or a "bypass" path around the whole fragment. For example, the regular expression "c?d" means either match "c" followed by "d" or just bypass "c" and match only "d". That is, the regular expression matches input strings "cd" and "d". In the example of FIG. 6, the start state does not have an inbound edge. Next the NFA builder 112 adds a placeholder edge to the start state. The resulting fragment has the same start state and end edge set as the operand.

Figure 7:
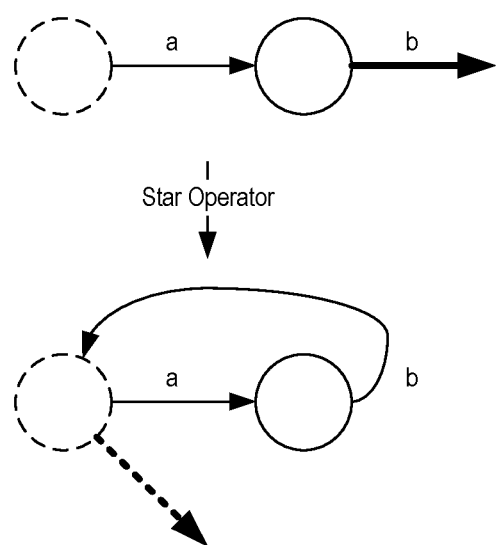
FIG. 7 illustrates an example of fragment processing for a star (*) operator.

FIG. 7 illustrates an example of fragment processing for a star (*) operator. This example demonstrates the star operator applied to a fragment representing the regular expression "ab". The star operator repeats its argument 0 or more times. To produce this behavior, the NFA builder adds a placeholder edge to the start state as an escape from the loop. The end edge(s) of the fragment are patched back to the start state to form the loop.

Figure 8A:
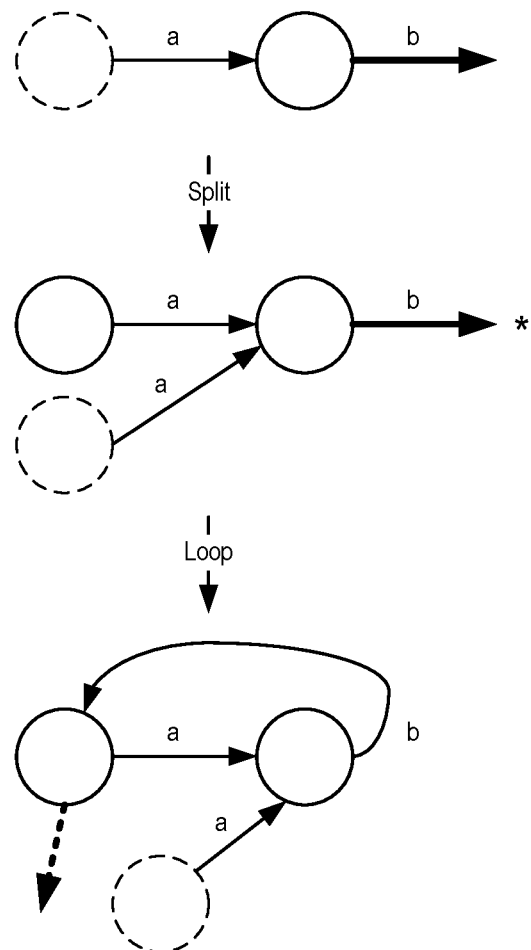
FIG. 8A illustrates an example of fragment processing for a plus (+) operator.

FIG. 8A illustrates an example of fragment processing for a plus (+) operator. This example demonstrates the plus operator applied to a fragment representing the regular expression "ab". The plus operator repeats its argument 1 or more times. For purposes of illustration, consider a fragment represented symbolically as "X". The NFA builder 112 generates the fragment by taking the operand fragment and producing the equivalent of "XX*". The NFA builder 112 is capable of first performing a split of the start state. This operation effectively duplicates the start state. One copy of the state will serve as the fragment start state and implement "X", while the other copy of the start state will implement the "X*". The transformation described for the star operator is performed on the second copy, leaving it with a placeholder edge and a loop edge.

Referring to the examples of FIGS. 5, 6, 7, and 8A-8E the placeholder edges are included in the edge set and, as such are shown bolded.

An example implementation of a patch operation used by NFA builder 112 to generate NFA graph 114 is illustrated below as pseudo code in Example 2. The patch operation is used by NFA builder 112 to combine two fragments into one fragment. In general, the patch operation combines pairs of fragments according to a two-pass processing technique wherein non-placeholder edges (e.g., regular edges) are processed during a first pass through the plurality of fragments and placeholder edges are processed during a second pass through the plurality of fragments.

Example 2

```
patch(edges, targetState)
  for each e in edges
    if !e.isPlaceholder( )//non-placeholder edge processing
      e.to =targetState
  for each e in edges
    if e.isPlaceholder( )//placeholder edge processing
      e.from.edges+=targetState.edges.clone( )
      edges.remove(e)
      if (targetState.isMatch)
        e.from.isMatch=true
```

The NFA builder 112, per the pseudo code of Example 2, makes two passes through the list of edges. The first pass processes "normal" or "non-placeholder" edges. The second pass processes placeholder edges. To patch a normal edge, NFA builder 112 sets the destination state of the edge to the given target state. To patch a placeholder edge, the NFA builder 112 copies the edges emanating from the target state into the source state of the edge. This operation effectively merges the target state into the source state of the edge. The NFA builder 112 may then remove the placeholder since the purpose of the placeholder edge has been achieved. As part of the processing performed, if a target state is a match state, the source state of the edge also becomes a match state.

An example implementation of a split operation used by NFA builder 112 to generate NFA graph 114 is illustrated below as pseudo code in Example 3.

Example 3

```
Fragment::split( )
  s=new State( )
  s.edges+=this.startState.edges.clone( )
  this.startState=s
```

The NFA builder 112, per the pseudo code of Example 3, performs the split operation by creating a copy of the start state of the fragment as a new state. The NFA builder 112 adds copies of the outbound edges and self-edges of the original start state to the newly created state. When an edge is copied, the destination end of the copy is set to the same state as the original edge, and the source end of the copy is set to the new state. As a result, any self-edges of the original start state are copied as outbound edges from the newly created state to the original start state. Additionally, when an edge is copied, if the original edge was in the fragment's end edge set, the copy is added to the fragment's end edge set. The split operation prevents false paths in the presence of loop edges such as in the example illustrated in FIG. 8B below.

Figure 8B:
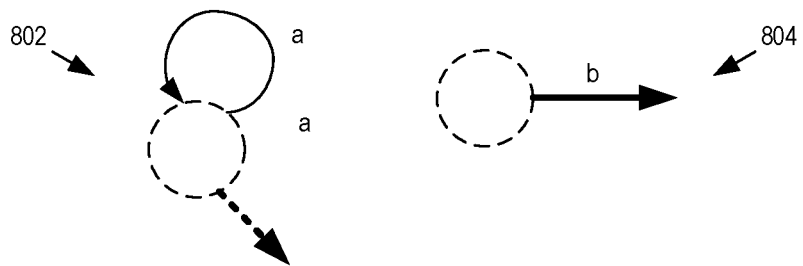
FIGS. 8B, 8C, 8D, and 8E, taken collectively, illustrate an example of a split operation performed in the context of an OR operation.

FIGS. 8B, 8C, 8D, and 8E, taken collectively, illustrate an example of a split operation as performed in the context of an OR operation. For purposes of illustration, FIGS. 8B-8E illustrate processing of the regular expression "a*|b". In the example of FIG. 8B, the fragment 802 represents "a*". The fragment 804 represents "b". Fragment 802 has a self-edge that is determined to be an inbound edge by NFA builder 112. NFA builder 112, in response to determining that either fragment 802 or fragment 804 has an inbound edge to a start state, splits that state. As shown, fragment 802 has an inbound edge which causes NFA builder 112 to initiate a split operation.

Figure 8C:
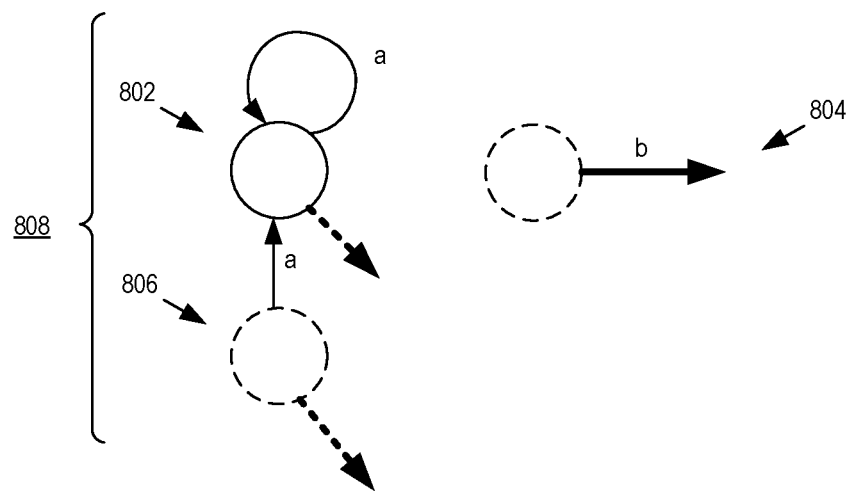

The example of FIG. 8C illustrates the result of NFA builder 112 performing a split operation. In the example, NFA builder 112 creates a copy 806 of fragment 802. The start state of copy 806 becomes the start state of the resulting fragment 808 formed of fragments 802 and 806. NFA builder 112, in copying or cloning a state, clones all outbound edges. If an original edge is a fragment end, the cloned end is also a fragment end. In the example of FIG. 8C, the NFA builder 112 does not create a self-edge for the copy 806. Rather, the NFA builder 112 sets or creates the edge "a" of the copy 806 to have a destination end that is set to what was the start state of fragment 802 and a source end of the edge "a" of the copy 806 set to the start state of the copy 806, in accordance with the edge-copying rules discussed above in connection with Example 3. The split operation distinguishes between visiting a node for the first time and revisiting the node: copy 806 provides the behavior for visiting the first time, while state 802 provides the behavior for revisiting. Further, by NFA builder 112 using the split operation, use of epsilon states may be avoided. Epsilon states can result in less efficient hardware implementations.

Figure 8D:
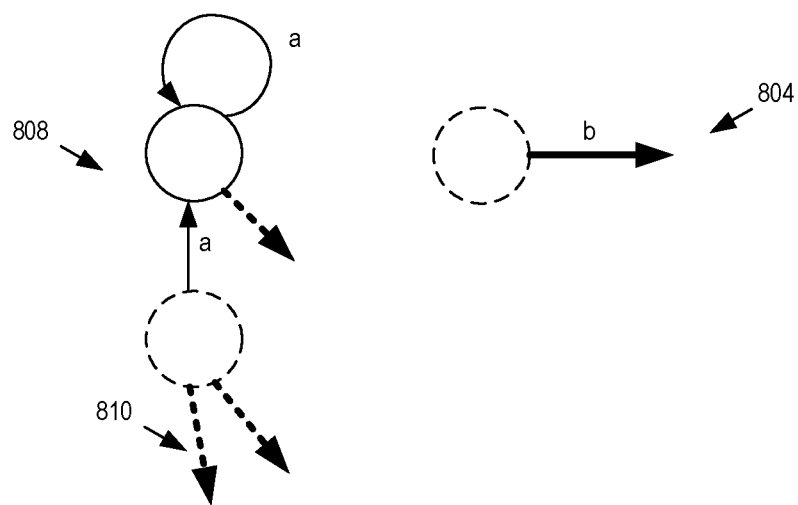

In the example of FIG. 8D, NFA builder 112 continues the OR operation as previously described. FIG. 8D illustrates that a new placeholder edge 810 is added as a fragment edge to the start state of fragment 808. As noted, placeholder edge 810 does not represent a character.

Figure 8E:
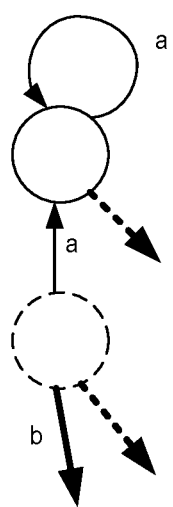

In the example of FIG. 8E, the merge operation is illustrated where fragment 804 is merged with fragment 808. As shown, the character "b" is added or patched to the placeholder edge. Because the edge being patched is a placeholder, the patch process understands that a merge operation is to be performed instead of a normal patch operation. During a merge operation, all of the outbound edges of the state to merge (in this example the "b" edge) are copied to the placeholder edge's state. In the example of FIG. 8E, edges from the start state of fragment 804 are cloned at the position of the placeholder edge 810. Once merged, the placeholder edge 810 is deleted. The result is that the start state now contains the original edges (e.g., "a") plus the edges of the start state of the second operand (e.g., the end edge "b").

Referring again to the example of FIG. 1, the HFA builder 116 is capable of operating on the NFA graph 114 to generate an HFA graph 118. The HFA builder 116 effectively transforms the NFA graph 114 into an HFA graph 118, which is a format that complies with certain constraints to be observed to implement the regular expression processing system 130 in hardware. The HFA graph 118 facilitates generation of a compact instruction table 122, thereby conserving memory resources in hardware, while also supporting parallelism. An NFA graph may be in multiple states at one time. This aspect of an NFA graph may require too much in terms of hardware resources to express all possible states that may exist at the same time. The constraints observed in generating the HFA graph 118 provides for parallelism while imposing limitations on the number of possible concurrent states that may exist.

Figures 9, 10:
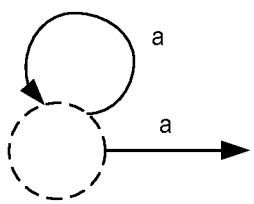
FIG. 9 illustrates an example of a node of a hardware non-deterministic finite state automata (HFA) graph.
FIG. 10 illustrates an example of an instruction table as generated by a regular expression compiler.

To illustrate the differences between the HFA graph 118 and the NFA graph 114, in the NFA graph 114, each state may have any number of outbound edges of a particular character. That is, for a given state and character such as "a", the state of the NFA graph 114 may have one or more such outbound edges. Accordingly, the state may have 1, 2, 3, or more outbound edges each labeled "a". By comparison, each state of the HFA graph 118 has at most one outbound edge for a given character and at most one self-edge for that same character. Thus, for a given state and character such as "a", the state of the HFA graph 118 may have at most one outbound edge labeled "a" and at most one self-edge labeled "a". A self-edge refers to an edge having the same state as the start state and end state. FIG. 9 illustrates an example of a node of an HFA graph having at most one outbound edge and at most one self-edge for a same character.

In one aspect, HFA builder 116 is capable of using a variation of the known "power set construction" algorithm to convert NFA graph 114 to the HFA graph 118. In the theory of computation and automata theory, the powerset construction or subset construction is a standard method for converting an NFA into a deterministic finite automaton (DFA). Whereas an NFA graph may be in multiple states at one time, a DFA graph may be only one state at a time. This aspect of DFAs, however, does not permit the parallelism that is desired from a hardware implementation. Accordingly, by modifying aspects of the power set construction algorithm, an HFA graph may be generated from the NFA graph (as opposed to generating a DFA graph).

An example of the processing performed by HFA builder 116 is illustrated below as pseudo code in Example 4. The variations to the power set construction algorithm allow HFA builder 116 to fold multiple outbound edges for a given character into a single outbound edge. Still, the variations allow HFA builder 116 to take advantage of hardware support and provide separate self-edges.

Example 4

```
buildXfa(nfaStartState)
    xfaStates = {new XfaState({nfaStartState})}
    unprocessedStates = xfaStates
    while unprocessedStates != {}
        xfa = unprocessedStates.pop_front( )
        for each edgeSet in xfa.getEdgeSets( )
            outboundStates = {}
            loopStates = {}
            foreach edge in edgeSet.edges
                if edge.to in xfa.nfaStates
                    loopStates += edge.to
                else
                    outboundStates += edge.to
            if loopStates == xfa.nfaStates
                xfa.edges += new Edge(from=xfa, to=xfa,
                    char=edgeSet.char)
            else
                outboundStates += loopStates
            if outboundStates != {}
                destXfa = get from xfaStates an XfaState x where
                    x.nfaStates == outboundStates
                if destXfa == null
                    destXfa = new XfaState(outboundStates)
                    unprocessedStates += destXfa
                xfa.edges += new Edge(from=xfa, to=destXfa,
                    char=edgeSet.char)
    return xfaStates[0]
```

For purposes of describing operation of the HFA builder 116, an "HFA state" is a unique set of one or more NFA states. The HFA builder 116, per the pseudo code of Example 4, may begin by initializing a list of HFA states to a new HFA state consisting of just the start NFA state. Newly created HFA states are assigned a "state number," which is a unique integer identifier (ID) that may start from 0 and increase sequentially. Each HFA state in the list that has not yet been processed is removed from the list and processed until there are no more HFA states left to process.

An "edge set" or "edgeSet" in Example 4 is a set of all the NFA graph edges originating from all the NFA states of an HFA state for a specific character. Each HFA state has a set of edge sets, one element of the outer set per character present among the edges of the NFA states of the HFA state. To process an unprocessed HFA state, the HFA builder 116 is capable of processing each edge set of that HFA state in turn.

The destination state (e.g., NFA state) for each edge of the edge set is considered in turn and placed into a "loop state" (self-edge) set if the state is one of the NFA states of the HFA state. Otherwise, the destination state is placed into an "outbound state" set. After all edges have been sorted into the two sets, the HFA builder 116 checks the loop state set to see whether the loop state set matches the NFA state set of the HFA state. In response to determining that the loop state matches, HFA builder 116 forms a new edge on the HFA graph 118 from the HFA state to itself. In response to determining that the loop state does not match, the "loop state" set of NFA states are added to the "outbound state" set. Next, in processing the outbound state set, the HFA builder 116 searches the set of HFA states to see if one HFA state with exactly the set of NFA states in the outbound state set exists. In response to determining that one such state does exist, the HFA builder 116 uses the pre-existing HFA state as the destination of a new edge in the HFA graph 118 that originates from the current HFA state. Otherwise, the HFA builder 116 creates a new HFA state consisting of the NFA states in the outbound state set. The HFA builder 116 uses the new HFA state as the destination of the new edge. If a new HFA state is created, that new HFA state is put on the list of HFA states to process. Once all of the HFA states have been processed, the first HFA state in the HFA state list serves as the start state of the HFA graph 118.

Referring again to FIG. 1, the NRR generator 120 operates on the HFA graph 118 and creates the instruction table 122. The instruction table 122 may be implemented as a vector having an index formed as a {character, state} pair and having element values that are a {state, diff} pair. The "cliff" field, also "DIFF" herein, is described in greater detail below.

Example 5

```
generateNrr(xfaState)
    if xfaState.visited
        return
    xfaState.visited=true
    for each edge in xfaState
        if edge.from ==edge.to
            NRR[edge.char, edge.from].diff=false
        else
            NRR[edge.char, edge.from].state=edge.to
        generateNrr(edge.to)
```

The NRR generator 120, per the pseudo code of Example 5, is passed the start state of the HFA graph 118. NRR generator 120 is capable of generating instruction table 122 from the HFA graph 118 assuming a table pre-initialized with {FailState, true} values. FailState is a reserved state number (0xFF) that indicates to the regular expression processing system 130 that the match failed. MatchState is a reserved state number (0xFE) that indicates to the regular expression processing system 130 that the match succeeded.

Because the HFA graph 118 may include one or more loops, NRR generator 120 may utilize a "visited" flag. The NRR generator 120 is capable of adding the visited flag to those HFA states that have already been visited (e.g., processed). When the NRR generator 120 is passed an HFA state with the visited flag set, the NRR generator 120 may exit since the state has already been visited. Otherwise, the NRR generator 120 is capable of marking the state as visited and processing the edges of the state.

Per the pseudo code of Example 5, for each edge, the NRR generator 120 is capable of checking the source and destination states of the edge to determine whether the edge is a self-edge (e.g., a self-edge has same source and end states). In response to determining that the edge is a self-edge, the NRR generator 120 clears the DIFF flag to indicate that the edge is a self-edge leaving the state field intact. In response to determining that the edge is not a self-edge, the NRR generator 120 sets the state field to the destination state of the edge leaving the DIFF flag intact. This two-phased approach ensures that for a state with both an outbound edge and a self-edge on the same character, the entry in the instruction table 122 being generated is set up properly over the course of two assignments.

In the example of FIG. 1, it should be appreciated that each of the elements such as the token stream 106, syntax nodes 110, NFA graph 114, HFA graph 118, instruction table 122, and/or configuration data 124 may be specified as a data structure as defined within this disclosure hereinbelow.

FIG. 10 illustrates an example implementation of the instruction table 122. The example of FIG. 10 illustrates an instruction table 122 for the regular expression "^.*ba$". The term "$chars" denotes all possible values of the input characters IN and the term "$term" denotes a special character indicating string termination that matches "$" in the regular expression. It should be appreciated that regular expression compiler 100 can process any of a variety of regular expressions of varying complexity and that the particular regular expression provided herein is for purposes of illustration only. For example, regular expression compiler 100 may process regular expressions including any one or more of the operations described in connection with FIGS. 2-8.

For purposes of discussion and with reference to FIG. 10, the next input character to be processed in a stream of input data is denoted as "IN" (e.g., the first column moving left to right). The current state is denoted as "CS" (e.g., second column), while the next state is denoted as "NS" (fourth column). A set of states that are active for a given moment are called active states and are denoted as "AS." In addition, the flag called "DIFF" (e.g., third column) is defined that indicates, by virtue of being set to 0, whether an edge is a self-edge and whether a given CS should remain in the set of AS after a current transition is completed.

Within instruction table 122, each partial row formed of the data from columns DIFF and NS corresponds to a state transition instruction. The portion of each row formed by the IN column and the CS column specifies an address at which each respective state transition instruction is stored in a memory. For example, referring to the first row, the state transition instruction {0, S0} is stored at address {b, SI} within a memory. FIG. 10 is provided for purposes of illustration. In an actual implementation, the various rows (e.g., the second row) would be expanded with additional entries corresponding to all the possible characters that can be received for that row.

The compute flow performed by regular expression processing system 130 using an instruction table 122 may start when regular expression processing system 130 receives a new IN. Initially the set of active states consists of only the starting state which is "state initial", which may be denoted as SI. The SI becomes the current state CS for the first transition. The pair {IN, CS} is used as an input address to the instruction table 122 to lookup the data that is output from instruction table 122, e.g., the particular DIFF and NS specified by the address {IN, CS}. After each lookup, the set of active states may be updated.

In processing a received data stream using the inventive arrangements described herein using a particular regular expression, a subset of active states may exist at any current moment. When input data is received, each active state in the set of active states may be transitioned to a next active state. The regular expression processing system 130 is capable of processing each state in the set of active states by performing a lookup using the instruction table 122. For each state in the set of active states, the CS is concatenated with the current input data (e.g., character) received to form an address. The address is used to lookup a state transition instruction in the instruction table 122.

From each lookup, a given output is generated. In the output, if the DIFF flag is set (e.g., is equal to 1), the current state CS used to perform the lookup is removed from the set of active states. Next, regardless of the value of the DIFF flag, the next state NS that was determined by the state transition instruction is added to the set of active states. The regular expression processing circuit performs this processing for each of the current states present in the set of active states. When all states of the set of active states have been processed for the received input data to generate a new set of active states, one transition for the received input has been performed. This processing may be performed until the input data is exhausted. Upon exhaustion or termination of the input data, a determination may be made as to whether the regular expression has been matched.

Referring again to the example of FIG. 1, the regular expression processing system 130 may be implemented in an integrated circuit (IC) 126. In one aspect, the IC 126 may be implemented as a programmable IC. A programmable IC refers to an IC that includes programmable circuitry (e.g., programmable logic). A field programmable gate array (FPGA) is an example of a programmable IC. In the case of a programmable IC implementation, the programmable IC may be initially configured to implement the regular expression processing system 130 by loading configuration data 124 into IC 126. Loading the configuration data 124 into IC 126 may implement regular expression processing system 130 in IC 126, e.g., by configuring programmable logic or other circuitry included therein. Further, instruction table 122 may be loaded into a memory of the regular expression processing system 130.

It should be appreciated that once regular expression processing system 130 is implemented in IC 126, different ones of instruction table 122 may be loaded over time, where each instruction table 122 may correspond to a different regular expression to be applied to received data streams. The different instruction tables may be loaded at runtime (e.g., in real time) without reconfiguring the programmable circuitry of the IC 126 by loading different configuration data (e.g., a different configuration bitstream) to process data according to a different regular expression.

In another aspect, the regular expression processing system 130 may be implemented as hardened circuitry. For example, the regular expression processing system 130 can be implemented in a System-on-Chip (SoC), an Application Specific Integrated Circuit (ASIC), or other IC. In another example, the regular expression processing system 130 may be implemented as a combination of programmable circuitry and hardened circuitry. In any case, regardless of whether the regular expression processing system 130 is implemented using programmable logic, hardened circuitry, or a combination thereof, different instruction tables 122 may be loaded over time (e.g., during runtime) and in real time to match different patterns from data streams as specified by different regular expressions.

Figure 11:
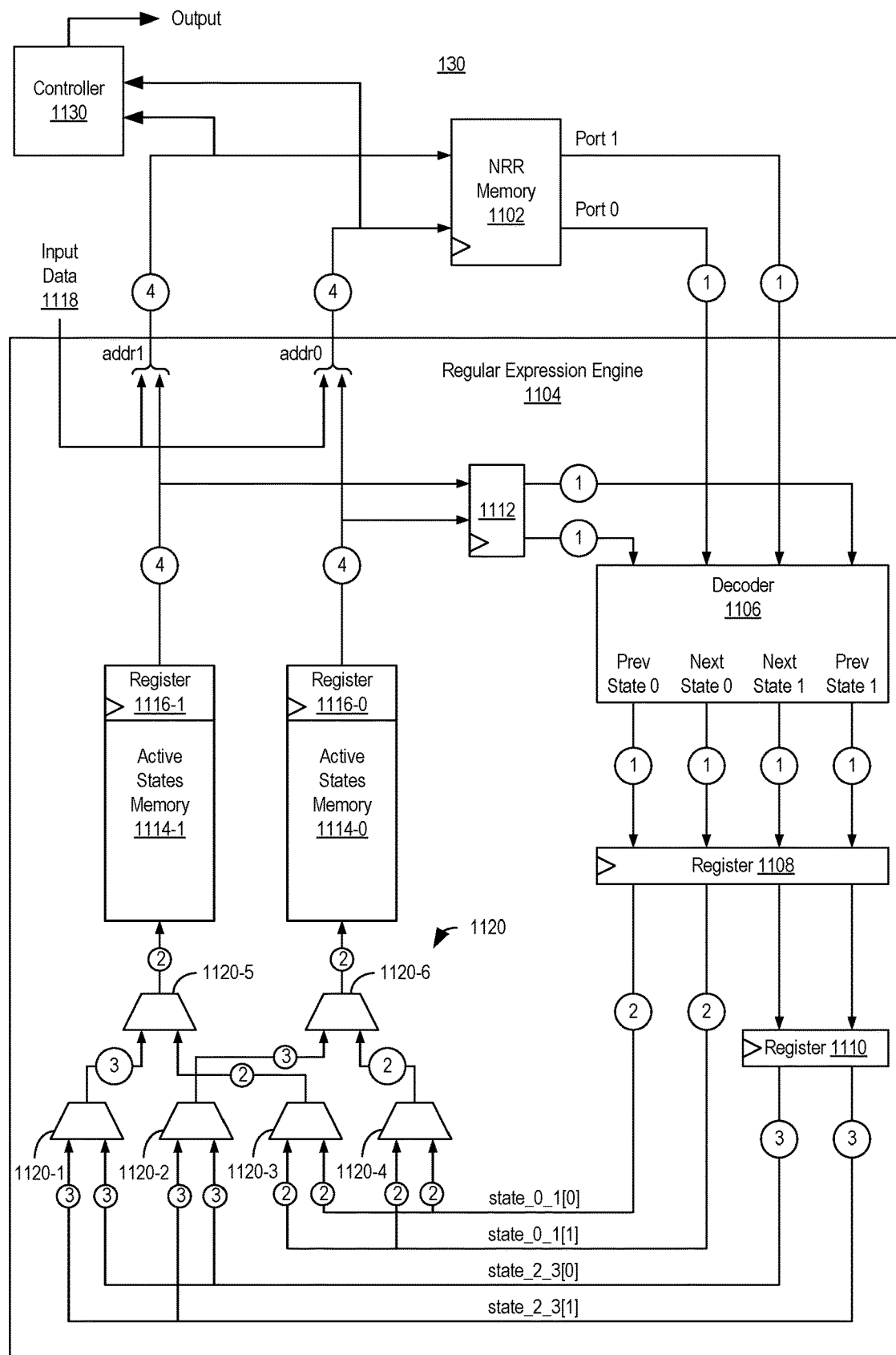
FIG. 11 illustrates an example implementation of the regular expression processing system of FIG. 1.

FIG. 11 illustrates an example implementation of regular expression processing system 130. In the example, regular expression processing system 130 includes an NRR memory 1102, a regular expression engine 1104, and a controller 1130. In one or more example implementations described hereinbelow, the regular expression processing system 130 may include a plurality of regular expression engines 1104 that are coupled to a single NRR memory 1102 as described herein in connection with FIG. 14.

In the example, NRR memory 1102 may be implemented as a multi-ported memory. The memory may be a random-access memory (RAM). For example, NRR memory 1102 may be implemented as a dual-port memory such as a block-random access memory (BRAM). The multi-port architecture of NRR memory 1102 allows two or more memory accesses to be performed concurrently, e.g., on the same clock cycle. In the case of a dual-port memory, for example, NRR memory 1102 is capable of performing up to two read operations each clock cycle. Results from the read operations are output or available on the next clock cycle. NRR memory 1102 may be loaded with instruction table 122 to apply a given regular expression to a received data stream shown as input data 1118.

In an example, input data 1118 may be ASCII encoded data. In another example, regular expression processing system 130 may be language agnostic in that any of a variety of different types of input data may be processed. For example, the input data 1118 may be UNICODE encoded data.

Regular expression engine 1104 includes a decoder circuit 1106, a register 1108, a register 1110, switching circuitry 1120, active states memories 1114, and a register 1112. As illustrated, each active states memory 1114 includes a register 1116. The architecture of regular expression engine 1104 implements a pipelined data path that alleviates timing criticality by reducing logic path lengths. The pipelining allows the circuit architecture to utilize multiple cycles to perform next NFA state computations as discussed in greater detail below.

In the example, the NRR data path is cyclic in nature in that the output of the NRR memory 1102 is used to produce address(es) for the next or subsequent lookup(s) into NRR memory 1102. The architecture of regular expression engine 1104 leverages the dual-port architecture of NRR memory 1102 by using two separate and distinct data paths.

The pipelining effectively subdivides the dual data paths into four different stages generally indicated as 1, 2, 3, and 4 in the example of FIG. 11. In stage 1, a set of up to two {character, state} pairs are looked up from instruction table 122 stored in NRR memory 1102 with the indicated state transition instructions being output to decoder circuit 1106. Up to two lookups may be performed in the same clock cycle with both results being output on the next clock cycle. The two {character, state} pairs are determined using the addr1 (e.g., address 1) and addr0 (e.g., address 0) formed by concatenating the output from activate states memories 1114 and a character from input data 1118. Operations, e.g., reads, performed by NRR memory 1102 incur a 1 clock cycle delay. Accordingly, for an address provided to NRR memory 1102 on clock cycle 1, the output is available at the output ports of NRR memory 1102 on the next clock cycle, i.e., clock cycle 2. Within the example of FIG. 11, the particular port from which a next state is read is indicated as "i". Thus, next state 0 is the state read from port 0 and next state 1 is the state read from port 1. The particular active state memory 1114 from which a previous state is read is indicated as "i". Thus, previous state 0 is the state read from active state memory 1114-0, and previous state 1 is the state read from active state memory 1114-1.

As can be seen in the example, the states output from output ports 0 and 1 of NRR memory 1102, as provided to decoder circuit 1106, include, or are used to generate, next state 0 and next state 1. Decoder circuit 1106 also receives two states output from register 1112 that include, or are used to generate, previous state 0 and previous state 1. These values are the states output from active states memories 1114 that were used to generate addr1 and addr0 and that were used to lookup next state 0 and next state 1.

In stage 1, decoder circuit 1106 decodes the output from NRR memory 1102 and from register 1112. The {state, diff} pair outputs are used to set valid bits for the 4 possible output states. For purposes of illustration, the output from output port i of NRR memory 1102 is denoted as {state_i, diff_i}.

Decoder circuit 1106 is capable of determining whether any of the states received as inputs is/are valid and, as such, are to be written back into the set of active states stored in the active states memories 1114. Decoder circuit 1106 is configured to determine validity of each of the received {state, diff} pairs according to the following rules as implemented in logic and/or circuitry.

next_state_0_valid=(state_0≠FailState) & (diff_0|(state_0≠prev_state_0))

next_state_1_valid=(state_1≠FailState) & (diff_1|(state_1≠prev_state_1))
prev_state_0_valid=~diff_0
prev_state_1_valid=~diff_1

Per the above rules, the next_state_0 is valid if (the state_0 is not equal to a failed state) AND (the diff_0 flag is 1 (e.g., set) OR the state_0 is not equal to the previous_state_0). The next_state_1 is valid if (the state_1 is not equal to a failed state) AND (the diff_1 flag is 1 (e.g., set) OR the state_1 is not equal to the previous_state_1). The prev_state_0 is valid if the diff_0 flag is 0 (e.g., not set). The prev_state_1 is valid if the diff_1 flag is 0 (e.g., not set).

In stage 2, the first half (e.g., two) of the four states output from decoder circuit 1106 may be written to active states memories 1114. For example, the next_state_0 and/or the prev_state_0 may be written to active states memories 1114 via switching circuitry 1120. In the example, switching circuitry 1120 may be implemented using switches 1120-1, 1120-2, 1120-3, 1120-4, 1120-5, and 1120-6. Switching circuitry 1120 may be implemented as multiplexers that are controlled by controller 1130. That is, controller 1130, or other logic included in regular expression engine 1104, may generate select signals (not shown) to switching circuitry 1120. Controller 1130, for example, may be coupled to decoder circuit 1106 to receive the validity information determined for the states. In response to receiving validity information from decoder circuit 1106, controller 1130 is capable of generating select signals to switches 1120-1, 1120-2, 1120-3, 1120-4, 1120-5, and 1120-6 to pass the correct state(s). Operation of switching circuitry 1120 is described in greater detail hereinbelow. As described in greater detail below, controller 1130, or other logic included in regular expression engine 1104, may be coupled to active states memories 1114 to determine status information, to read enable, and/or to write enable such memories.

In stage 3, the second half (e.g., two) of the four states output from decoder circuit 1106 may be written to active states memories 1114 via switching circuitry 1120. For example, the next_state_1 and/or the prev_state_1 may be written to active states memories 1114 via switching circuitry 1120. In the example, in terms of physical implementation in IC 126, stage 2 and stage 3 may have substantially the same path lengths.

In stage 4, each of active states memories 1114 is capable of outputting an active state. Each active states memory 1114 includes a registered output indicated by register 1116. In the example, the active state output from each respective active states memory 1114 is paired with a value/character from the input data 1118 and used to form addr1 and addr2, respectively, that may be provided to NRR memory 1102 to perform lookup operations in instruction table 122. As illustrated, the output of each active states memory 1114 is also provided to register 1112 and routed to decoder circuit 1106. The inclusion of register 1112 allows the outputs from active states memories 1114 (prev_state_0 and prev_state_1) to be provided to decoder circuit 1106 in the same clock cycle as the next_state_0 and next_state_1 as output from NRR memory 1102. Thus, decoder circuit 1106 is capable of receiving the two states used to lookup the next states as well as the next states each clock cycle.

By including two active states memories 1114-0 and 1114-1, throughput may be enhanced as each of the active states memories 1114 may write one value therein as received from switching circuitry 1120 each clock cycle. Thus, two states may be stored each clock cycle. The two active states memories 1114 may behave as a single larger first-in-first-out (FIFO) memory.

In another aspect, controller 1130 may include check match circuitry that is configured to determine whether a received character in input data 1118 is a termination character. In response to determining that the input character is a termination character, the check match circuitry is capable of determining whether either of active states memories 1114 includes a final state (e.g., SF1) indicating that the regular expression has been matched. In response to determining that the SF1 state (e.g., a final state) is contained in one or both active states memories 1114, the check match circuitry is capable of outputting an indication (e.g., a match signal) indicating that the regular expression has been matched.

In an example implementation, active states memories 1114 may operate according to a load balancing technique implemented by controller 1130 controlling operation of switching circuitry 1120 by providing control signals (e.g., select signals) thereto.

For each of the ports of the NRR memory 1102, the addresses provided (e.g., addr0 and addr1) may be generated by concatenating an input character IN of the input data 1118 with the particular state output from each respective active states memory 1114. In the example of FIG. 11, the same input character is used to generate both addr0 and add1. The same input character is used until all active states are transitioned to their next states. The DIFF flag value and the next state determined from each lookup may be output to decoder circuit 1106. In the example, since NRR memory 1102 is dual-ported, NRR memory 1102 is capable of performing both the lookups, e.g., corresponding to addr0 and addr1, concurrently. Thus, the resulting states are output concurrently on the next clock cycle to decoder circuit 1106.

Initially, e.g., at the start of processing a string specified by input data 1118, active states memory 1116-1 is empty and active states memory 1116-0 stores the start state. As regular expression engine 1104 starts consuming input data 1118 and the top values are read from each of active states memories 1114 (e.g., from registers 1116 therein) the top values (e.g., active states) are concatenated with the input stream to form addr0 and addr1. To match the one cycle latency of the NRR memory 1102 in providing the output of active states memories 1114 to decoder circuit 1106, register 1112 is added.

As processing continues, decoder circuit 1106 is capable of outputting four valid states as data is received from NRR memory 1102 and register 1112. The extra cycle delay in the data path between decoder circuit 1106 and active states memories 1114 incurred due to register 1110 over the data path including only register 1108 allows up to four states to be stored in active states memories 1114 every two clock cycles. Regular expression engine 1104 is capable of performing two lookups from NRR memory 1102 once every four clock cycles. This provides at most ¼ bytes per clock cycle.

Figure 12:
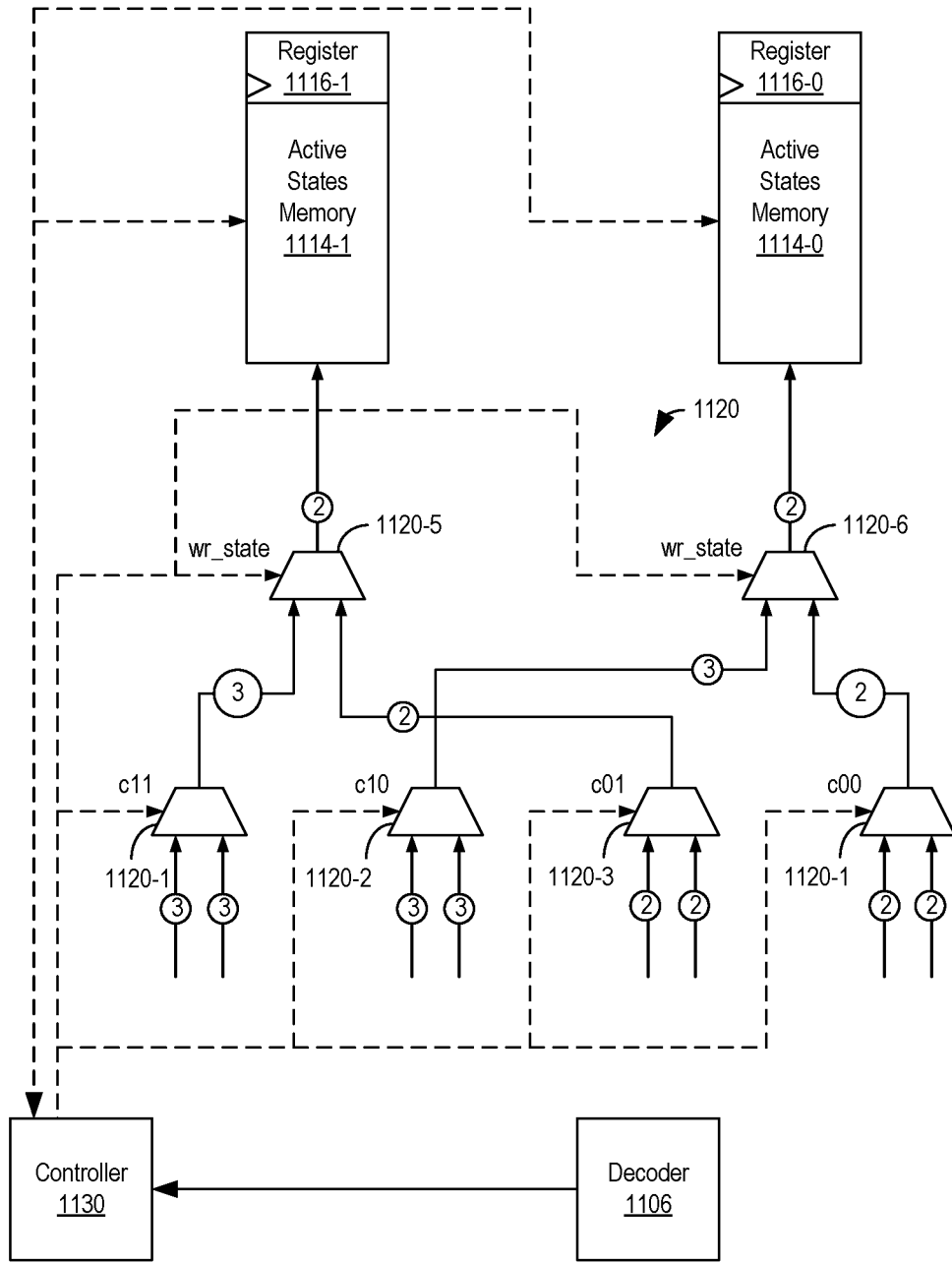
FIG. 12 illustrates a more detailed example of switching circuitry of a regular expression engine.

FIG. 12 illustrates a more detailed example of switching circuitry 1120 in which the control signals driven from controller 1130 are shown with dashed lines. In the example, the wr_state signals to switches 1120-5 and 1120-6 and the c00, c01, c10, and c11 control signals provided to switches 1120-1, 1120-2, 1120-3, and 1120-4, respectively, implement the load balancing for the active states memories 1114. Controller 1130 further is coupled to active states memories 1114-0 and 1114-1 to obtain status information from each of active states memories 1114-0 and 1114-1, for example, as to the number of entries stored in each.

In general, the load balancing dictates which active states are passed through switching circuitry 1120 and written to each of active states memories 1114-1 and 1114-0. The controller 1130 is capable of implementing the following logic to perform the load balancing.

- If both active states memories 1114-0 and 1114-1 have the same number of entries and both the next_state_i and the prev_state_i are valid, then the next_state_i is written to active states memory 1114-0 and the prev_state_i is written to the active states memory 1114-1.
- If both active states memories 1114-0 and 1114-1 have the same number of entries and only the next_state_i or only the prev_state_i is valid, then active states memory 1114-0 has a higher priority than active states memory 1114-1 and the valid state is written to active states memory 1114-0.
- If active states memory 1114-0 has one more entry than active states memory 1114-1 and next_state_i and prev_state_i are both valid, then next_state_i is written to active states memory 1114-1 and prev_state_i is written to active states memory 1114-0.
- If active states memory 1114-0 has one more entry than active states memory 1114-1 and only next_state_i or only prev_state_i is valid, then the valid state is written to active states memory 1114-1.

The load balancing technique described above ensures that the number of entries in active states memory 1114-0 will be either the same as, or at most one more than, the number of entries in active states memory 1114-1.

Figure 13:
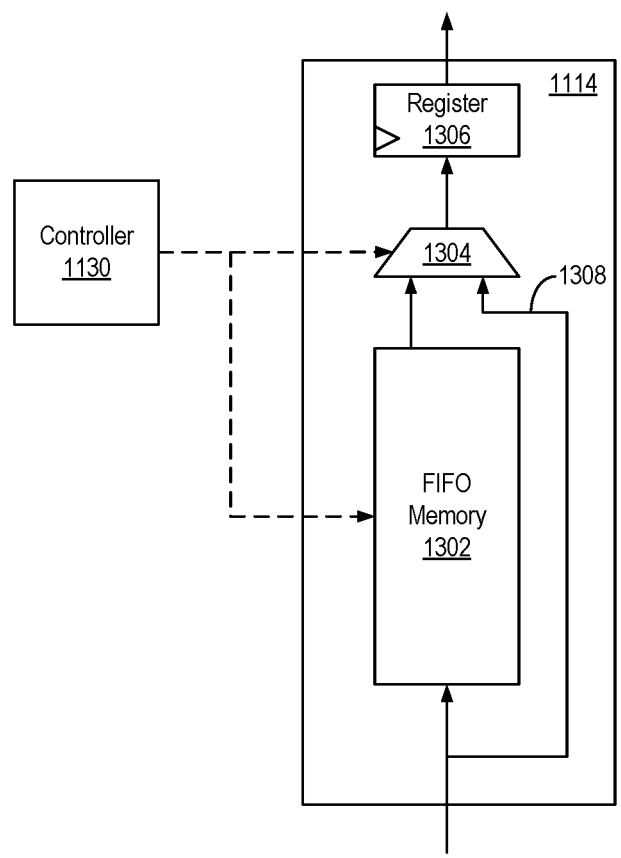
FIG. 13 illustrates additional features of the active states memories of a regular expression engine.

FIG. 13 illustrates additional features of the active states memories 1114. The example of FIG. 13 illustrates an example implementation of each active states memory 1114-0 and 1114-1. In the example of FIG. 13, each active states memory 1114 includes a FIFO memory 1302, a switch 1304 (e.g., a multiplexer), and a register 1306. Controller 1130 is capable of providing control signals to switch 1304 (e.g., a select signal) and to FIFO memory 1302. Each active states memory 1114 includes a single cycle registered output.

In one or more example implementations, each active states memory 1114 is capable of implementing a "first word fall through" feature. The first word fall through feature uses an internal bypass signal 1308 that writes the received input directly to the register 1306 in response to determining that FIFO memory 1302 is empty. For example, in response to controller 1130 reading status registers of FIFO memory 1302 and determining that FIFO memory 1302 is empty, controller 1130 causes switch 1304 to pass the value from bypass signal 1308 instead of the value read from FIFO memory 1302 to register 1306. The value passed by switch 1304 is stored in register 1306. Controller 1130, for example, may write enable register 1306. Further, controller 1130 does not enable FIFO memory 1302 to store the value thereby preventing the value stored in register 1306 from also being stored in FIFO memory 1302.

In response to controller 1130 determining that FIFO memory 1302 is not empty, controller 1130 write enables FIFO memory 1302 so that the value received at the input is stored in FIFO memory 1302. Further, controller 1130 controls switch 1304 so that the value passed to register 1306 is the value read from the top of the FIFO memory 1302 and not the value on the bypass signal 1308. Controller 1130 may write enable register 1306 to store the value from FIFO memory 1302.

In the example architecture illustrated in FIG. 13, the value written to register 1306 will not disappear from the output (e.g., from the register) until a new read signal is received, e.g., from controller 1130. FIG. 13 illustrates an example where the output of FIFO memory 1302 is not registered. Rather, a register is added following switch 1304.

Within this disclosure, certain operative features are attributed to the controller 1130. In one or more other example implementations, dedicated logic may be included in various components of the regular expression engine 1104 itself or components thereof, e.g., the active states memories 1114, that are capable of performing the monitoring functions and/or control signal generation described. For example, referring to the active states memories 1114, such logic may control operation of switch 1304.

Figure 14:
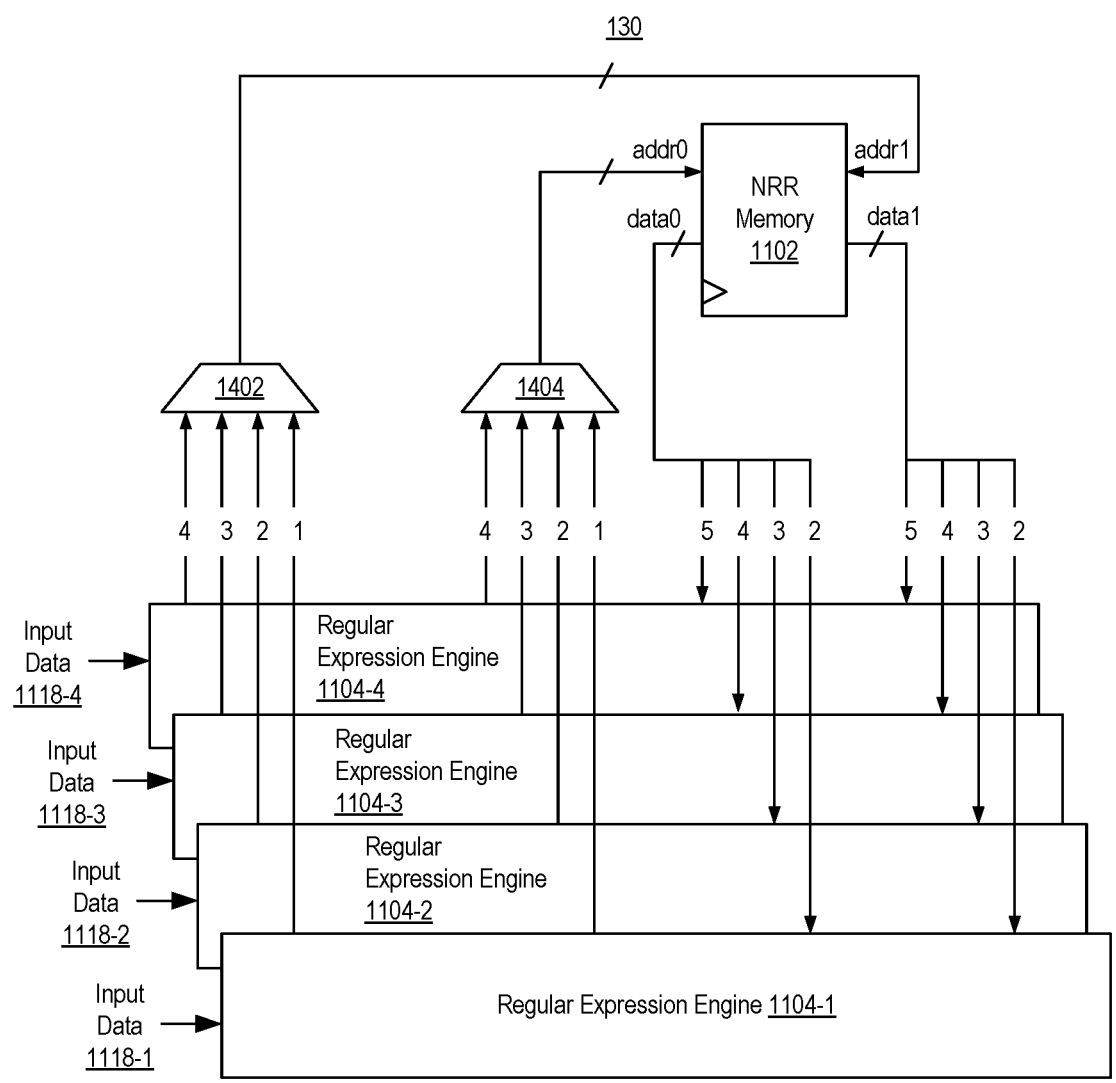
FIG. 14 illustrates another example implementation of a regular expression processing system that includes multiple regular expression engines.

FIG. 14 illustrates another example implementation of regular expression processing system 130 that includes multiple regular expression engines 1104. In the example of FIG. 14, the regular expression processing system 130 includes 4 regular expression engines 1104 each coupled to the same, e.g., a single, NRR memory 1102. In the example of FIG. 14, 4 concurrent data streams are illustrated as input data 1118-1, 1118-2, 1118-3, and 1118-4, each being provided to a respective regular expression engine 1104-1, 1104-2, 1104-3, and 1104-4. The physical active states memories are replicated for each corresponding input stream. In the example, each of the input data streams 1118-1, 1118-2, 1118-3, and 1118-4 represents a segment of a single, larger data stream that has been split into the respective segments shown. Each segment may represent a contiguous portion of the larger data stream to be processed by a particular one of the regular expression engines 1104 shown.

The example of FIG. 14 also illustrates the clock cycle timing of each regular expression engine 1104. For example, regular expression engine 1104-1 submits addr0 and addr1 on clock cycle 1 and receives results from the output ports of NRR memory 1102 (data0 and data1) on clock cycle 2. Regular expression engine 1104-2 submits addr0 and addr1 on clock cycle 2 and receives results from the output ports of NRR memory 1102 on clock cycle 3. Regular expression engine 1104-3 submits addr0 and addr1 on clock cycle 3 and receives results from the output ports of NRR memory 1102 on clock cycle 4. Regular expression engine 1104-4 submits addr0 and addr1 on clock cycle 4 and receives results from the output ports of NRR memory 1102 on clock cycle 5. As each regular expression engine 1104 is capable of processing results every four clock cycles, the process may repeat.

The outputs specifying addr0 and addr1 from each of regular expression engines 1104 are provided to multiplexers 1402 and 1404. For example, the addr0 from each of regular expression engines 1104 is provided to multiplexer 1402. The addr1 from each of regular expression engines 1104 is provided to multiplexer 1404. Based on the particular clock cycle, multiplexers 1402, 1404 pass the address from a different one of regular expression engines 1104. For example, during clock cycle 1, addr0 and addr1 from regular expression engine 1104-1 is passed. During clock cycle 2, addr0 and addr1 from regular expression engine 1104-2 is passed, and so on.

In the example implementations described herein, a single controller 1130 is illustrated that may be used to control operation of each regular expression engine 1104 and/or multiplexers 1402, 1404. In one or more other example implementations, each regular expression engine 1104 may include its own dedicated controller 1130, wherein additional logic is used to control operation of multiplexers 1402, 1404. The inventive arrangements described herein are not intended to be so limited.

It should be appreciated that the regular expression processing system 130 may include fewer or more regular expression engines 1104 than shown so long as the operation of such regular expression engines 1104 is coordinated with operation of the NRR memory 1102.

Figure 15:
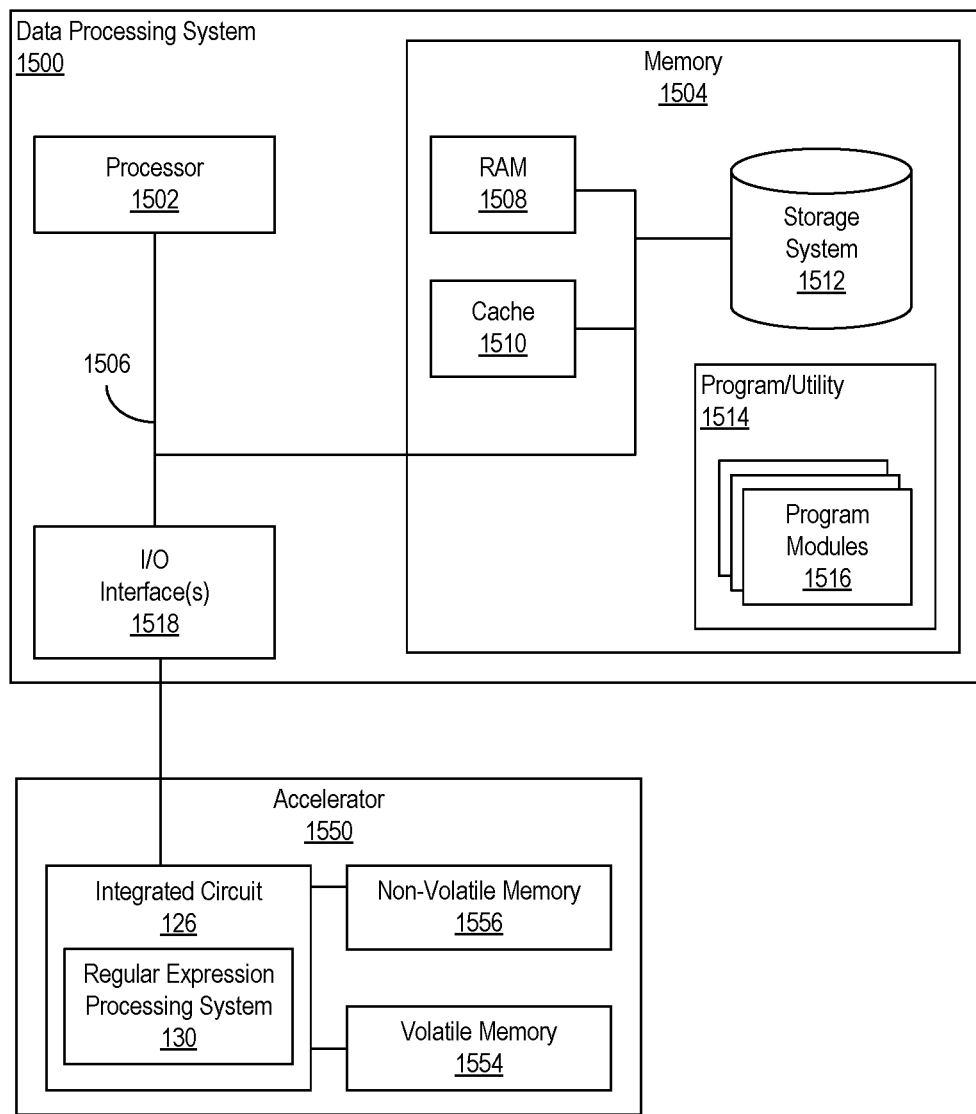
FIG. 15 illustrates an example computing environment including a data processing system and an accelerator.

FIG. 15 illustrates an example computing environment including a data processing system 1500 and an accelerator 1550. As defined herein, "data processing system" means one or more hardware systems configured to process data, each hardware system including at least one processor programmed to initiate operations and memory. In the example, data processing system 1500 is also an example of a "host computer" in that data processing system 1500 is communicatively linked to accelerator 1550.

The components of data processing system 1500 can include, but are not limited to, a processor 1502, a memory 1504, and a bus 1506 that couples various system components including memory 1504 to processor 1502. Processor 1502 may be implemented as one or more processors. In an example, processor 1502 is implemented as a central processing unit (CPU). As defined herein, the term "processor" means at least one circuit capable of carrying out instructions contained in program code. The circuit may be an integrated circuit or embedded in an integrated circuit. Processor 1502 may be implemented using a complex instruction set computer architecture (CISC), a reduced instruction set computer architecture (RISC), a vector processing architecture, or other known architecture. Example processors include, but are not limited to, processors having an x86 type of architecture (IA-32, IA-64, etc.), Power Architecture, ARM processors, and the like.

Bus 1506 represents one or more of any of a variety of communication bus structures. By way of example, and not limitation, bus 1506 may be implemented as a Peripheral Component Interconnect Express (PCIe) bus.

Data processing system 1500 typically includes a variety of computer system readable media. Such media may include computer-readable volatile and non-volatile media and computer-readable removable and non-removable media.

Memory 1504 can include computer-readable media in the form of volatile memory, such as random-access memory (RAM) 1508 and/or cache memory 1510. Data processing system 1500 also can include other removable/non-removable, volatile/non-volatile computer storage media. By way of example, storage system 1512 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1506 by one or more data media interfaces. Memory 1504 is an example of at least one computer program product.

Program/utility 1514, having a set (at least one) of program modules 1516, may be stored in memory 1504. Program/utility 1514 is executable by processor 1502. By way of example, program modules 1516 may represent an operating system, one or more application programs, other program modules, and program data. Program modules 1516, upon execution, cause data processing system 1500, e.g., processor 1502, to carry out the functions and/or methodologies of the example implementations described within this disclosure. Program/utility 1514 and any data items used, generated, and/or operated upon by data processing system 1500 are functional data structures that impart functionality when employed by data processing system 1500. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

In one or more examples, one or more program modules 1516 may implement regular expression compiler 100 of FIG. 1. In cases where data processing system 1500 executes regular expression compiler 100, an accelerator 1550 need not be included in order to perform the compilation operations described in connection with FIG. 1.

In one or more other examples, one or more of program modules 1516 may be runtime software intended to interact with accelerator 1550 and regular expression processing system 130 (e.g., one or more of such systems) as may be implemented in IC 126. One or more program modules 1516 may include software and/or drivers for communicating with peripheral devices including accelerator 1550, or the like, to offload processing jobs (e.g., provide data streams) and receive results from the pattern matching operations performed by the regular expression processing system(s) 130 implemented in accelerator 1550.

In another aspect, program modules 1516 also may include software that is capable of performing an implementation flow on a circuit design or portion thereof. In this regard, data processing system 1500 serves as an example of one or more Electronic Design Automation tools or a system that is capable of processing circuit designs through a design flow (e.g., including synthesis, placement, routing, and/or bitstream generation).

Data processing system 1500 may include one or more Input/Output (I/O) interfaces 1518 communicatively linked to bus 1506. I/O interface(s) 1518 allow data processing system 1500 to communicate with one or more external devices such as accelerator 1550 and/or communicate over one or more networks such as a local area network (LAN), a wide area network (WAN), and/or a public network (e.g., the Internet). Examples of I/O interfaces 1518 may include, but are not limited to, network cards, modems, network adapters, hardware controllers, etc. Examples of external devices also may include devices that allow a user to interact with data processing system 1500 (e.g., a display, a keyboard, and/or a pointing device) and/or other devices.

Data processing system 1500 is only one example implementation. Data processing system 1500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 15 is not intended to suggest any limitation as to the scope of use or functionality of example implementations described herein. Data processing system 1500 is an example of computer hardware that is capable of performing the various operations described within this disclosure. In this regard, data processing system 1500 may include fewer components than shown or additional components not illustrated in FIG. 15 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1500 may be operational with numerous other general-purpose or special-purpose computing system environments or configurations. Examples of computing systems, environments, and/or configurations that may be suitable for use with data processing system 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1500 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

In an example implementation, the I/O interface 1518 through which data processing system 1500 communicates with accelerator 1550 is a PCIe adapter facilitating communication by way of a PCIe communication channel. Accelerator 1550 may be implemented as a circuit board that couples to data processing system 1500. Accelerator 1550 may, for example, be inserted into a card slot, e.g., an available bus and/or PCIe slot, of data processing system 1500.

Accelerator 1550 may include IC 126 coupled to a volatile memory 1554 and a non-volatile memory 1556. IC 126 may be implemented as previously described herein and implement one or more regular expression processing systems 130. Volatile memory 1554 may be implemented as a RAM. In the example of FIG. 15, volatile memory 1554 is external to IC 126, but is still considered a "local memory" of IC 126, whereas memory 1504, being within data processing system 1500, is not considered local to IC 126. Non-volatile memory 1556 may be implemented as flash memory. Non-volatile memory 1556 is also external to IC 126 and may be considered local to IC 126.

Figure 16:
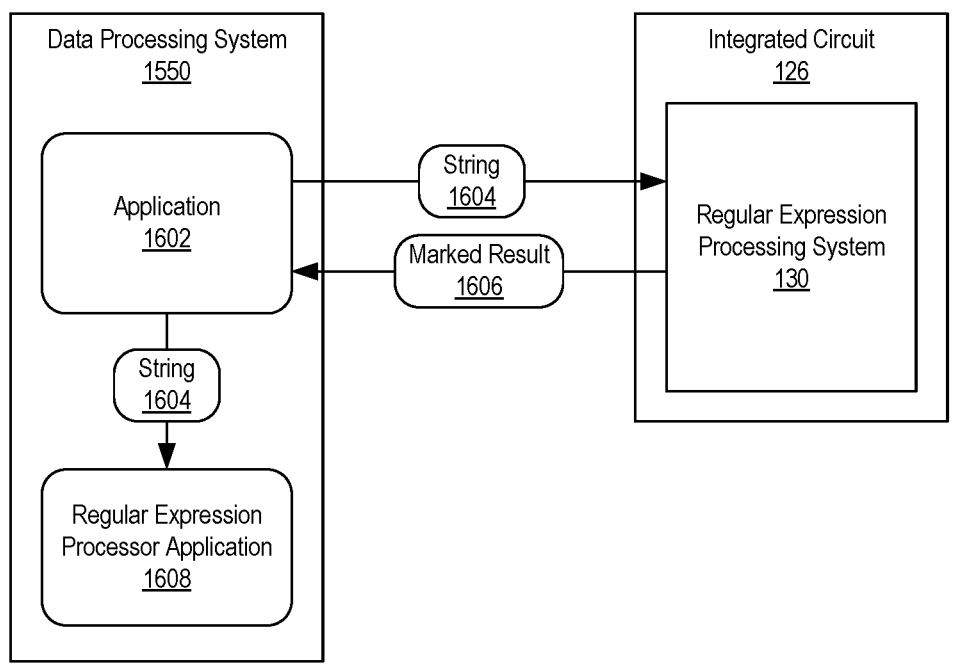
FIG. 16 illustrates an example of a software fallback feature that may be implemented using the computing environment described in connection with FIG. 15.

FIG. 16 illustrates an example of a software fallback feature that may be implemented using the computing environment described in connection with FIG. 15 or another similar computing environment. As described herein, the regular expression processing system 130 utilizes FIFO memories 1302 disposed inside of the active states memories 1114 to store active states of the NFA during operation. Each active states memory 1114 has a fixed amount of FIFO memory space available that may become full during operation. While increased sizes of FIFO memories 1302 may be implemented to avoid memory overflow conditions, such increases may consume significant resources of the IC 126. This is particularly true since each regular expression engine 1104 includes two active states memories 1114 and each regular expression processing system 130 includes a plurality of regular expression engines 1104. Moreover, a given IC may include multiple instances of the entire regular expression processing system 130.

Accordingly, in an example implementation, the size of each FIFO memory 1302 may be set to a size that is capable of storing a predetermined maximum number of states possible or desired given the processing task. In cases where a FIFO memory 1302 becomes full, the output string may be marked with a special or predetermined value (e.g., a marker or flag) indicative of an error (e.g., an overflow) condition.

Referring to the example of FIG. 16, data processing system 1500 may execute an application 1602. Application 1602 may send data, shown as string 1604, to regular expression processing system 130 for processing. In another aspect, IC 126 may receive the string 1604 from another system, e.g., via a network (e.g., Ethernet or the like) connection from a device other than data processing system 1500.

For purposes of illustration, string 1604 may be an 8 MB block of data. During the course of operating on string 1604, one or more of the FIFO memories 1302 of the active states memories 1114 of the regular expression processing system 130 may become full and experience an overflow condition. The overflow condition may be detected by controller 1130 by reading status registers of the active states memories 1114.

In response to detecting the overflow condition, controller 1130 is capable of logging the error condition by storing the predetermined indicator in the output (e.g., result of the processing of string 1604) of regular expression processing system 130 that is made available to data processing system 1500 and application 1602. For example, controller 1130 is capable of marking the output generated by regular expression processing system 130. The example of FIG. 16 illustrates a marked result 1606 being provided from regular expression processing system 130 to application 1602. Marked result 1606 is the result from processing string 1604. In response to detecting that the result is marked, application 1602 is capable of invoking regular expression processing application 1608 and providing string 1604 thereto as an input for processing. The regular expression processor application 1608, having access to the computer-based resources of data processing system 1500, is capable of processing string 1604.

Accordingly, in those cases where regular expression processing system 130 is unable to complete processing of a given string without error, data processing system 1500 may be notified and process the string. This allows the size of the FIFO memories 1302 to be tuned to reduce memory usage to conserve resources of IC 126 falling back on software-based regular expression processing. In one aspect, the FIFO memories 1302 may be implemented using lookup-tables (LUTs) implemented in IC 126. The fallback processing described facilitates a significant reduction in the number of LUTs required to implement each regular expression processing system 130. Because the software is invoked only in cases where an error occurs in the hardware, the software processing load placed on data processing system 1500 remains small in most cases.

FIG. 17 illustrates an example method 1700 of operation for the regular expression compiler 100 described in connection with FIG. 1. Method 1700 may be performed by a data processing system (e.g., "system") such as the example data processing system 1500 of FIG. 15.

In block 1702, the system is capable of generating an NFA graph from a regular expression. In block 1704, the system is capable of transforming the NFA graph into an HFA graph. Each node of the HFA graph, for any particular character, has at most one self-edge and at most one outbound edge. Further, the HFA graph has one or more nodes that have a self-edge and an outbound edge. In block 1706, the system is capable of generating, from the HFA graph, an instruction table including state transition instructions. The state transition instructions are decoded by a regular expression engine implemented in hardware to apply the regular expression to a data stream received by the hardware.

The foregoing and other implementations can each optionally include one or more of the following features, alone or in combination. Some example implementations include all the following features in combination.

In one aspect, the method can include loading the instruction table into a multi-port memory coupled to one or more of the regular expression engines, wherein each regular expression engine is configured to process the data stream through execution of the state transition instructions.

In another aspect, the generating the NFA graph includes processing the regular expression using a lexical analyzer to generate a plurality of lexical tokens, parsing the plurality of lexical tokens into a plurality of character syntax nodes (e.g., literal and generic) and a plurality of operator syntax nodes, transforming the plurality of character syntax nodes into a plurality of fragments, and joining the plurality of fragments based on the plurality of operator syntax nodes.

In another aspect, the generating the NFA graph includes combining the plurality of fragments by, for at least one selected fragment of the plurality of fragments, creating a placeholder edge for a start node, wherein the placeholder edge is unaffiliated with a character.

In another aspect, the generating the NFA graph includes combining pairs of fragments according to a two-pass processing technique wherein non-placeholder edges are processed during a first pass through the plurality of fragments and placeholder edges are processed during a second pass through the plurality of fragments.

In another aspect, the generating the NFA graph includes performing a split operation. Performing a split operation includes creating a copy state of a selected state and, for each outbound edge and each self-edge of the selected state, creating a corresponding and equivalent edge for the copy state. For each equivalent edge, a source end of the equivalent edge connects to the copy state and a destination end of the equivalent edge connects to a same state as a destination end of the corresponding edge of the selected state.

FIG. 18 illustrates an example method 1800 of operation of the example computing environment described in connection with FIG. 15. In block 1802, the regular expression processing system 130 is capable of receiving a string. The regular expression processing system 130 is implemented in hardware within IC 126. The regular expression processing system 130 may be programmed with an instruction table 122 to detect a pattern defined by a regular expression within the string. In block 1804, the regular expression processing system 130 is capable of detecting an error condition occurring in the regular expression processing system 130 during processing of the string. In block 1806, the regular expression processing system 130 is capable of notifying data processing system 1500, which is communicatively linked to the IC 126, that the error condition occurred during processing of the string. In block 1808, in response to the notifying, the data processing system 1500 is capable of invoking a software-based regular expression processor to process the string.

The foregoing and other implementations can each optionally include one or more of the following features, alone or in combination. Some example implementations include all the following features in combination.

In one aspect, the error condition includes one or more active states memories of the regular expression processing system being full during processing of the string.

In another aspect, the string is initially provided from the data processing system to the integrated circuit for processing.

In another aspect, the notifying the data processing system of the error condition includes setting a predetermined marker indicating that the error occurred for the string.

In another aspect, the method includes processing the string using the software-based regular expression processor as executed by the data processing system.

In one or more example implementations, a system includes a multi-port random-access memory (RAM) (e.g., NRR memory 1102) configured to store an instruction table 122, wherein the instruction table 122 specifies an NFA that applies a regular expression to a data stream (e.g., input data 1118). The system can include a regular expression engine 1104 configured to process the data stream based on the instruction table 122. The regular expression engine 1104 can include a decoder circuit 1106 configured to determine validity of active states output from the multi-port RAM. The regular expression engine 1104 can include a plurality of active states memories 1114 operating concurrently. Each active states memory 1114 may be configured to initiate a read from a different port of the multi-port RAM using an address formed of an active state output from the active states memory 1114 and a portion of the data stream. The regular expression engine 1104 can include switching circuitry 1120 configured to selectively route the active states to the plurality of active states memories 1114 according, at least in part, to a load balancing technique and validity of the active states.

The foregoing and other implementations can each optionally include one or more of the following features, alone or in combination. Some example implementations include all the following features in combination.

In one aspect, the multi-port RAM is a dual-port RAM.

In another aspect, the system can include a plurality of regular expression engines 1104 each configured to receive a data stream and operate in parallel.

In another aspect, the plurality of regular expression engines 1104 can include N regular expression engines 1104, wherein each of the N regular expression engines is configured to output, to the address ports of the multi-port RAM, a plurality of addresses for concurrently looking up a plurality of state transition instructions to process a plurality of active states in a single clock cycle. Each of the N regular expression engines 1104 is capable of outputting the plurality of addresses every N clock cycles.

In another aspect, the regular expression includes at least one of a concatenation regular expression operator or an alternation regular expression operator.

In another aspect, the regular expression includes at least one of a question regular expression operator, a star regular expression operator, or a plus regular expression operator.

In another aspect, the load balancing maintains a difference between a number of active states stored in a first active states memory 1114-0 of the plurality of active states memories 1114 and a number of active states stored in a second active states memory 1114-1 of the plurality of active states memories 1114 to be less than two.

In another aspect, the regular expression engine 1104 is configured to generate a flag in response to detecting an overflow condition in at least one of the plurality of active states memories 1114 while processing a string of the data stream. A host computer system 1500 in communication with the system, in response to reading the flag, is configured to initiate processing of the string using a software-based regular expression processor.

In another aspect, the regular expression engine is pipelined such that each active states memory generates the address every N clock cycles.

In another aspect, N is equal to four. As discussed, N may be equal to a value that is smaller or greater than four.

While matching an input string to a regular expression, more than one path may be taken through the regular expression to determine a match. For example, given a choice of two such paths, the rules of the regular expression language specify which path should be preferred. In accordance with the inventive arrangements described herein, a regular expression processing system is provided that is capable of tracking these multiple paths and their respective priorities. A regular expression processing system so adapted is capable of indicating the particular path taken in cases where matches are determined from a data stream for a given regular expression.

There are a variety of different regular expression constructs that utilize the notion of path priority. Examples of these constructs that require a preference of one path over another include alternation and quantifiers.

Alternation supports matching a single regular expression out of several possible regular expressions. For purposes of illustration, consider a regular expression such as "A|B|C", where A, B, and C are sub-patterns. This regular expression requires that the alternative choices be preferred in order from left to right. That is, A should be preferred over B, which should be preferred over C. In another example, consider the regular expression "abc|ab" which is semantically equivalent to "abc?". When given the input "abc", after matching the initial "ab", the regular expression engine 1104 needs to choose between matching the "c" to follow the left alternative ("abc") or consider the match done to follow the right alternative ("ab"). The path priority rule for alternation states that the left path should be preferred. Accordingly, the regular expression matches the full input string, "abc". If the regular expression is reversed, "ab|abc", then the regular expression would match the "ab" part of the input string. If, for example, the alternative choices are mutually exclusive, as is the case with the regular expression "a|b", the path priority rules are irrelevant because given a particular input, there is only one path that can be taken. That is, when given the input "a", only the "a" alternative qualifies; there is no other path.

In general, quantifiers specify how many instances of a character, group, or character class must be present in the input for a match to be found. The regular expression quantifier operators "?", "*", "+", and "{n,}", for example, require a choice between the path through the operand and the path that bypasses the operand. For example, for the regular expression "ab?" given the input "ab", after input "a" is matched, there is a choice between matching "b" or bypassing the "b?" sub-pattern and calling the match complete having matched just "a". As another example, for the regular expression "ab*" given the input "abb", after input "a" is matched, there is a choice between matching the first "b" or bypassing the "b*" sub-pattern and calling the match complete after input "a". If the path matching the "b" is taken, then there is another path choice between matching the second "b" or bypassing the "b*" sub-pattern at that point, calling the match complete after input "ab".

Quantifiers are defined to be "greedy" by default. This means that the path through the operand should be preferred over bypassing the operand. In the case of "ab?", an input of "ab" should match the full input instead of just "a". In the case of "ab*", an input of "abb" should match the full input instead of just "a" or "ab". The quantifiers can be made "lazy" by appending a "?" to the quantifier operator, such as in "ab*?". If an operator is lazy, the path that bypasses the operand should be preferred over the path through the operand. In contrast to the previous examples, the regular expression "ab??" given input "ab" should match only "a". Similarly, the regular expression "ab*?" given input "abb" should also match only "a".

The examples in the previous section represent a special case. In the foregoing, the regular expression ends with a choice either to continue accepting characters or match the full regular expression thereby terminating the processing of the input for that instance of the regular expression. Within this disclosure, this scenario is referred to as "match-or-continue".

An example of a path priority case that is not the special case would be "ab?b" for input "abb", where there would still be a choice between matching the first "b" input to the "b?" sub-pattern or bypassing that quantifier sub-pattern and matching instead with the "b" sub-pattern at the end of the regular expression. The input may match as either "abb" or "ab". This scenario, however, is not considered a match-or-continue case since after taking the decision to match or bypass "b?", unlike the prior examples, the regular expression has not finished.

In accordance with the inventive arrangements described herein, the HFA graph described herein is capable of supporting a hardware implementation that explores multiple paths through the HFA graph simultaneously. The HFA graph supports these multiple simultaneous paths only for "self-edges" and "epsilon splits". Self-edges have been described herein, where an example of a self-edge is illustrated in FIG. 9.

Figure 19:
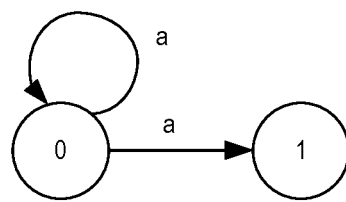
FIG. 19 illustrates another example of a self-edge as an HFA graph.

FIG. 19 illustrates another example of a self-edge as an HFA graph. In the example of FIG. 19, the state 0 has both an outbound edge that leads away from the state to another state and a "self-edge" that loops from the state back to itself. Both edges are labeled with the character "a", which means that when the regular expression engine 1104 is on state 0 and receives an input of "a", both edges must be taken, leaving the hardware in both state 0 and state 1. The example of FIG. 19 corresponds to a regular expression of "a*a". In general, regular expression engine 1104 supports states that, for a particular character, have up to one outbound edge and up to one self-edge. A state can support any number of characters with these single-character configurations.

Figure 20:
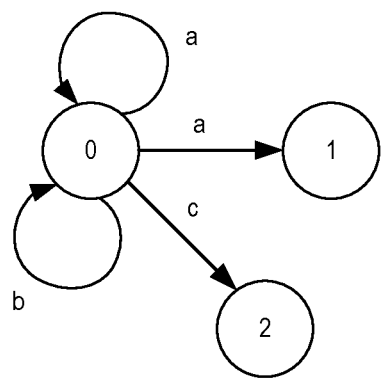
FIG. 20 illustrates another example of an HFA graph.

FIG. 20 illustrates another example of an HFA graph. In the example of FIG. 20, there is an outbound edge and a self-edge for "a", only a self-edge for "b", and only an outbound edge for "c". Regular expressions producing multiple paths via self-edges are readily created using single-character loops with the star operator. The example of FIG. 20 corresponds to a regular expression of "[ab]*[ac]".

The regular expression compiler 100 is capable of supporting states that have one or more epsilon edges and no other kind of edge. Such a state is said to be an "epsilon state" (or "eps state"). In the context of an NFA graph, when a state with epsilon edges is encountered, all epsilon edges are traversed immediately without consuming another input character. In the context of an HFA graph, if a state has "n" epsilon edges, then "n" paths must be explored leaving the hardware in "n" different states.

Figure 21:
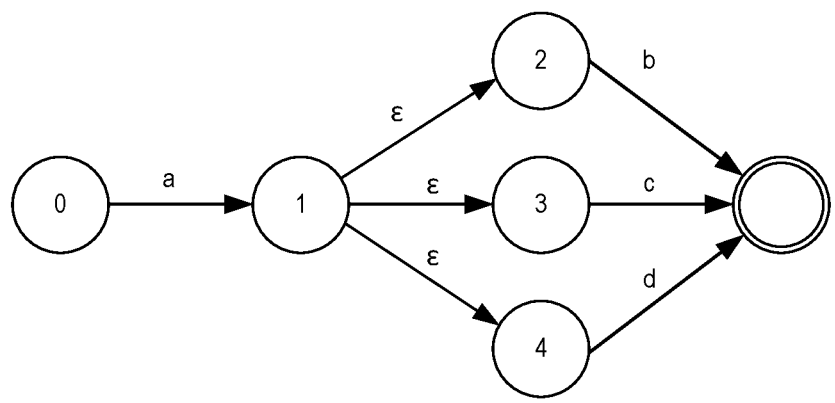
FIG. 21 illustrates an example of an epsilon split.

FIG. 21 illustrates an example of an epsilon split. In the example of FIG. 21, when input of "a" is seen, all epsilon edges at state 1 are taken, leaving the hardware in states 2, 3, and 4 simultaneously. The regular expression for the HFA graph of FIG. 21 is "a(b|c|d)".

If the automaton for regular expression "a*a" encounters the input "a", two paths are taken. As previously noted, the self-edge has the higher priority. If the regular expression were "a*?a", then the outbound edge would have the higher priority. Similarly, for regular expression "a(b|c|d)", after input "a" has been matched, three paths are taken. The top path to state 2, referring to FIG. 21, has the highest priority because that path is the leftmost alternative.

The handling and representation of path priority for various cases may be represented using an updated version of the instruction table as described in greater detail below.

Figures 22, 23:
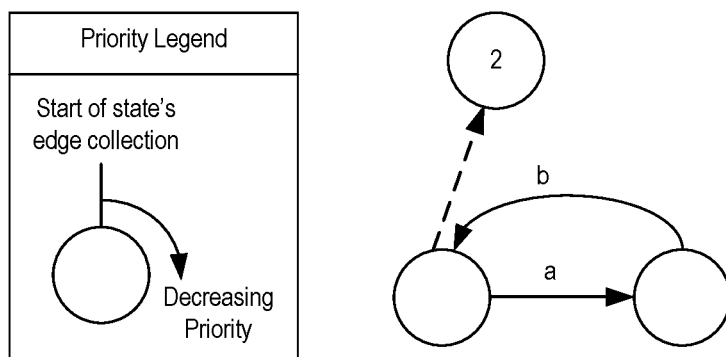
FIG. 22 illustrates another example of an instruction table capable of supporting the tracking of multiple paths and path priorities.
FIG. 23 depicts an example of an NFA graph for a regular expression that indicates path priority.

FIG. 22 illustrates another example of an instruction table 2200 that is capable of supporting the tracking of multiple paths and path priorities. In one aspect, the instruction table 2200 is updated to include epsilon support. A flag referred to as "EPS" (e.g., for epsilon) is added making the output of the instruction table 2200 adhere to the format of {state, DIFF, EPS}. That is, given a received character and state, the character and state may be used to lookup a next state, DIFF, and EPS that may be output to the decoder circuit 1106.

In using the instruction table 2200 within the NRR memory 1102 to process an input character, the regular expression engines 1104 use instruction table 2200 to determine how to move through the HFA graph. For example, if the regular expression engine 1104 is currently at state 5 and sees an "a" input character, then the element value at index {"a", 5} is fetched, resulting in, for example, {6, DIFF=true, EPS=false}, meaning that the state to which the regular expression engine 1104 should move is state 6. The "true" value for the DIFF flag indicates that the regular expression engine 1104 is moving away from state 5 via an outbound edge. A value of "false" for the DIFF flag indicates that the regular expression engine 1104 is moving away from state 5 via an outbound edge and is also traversing a self-edge back to state 5. The EPS field is described in greater detail below.

When a state has a (non-epsilon) edge to an epsilon state, where that state may be defined as a "pre-eps state", that EPS flag of the state transition instruction (also referred to as an entry) in the instruction table 2200, which is normally set to false, is set to true to indicate that the next state transition instructions of the instruction table 2200 to be inspected collectively form an "epsilon sub-table" within the instruction table 2200. If that edge is traversed, the hardware, e.g., the regular expression engine 1104, is placed in "epsilon operating mode," for which additional state transition instructions are read until the end of the epsilon sub-table is reached. While in the epsilon operating mode, the regular expression engine 1104 does not consume any further input characters. Upon reaching the end of the epsilon sub-table, the hardware resumes "normal mode." In the example of FIG. 22, the epsilon sub-table is shaded.

For the input "ab" the regular expression engine 1104 begins at state 0. The regular expression engine 1104 then looks up the entry for index {"a", 0} to find a value of {1, DIFF=true, EPS=true}, which indicates that the regular expression engine 1104 should switch to epsilon operating mode. In epsilon operating mode, the epsilon sub-table to be read consists of all entries whose index is {n, 1}, where n is 0 through a maximum of 255 (in this example) as opposed to a character. In other words, the character field of the index is repurposed for the index of the epsilon sub-table. The epsilon sub-table ends on the entry of instruction table 2200 having an EPS flag set to "false."

The example of FIG. 22 illustrates a single epsilon sub-table. It should be appreciated that a given instruction table 2200 may include a plurality of different epsilon sub-tables. Referring to the examples of FIGS. 21 and 22, to process the epsilon sub-table, the regular expression engine 1104 begins by reading the value at index {0, 1}, returning {2, DIFF=true, EPS=true}. The value indicates that the edge to state 2 should be taken, and EPS being set to true indicates that the next entry in the epsilon sub-table should be read. Next, the hardware reads the value at {1, 1}, returning {3, DIFF=true, EPS=true}. This value indicates that the edge to state 3 should be taken concurrently with the previous edge to state 2, and again the EPS flag indicates that the next entry of the epsilon sub-table should be read. Finally, the value at index {2, 1} is read, returning {4, DIFF=true, EPS=false}, which indicates that the edge to state 4 should be taken concurrently with the other two states. With the EPS flag set to false for the {4, DIFF=true, EPS=false}, the regular expression engine 1104 is done reading the epsilon sub-table. Accordingly, the regular expression engine 1104 switches back to the normal (e.g., non-epsilon) mode of operation.

In the example of FIGS. 21 and 22, the epsilon sub-table is started after taking an edge from state 0 to state 1. In another example, it is also possible that state 0 itself could be an epsilon state, in which case, the regular expression compiler 100 produces an extra flag, outside the instruction table 2200 indicating whether state 0 is an epsilon state. If that flag is set, the regular expression engine 1104 is put into epsilon operating mode reading from state 0 immediately upon initialization.

To implement path priority in the instruction table 2200 as applied to greedy and lazy quantifiers, the EPS flag in instruction table 2200 may be repurposed when the DIFF flag is false (indicating a self-edge). When the EPS flag is false, the self-edge on the state is taken to be a greedy self-edge, whereas when the EPS flag is true, the self-edge is lazy.

Because the EPS flag is repurposed for a state with a self-edge, a state cannot both have a self-edge and be a pre-eps state. Whenever such a case arises, the regular expression compiler 100 gives preference to the pre-eps status of the state by eliminating the self-edge, either by re-writing the edge as an outbound edge to the same state or (in the case of the state having both an outbound edge and a self-edge for a character) by "merging" the two edges into one, e.g., DFA-style, using the powerset construction algorithm previously described.

In order to support path priority, the regular expression compiler 100 may be adapted with various changes to the operations performed and data structures used. For example, within the regular expression compiler 100, the data structure for a state contains, among other data, an unordered collection of edge objects. To implement path priority, the unordered collection may be replaced with an ordered collection with the ability to add an edge to either end of the collection efficiently. A double-ended queue, referred to as a "deque", may be used for the path priority-enhanced processing techniques implemented by the regular expression compiler 100. In one aspect, path priority among edges may be represented by the relative order of the edges in the collection. That is, for two given edges, whichever edge is nearer the head end of the collection has higher priority than the other edge.

Since quantifiers can be greedy or lazy, resulting in higher or lower priority, respectively, the regular expression compiler 100 may build the NFA fragments for a quantifier with such caveats in mind to implement the correct priority. For instance, when adding the loop and bypass edges of a quantifier, the regular expression compiler 100 uses their placement within the state's edge collection to determine whether the quantifier is greedy or lazy. As an example, the pseudo code in Example 6 illustrates an algorithm for the star operator with the necessary positioning of the bypass edge achieved by the code "at Front=isLazy".

Example 6

```
arg=fragStack.pop( )
f=new Fragment(startState=arg.startState, endEdges={ })
arg.addPlaceholderEdge(atFront=isLazy)
patch(edges=arg.endEdges, targetState=f.startState)
fragStack.push(f)
```

In one aspect, the function for adding a placeholder edge to the fragment's start state is modified to take an argument indicating whether the new edge should be added at the front of the state's edge collection or the back. If the quantifier is lazy, the placeholder edge is added to the front of the list of edges, prioritizing bypassing the quantifier sub-pattern over the path running through that sub-pattern. For example, referring to FIG. 23, which depicts an NFA graph for regular expression "(ab)*?", the bypass path (dashed edge) comes before the quantifier sub-pattern path corresponding to character "a" in the start state's edge collection so the bypass path has higher priority. In the example, the start of the state's edge collection may be located starting in the north direction with priorities decreasing going clockwise around the state. For a greedy quantifier, the placeholder edge is added to the end of the list of edges, prioritizing the edge into the sub-pattern over the bypass edge.

In accordance with the inventive arrangements, the path operation may be modified to accommodate for the position of the placeholder edge. The pseudo code of Example 7 illustrates a modified version of the patch operation that accounts for position of the placeholder edge.

Example 7

```
patch(edges, targetState)
   for each e in edges
      if !e.isPlaceholder( )
         e.to =targetState
   for each e in edges
      if e.isPlaceholder( )
         e.from.edges.insert
            (edges=targetState.edges.clone( ) at=e)
         edges.remove(e)
         if (targetState.isMatch)
            e.from.isMatch=true
```

Referring to Example 7, instead of adding the cloned edges at an arbitrary location in the destination state's edge list, the cloned edges are added at the location of the placeholder edge.

Figure 24:
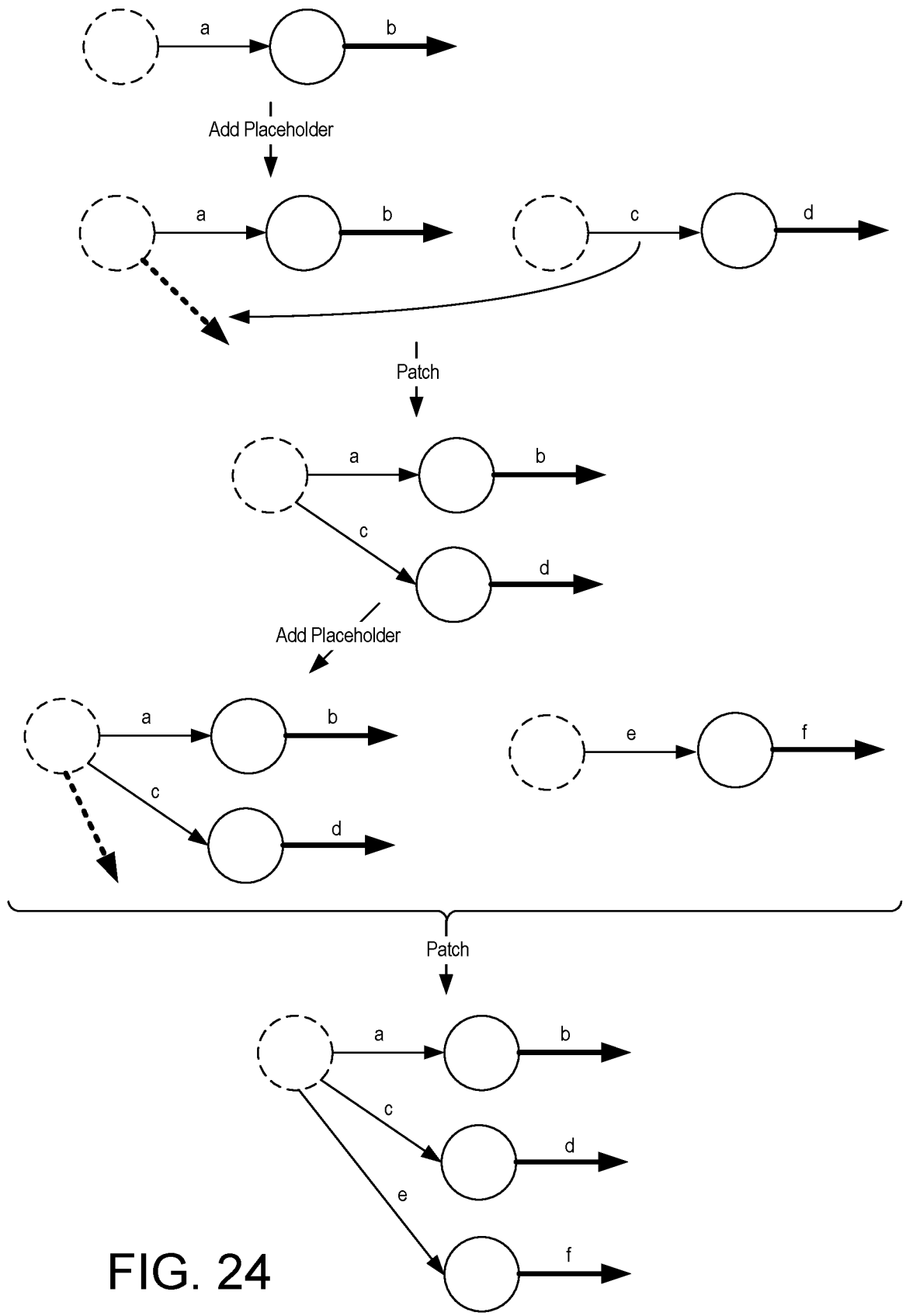
FIG. 24 illustrates an example of combining fragments using path priorities.

Alternation paths are prioritized in a similar fashion to that of quantifiers. Regular expression compiler 100 is capable of building a fragment for an alternation by merging the constituent pieces into a single state. For example, in the regular expression "ab|cd|ef", the regular expression compiler 100 merges the NFA fragments for "ab" and "bc" into the "ab" fragment's start state. The regular expression compiler 100 may then merge the fragment for "ef" into the combined fragment's start state as illustrated in the example of FIG. 24.

The placement of the placeholder edges (dashed lines) determines the priority order of the alternatives by ensuring that the placeholder edge is always added at the tail end of the edge list; the alternatives end up prioritized in the regular expression's left-to-right order. The alternation fragment-building operation illustrated in the pseudo code of example 8 is modified to ensure that the placeholder edge is added to the tail of the edge list.

Example 8

```
arg2=fragStack.pop( )
arg1=fragStack.pop( )
if arg1.startState.hasInboundEdges( )
   arg1.split( )
if arg2.startState.hasInboundEdges( )
   arg2.split( )
e=arg1.addPlaceholderEdge(atFront=false)
patch(edges={e}, targetState=arg2.startState)
arg1.endEdges+=arg2.endEdges
fragStac.push(arg1)
```

Figure 25:
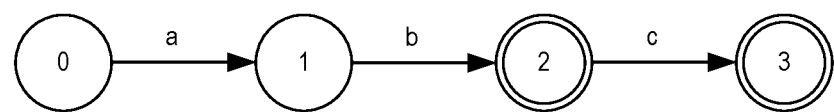
FIG. 25 illustrates an example NFA graph for a regular expression depicting the match-or-continue scenario.

FIG. 25 illustrates an example NFA graph for the regular expression "abc?" illustrating the match-or-continue scenario. The match-or-continue scenario, as previously described, applies to cases where the path choice is between concluding the match or taking a path to continue the regular expression. Referring to the example of FIG. 25, state 2 has a double ring to indicate that the match could complete at that point, e.g., after receiving input "ab", but also has an outbound edge to state 3. For an input of "abc", the choice is between stopping at state 2, thereby matching the substring "ab", or continuing to state 3 to match the whole string. In this case, because the Question (?) operator is greedy, the edge to state 3 should be prioritized over stopping at state 2.

Figure 26:
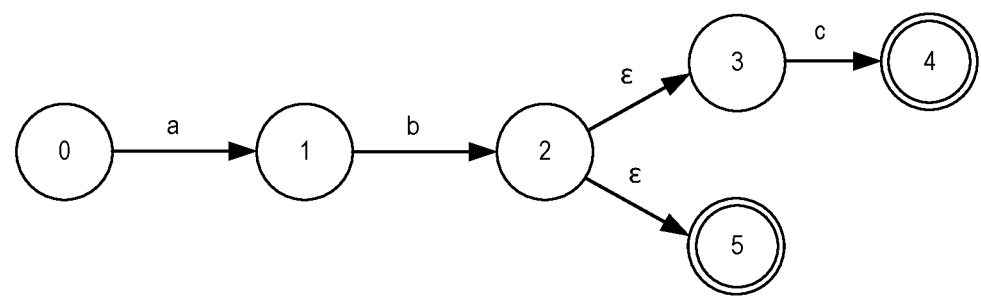
FIG. 26 illustrates an example of an HFA graph as generated by the regular expression compiler of FIG. 1.

FIG. 26 illustrates an example of an HFA graph as generated by regular expression compiler 100. Because the regular expression engines 1104 do not support match states with outbound edges, as the regular expression compiler 100 transforms the NFA graph of FIG. 25 into the HFA graph of FIG. 26, any HFA state that has outbound edges and is a match state is constructed using epsilon edges, as shown. The example of FIG. 26 shows that NFA state 2 from FIG. 26 has turned into a complex of 3 states including an epsilon "master" state (state 2), a normal "sub-state" (state 3) containing all the outbound edges from the NFA state, and a "pure" match state (state 5) with no outbound edges. By ordering the entries of the epsilon sub-table for the master state so that the edge to the sub-state comes before the edge to the match state, the edge to the sub-state is made to be a higher priority than the edge to the match state.

Regular expression compiler 100 may be adapted to transform the NFA graph into the HFA graph in order to handle greedy versus lazy self-edges and the match-or-continue scenario. The pseudo-code of Example 9 illustrates the example operations performed by regular expression compiler 100 in transforming an NFG graph into an HFA graph.

---

Example 9

---

```
buildXfa(nfaStartState, enableSelfEdges)
    xfaStates = {new XfaState({nfaStartState})}
    unprocessedStates = xfaStates
    while unprocessedStates != {}
        xfa = unprocessedStates.pop_front( )
        for each edgeSet in xfa.getEdgeSets( )
            outboundStates = {}
            greedyStates = {}
            lazyStates = {}
            isGreedyRangeValid = true
            for each edge in edgeSet.edges
                if edge.to in xfa.nfaStates
                    if isGreedyRangeValid
                        greedyStates += edge.to
                    else
                        lazyStates += edge.to
                else // outbound edge
                    outboundStates += edge.to
                    isGreedyRangeValid = false
                    if lazyStates != {}
                        error(unsupported)
                if edge.to.isMatch
                    break
            isPreEps = isPreEps(nfaStates)
            hadGreedySelfEdge = false
            if greedyStates != {}
                if !isPreEps AND greedyStates == xfa.nfaStates AND
                enableSelfEdges
                    xfa.edges += new Edge(from=xfa, to=xfa,
                    char=edgeSet.char)
                    hadGreedySelfEdge =true
                else
                    outboundStates.insertFront(greedyStates)
            hasLazySelfEdge = false
            if lazyStates != {}
                if !hadGreedySelfEdge AND !isPreEps AND lazyStates ==
                xfa.nfaStates ANDenableSelfEdges
                    hasLazySelfEdge = true
                else
                    outboundStates.insertBack(lazyStates)
            if outboundStates != {}
                destXfa = get from xfaStates an XfaState x where x.nfaStates ==
                outboundStates
                if destXfa == null
                    destXfa = new XfaState(outboundStates)
                    unprocessedStates += destXfa
                xfa.edges += new Edge(from=xfa, to=destXfa,
                char=edgeSet.char)
            if hasLazySelfEdge
                xfa.edges += new Edge(from=xfa, to=xfa, char=edgeSet.char)
    return xfaStates[0]
```

---

In Example 9, new variables are introduced to track greedy and lazy edges. The "loopStates" set is split into two: one for greedy edges and one for lazy edges. The "isGreedyRangeValid" keeps track of where in the ordered list of edges the greedy self-edges end.

The limitations of the regular expression processing system 130 impose restrictions on the contents of a state's edge list in the HFA. The state's edge list must contain, in priority order, all greedy self-edges first, then outbound edges, and then lazy edges. Any deviation from these requirements is handled by converting hardware-supported self-edges into "outbound" edges that loop back to the same state, or failing that possibility to convert, by erroring out as an unsupported case. If the edge list has both greedy and lazy self-edges, since only one form is supported, the lazy edges are converted into outbound edges.

It should be noted that if all self-edges are converted to outbound edges by regular expression compiler 100, then the regular expression compiler 100 is performing powerset construction without modification and the resulting graph is a pure DFA graph. In one or more example implementations, the regular expression compiler 100 supplies an option to disable self-edges by setting the property "enableSelfEdges" to false, which causes the regular expression compiler 100 to process all self-edges as outbound edges. For some regular expressions, this option can increase the length of input strings that the hardware can process by reducing the number of simultaneous paths being explored to fit within the hardware's limit on the number of paths. In other cases, this option can make a large regular expression fit within the existing hardware limitations (e.g., 254 states in this example) since the differing set of edges changes the outcome of the powerset construction operation.

Continuing with the pseudo code of Example 9, for a self-edge to be greedy, the self-edge must by definition be in the edge list before any outbound edges. For a self-edge to be lazy, it must be in the edge list after all outbound edges. When looping in priority order over the edges for a character, if the edge is a self-edge (that is, if edge.to is in xfa.nfaStates) and the regular expression compiler 100 is still in the greedy range of edges (not having seen an outbound edge yet), the regular expression compiler 100 adds the edge to the set of greedy edges. If instead the regular expression compiler 100 has already seen an outbound edge, the regular expression compiler 100 adds this self-edge to the set of lazy edges with the expectation that the only edges remaining for this character are all lazy self-edges.

If instead the current edge is an outbound edge, the regular expression compiler 100 adds the edge to the set of outbound edges. Because the regular expression compiler 100 has seen an outbound edge, there must no longer be any greedy edges. Accordingly, regular expression compiler 100 set "isGreedyRangeValid" accordingly. Also, if the regular expression compiler 100 has already seen a lazy self-edge, the regular expression compiler 100 determines that the construct being operated on is unsupported since the current outbound edge is of lower priority than the lazy self-edge.

While looping through the edges of the current character, if the regular expression compiler 100 encounters an edge whose destination is a match state, the regular expression compiler 100 breaks from the loop to ignore the remaining edges. Any edges of lower priority than an edge to a match state need not be explored as the edge to the match state is guaranteed to match for the current character and will always be chosen over any lower priority possibility for that character.

Next, after all edges of the current character have been categorized (e.g., as a lazy self-edge, an outbound edge, or a greedy self-edge), the former logic of the regular expression compiler 100 for creating HFA states is replaced with a four-part operation. The four-part operation first processes greedy self-edges, then checks the validity of lazy self-edges, then processes outbound edges, and then processes lazy self-edges. In the first operation, if there are any edges collected as greedy self-edges and those edges truly constitute an HFA self-edge (e.g., the state is not a pre-eps state, the edges cover all the NFA states of the XFA state, and the creation of self-edges is enabled), then the regular expression compiler 100 creates the greedy self-edge and logs that a greedy self-edge has been created. Otherwise, regular expression compiler 100 moves all the edges to the front of the outbound edge collection to make the moved edges higher priority than the outbound edges in order to process such edges as "outbound" edges.

In the second operation, in a manner similar to checking the validity of the greedy self-edges, the regular expression compiler 100 validates the lazy self-edges, with the additional requirement that for a self-edge to exist, a greedy self-edge must not exist. If the lazy self-edges fail validation, the regular expression compiler 100 moves the lazy self-edges to the back of the outbound edge set, as those self-edges are of lower priority than the outbound edges.

In the third operation, the regular expression compiler 100 processes the outbound edges as was done in and described in connection with Example 4 by looking up or creating an HFA node for the destination of the HFA outbound edge.

In the fourth operation, if the lazy self-edges had passed validation, the regular expression compiler 100 creates an HFA lazy self-edge.

Example 9 and the accompanying description relating to sorting edges illustrates an example of maintaining priority among edges to indicate properties such as left-to-right alternation in the regular expression and/or lazy-greedy edges.

The pseudo code of Example 10 illustrates an example technique used by the regular expression compiler 100 for determining whether the current HFA state is a pre-eps state.

Example 10 isPreEps(nfaStates)
  hasOutboundEdge=false
  hasMatchState=false
  for each nfaState in nfaStates
    if nfaState.edges !={ }
      hasOutboundEdge=true
    if nfaState.isMatch
      hasMatchState=true
  return hasOutboundEdge AND hasMatchState Example 10 illustrates that the regular expression compiler 100 is capable of determining that an HFA state is a pre-eps state if at least one of its NFA states has outbound edges and at least one of the NFA states is a match state. The regular expression compiler 100 is capable of operating by looping through each of the NFA states looking for outbound edges and match flags. In response to detecting both for a given NFA state, the regular expression compiler 100 determines that the state is a pre-eps state.

FIG. 27 illustrates certain operative features relating to path priority processing as performed by the regular expression processing system 130. In the example of FIG. 27, the regular expression that is implemented in the instruction table 2200 is ".*?(?:(abcd)|(ab)|(cef)))". The regular expression begins with a lazy quantifier matching any character followed by an alternation of three sub-patterns "abcd", "ab", and "cef". The HFA graph for the regular expression is shown. In the HFA graph, region 5 illustrates the match state for sub-pattern "abcd". Region 4 illustrates the match state for sub-pattern "ab". Region 3 illustrates the match state for sub-pattern "cef".

In the HFA graph of FIG. 27, where path choices are available, the encircled "+" indicates a higher priority path while the encircled "-" indicates a lower priority path. For example, because the quantifier corresponding to region 1 is lazy, an input of "a" or "c" should prefer the outbound edges leading to states 1 or 5 over the self-edge leading back to state 0. The HFA graph of FIG. 27 also illustrates the match-or-continue scenario that arises for this regular expression with the path ending in region 4 that ends the regular expression, which is also a prefix of the regular expression sub-pattern "abcd". In the HFA graph, the "ab" common part of both sub-patterns "abcd" and "ab" has been merged into a single path corresponding to region 2 due to powerset construction. Where the paths diverge at state 2, region 5 represents the continuation for the "cd" sub-pattern, while region 4 ends the regular expression. Because state 2 needs both an outbound edge and a match flag, the regular expression compiler 100 has split state 2 with epsilon edges as previously described. Region 5 has a higher priority than region 4 since the portion of the HFA graph represented by region 5 is the leftmost operand of the alternation. As such, the epsilon edge leading to region 5 has a higher priority than epsilon edge leading to region 4.

The table illustrated in FIG. 27 shows the changes that occur in the regular expression engine 1104 on a state-by-state basis as each of input characters x, a, b, c, e, and f are received and processed. In the table, each column represents a snapshot in time of the ordered list of graph paths that the hardware is actively exploring that are represented or stored in the priority FIFO memories described hereinbelow in connection with FIG. 28. The topmost row is the highest priority path. The bottommost row is the lowest priority path. The input characters are shown across the top of the table as received at different points in time. Operation begins with the list initialized with a single path at state 0, the starting state.

As the regular expression engine 1104 receives the "x", the only possible edge is the self-edge back to state 0, after which the list contains just state 0. In response to receiving the "a", there are two available paths which include the self-edge back to state 0 and the outbound edge to state 1. Both states are added to the table. Because the outbound edge has higher priority, the resulting list has state 1 above state 0. For example, state 1 is shown in the first row, while the state 0 is shown in the second row.

In response to processing the "b", the regular expression engine 1104 encounters the match-or-continue scenario. In receiving the "b", the outbound edge to state 2 is taken. As previously discussed, both of the epsilon edges are taken immediately so that state 3 is reached in region 5 and the match state (shown as a double ring) is reached in region 4. As shown in the table in the column "b", in the first row the state advances from 2 to 3, while the match state is shown in row 2. The epsilon edges are traversed without the hardware consuming another input character.

At this point, the regular expression engine 1104 has received the characters "xab", which may be a complete match via the sub-pattern corresponding to region 4. Alternatively, regular expression engine 1104 may be partially done matching the sub-pattern continuing in region 5. In this example, since the sub-pattern corresponding to region 5 is higher priority than that of region 4, the regular expression engine 1104 continues processing further input characters to determine whether the sub-pattern corresponding to region 5 is matched. Only if the path corresponding to region 5 fails is the path corresponding to region 4 accepted. As shown, the match state reached in region 4 is added to the list beneath state 3 (e.g., in column "b").

Having reached the match state, the remainder of the list maintained in the hardware is discarded since entries of a lower priority than a matched state will never be accepted. For purposes of illustration, the shaded block in column "a" in the second row containing the state 0 is discarded. Additionally, to accommodate the next search in the input after "xab" may be matched, the regular expression engine 1104 starts a new path (e.g., list) in row 3 where the starting state 0 is added in column "b".

The example of FIG. 27 illustrates that whenever the regular expression engine 1104 determines that a path completes, the list(s) below that path are discarded. Further, the path's match state is added to the list and a new path at the starting state is placed at the bottom of the list.

Continuing with the processing performed by the regular expression engine 1104, the input "c" may be received. Accordingly, in row 1, state 4 is reached corresponding to region 5. The match state corresponding to region 4 remains in the list maintained in the second row. The list in the row 3 has two edges for the character "c" that can be taken. One is the outbound edge to state 5 in region 3 and the other is the self-edge back to state 0. Accordingly, the higher priority outbound edge to state 5 is placed in row 3, while a new list is started in row 4 corresponding to the self-edge back to state 0. Thus, under column "c", row 1 includes state 4, row 2 includes the match state, row 3 includes state 5, and row 4 includes state 0.

In response to receiving the next input character "e", the regular expression engine 1104 determines that the input character is not valid for region 5 as there is no edge corresponding to "e". Accordingly, the path is terminated as indicated by the "Fail" in row 1 column "e". Once the path in row 1 is terminated, the match in row 2 corresponding to region 4 is the highest priority path and is accepted as a match result indicating that the input "xab" was a match.

Meanwhile, the remaining paths, which now represent a second potential match starting with input "ce" continue to advance where state 5 in row 3 advances to state 6 in region 3 and state 0 in row 4 takes the self-edge back to state 0. In response to receiving the input character "f", the path specified in row 3 in region 3 matches. As previously discussed, the list corresponding to row 4 may be discarded and a new path at state 0 is started. In the latter portion of the example of FIG. 27, because the path corresponding to region 3 was the highest priority path in the table, the match determined in response to receiving the input character "f" is immediately accepted and output indicating that the input "cef" was a match.

The path prioritization described and implemented by the regular expression compiler 100 may be implemented by the regular expression processing system 130 disclosed herein and through incorporation of a modified version of the active states memories 1114 previously described. In one aspect, each of the active states memories 1114 of the regular expression engines 1104 may be implemented using a priority FIFO memory that is capable of storing the paths of the HFA graph that are currently active. The priority FIFO memories are capable of storing all active paths while traversing the HFA graph. The priority FIFO memories are capable of maintaining, or storing, active paths in correct priority order as illustrated in the example table of FIG. 27. Further, the priority FIFO memories are capable of clearing the entries, e.g., lists or paths, that constitute lower priority paths in response to detecting the various conditions described herein.

Regarding match-or-continue operation, the hardware is capable of storing one or more match states in one or both of the priority FIFO memories until each higher priority path and/or active state has failed. The match states can be stored in one or both of the priority FIFO memories as a mechanism for dealing with the uncertainty of whether a given match completes (e.g., a shorter path is accepted as a match) or will be extended (e.g., a longer path is accepted as a match). The match state is not accepted until each higher priority path and/or active state fails. This capability alleviates the need for the hardware to iterate back over, or re-read, characters of the input stream when handling match-or-continue scenarios.

Figure 28:
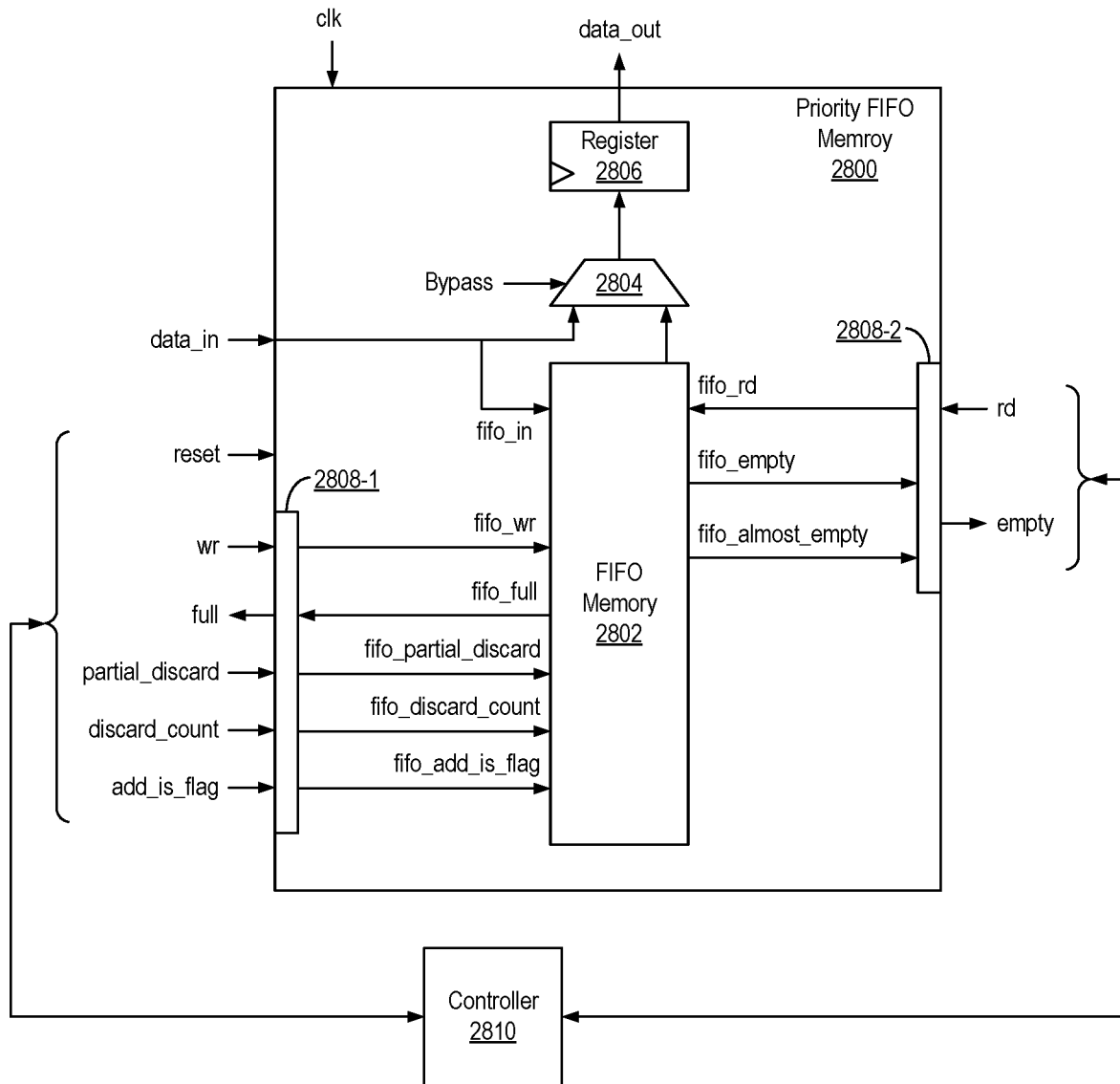
FIG. 28 is a block diagram illustrating an example implementation of a priority first-in-first-out (FIFO) memory.

FIG. 28 is a block diagram illustrating an example implementation of a priority FIFO memory 2800. In general, priority FIFO memory 2800 is capable of operating as a FIFO memory as generally understood by one skilled in the art. Priority FIFO memory 2800 does include additional features as described in greater detail below that facilitate the storage and tracking of priority paths.

In the example of FIG. 28, the priority FIFO memory 2800 includes a FIFO memory 2802, a switch 2804 (e.g., a multiplexer), and a register 2806. The priority FIFO memory 2800 also may include logic 2808 (e.g., shown as 2808-1 and 2808-2) that is capable of either passing certain signals into and out from the priority FIFO memory 2800 unchanged, modifying certain signals provided to or from the priority FIFO memory 2800, and/or generating new signals based on a combination of two or more signals provided to or from the priority FIFO memory 2800. In the example, the particular control signals illustrated may be coupled to a controller 2810. Controller 2810 may be implemented similar to controller 1130 to receive and/or provide the particular signals illustrated. In one aspect, controller 2810 may be implemented in logic/circuitry that is distributed over a plurality of different circuit blocks in the examples described herein.

In terms of operation of the priority FIFO memory 2800, in one aspect, the order in which entries, or active states, are stored in priority FIFO memory 2800 represents the priority of the entries. For example, at the start of processing a new character from a received data stream, for the set of active paths stored in priority FIFO memory 2800, the entries are stored in decreasing order of priority according to the path priorities described herein for regular expression processing.

In another aspect, the priority FIFO memory 2800 may be partially cleared to support discarding of lower priority entries in certain conditions. The partial clearing supports discarding of a contiguous subset of the entries stored in the priority FIFO memory 2800. The signal partial_discard may be used to trigger the partial clearance operation while the signal discard_count may be used to set or determine the number of entries to discard starting from the top of the priority FIFO memory 2800.

The partial discard may be performed as part of a configuration operating state described in greater detail below. In an example implementation, the partial discard operation may be performed by updating a head pointer (address) of the FIFO memory 2802 that points to a top of the priority FIFO memory 2800 as head=head+discard_count. This functionality is used to discard all lower priority paths from the priority FIFO memory 2800. In response to determining that a match state is reached for an active path in priority FIFO memory 2800 for a particular input character, the remaining active states for that character may be discarded from the priority FIFO memory 2800.

As illustrated, the data_out signal from the priority FIFO memory 2800 is registered by register 2806. The latency of the priority FIFO memory 2800 is guaranteed to be 1 clock cycle. That is, if the priority FIFO memory 2800 is not empty, a read request received in a clock cycle will be served in the next clock cycle. This means that any pending writes and partial discards will be handled appropriately as discussed in greater detail below.

In the example of FIG. 28, the priority FIFO memory 2800 uses the signal add_is_flag to indicate that a new active path should be started by adding the starting state (referred here as initial state "IS") to the priority FIFO memory 2800 as illustrated in the example of FIG. 27. The writing of the IS may be performed in addition to a regular write that is performed by asserting the signal wr. Accordingly, if both signals wr and add_is_flag are asserted at the same time, two entries are written to the priority FIFO memory 2800. This condition only occurs if a partial discard is initiated according to the path priority process techniques previously described. This means that the latency of completing a partial discard operation is 2 clock cycles.

In the example, the FIFO memory 2802 implements the partial discard and initial state write functionality. The priority FIFO memory 2800 implements a bypass register using switch 2804 and register 2806 to achieve a 1 clock cycle read latency with registered output (e.g., the "first word fall through" feature). The 1 clock cycle read latency achieved using the switch 2804 and register 2806 may be implemented substantially as described in connection with FIGS. 11, 12, and 13.

Figure 29:
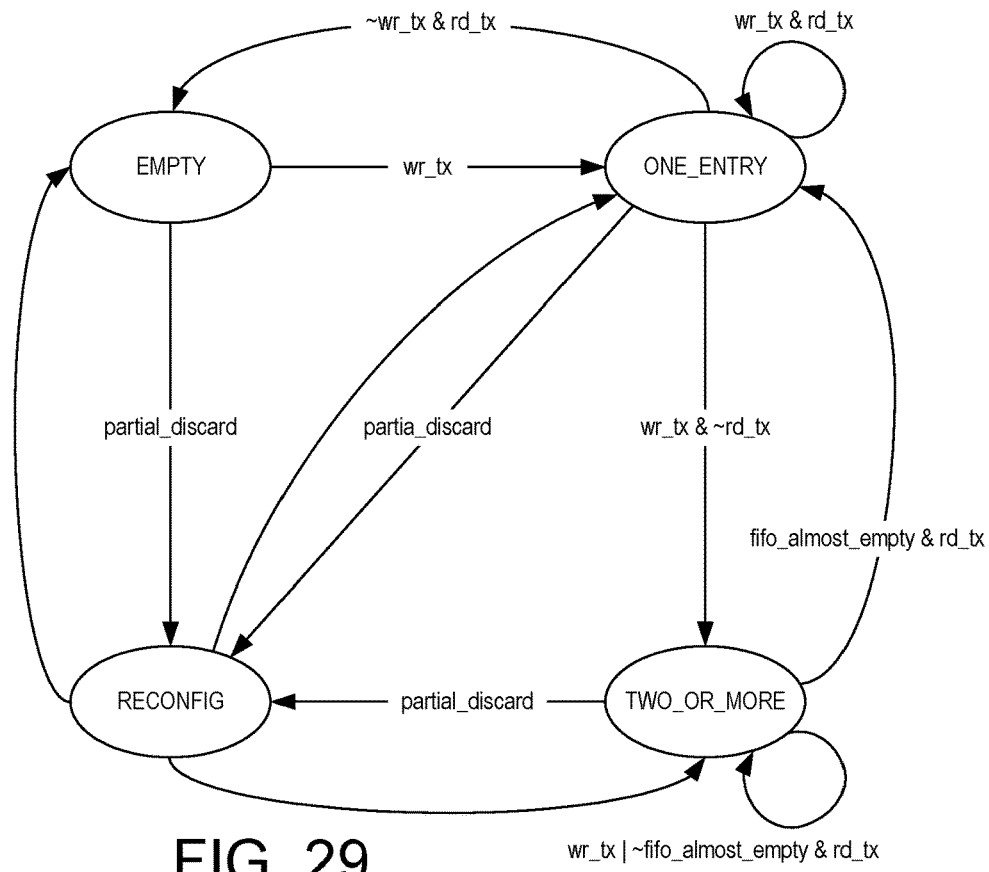
FIG. 29 illustrates an example implementation of a state machine that may be implemented to control a priority FIFO memory.

FIG. 29 illustrates an example implementation of a state machine 2900. In one aspect, state machine 2900 may be implemented as part of controller 2810. The example state machine 2900 is capable of controlling how many entries currently exist in the priority FIFO memory 2800. In the example, state machine 2900 includes 4 states. All states except the reconfiguration operating state (shown as RECONFIG) represents the number of entries in the priority FIFO memory 2800.

Referring to FIG. 29, RECONFIG is entered when partial discard is triggered from any state. RECONFIG performs the partial discard and brings back the priority FIFO memory 2800 into the correct state based on the number of remaining entries after the partial discard operation. As discussed, the partial discard operation of the RECONFIG state takes 2 clock cycles to complete. While the priority FIFO memory 2800 is in the RECONFIG state, the signal data_out is not valid (e.g., is invalid). The transitions from RECONFIG to one of the other valid states is discussed in greater detail below. The transitions from the RECONFIG state to each of the other three states are described in greater detail in connection with FIG. 30 below.

The following discussion describes the signals of FIGS. 28 and 29 with respect to the priority FIFO memory 2800 and internal signals for the FIFO memory 2802. Within the following described signal relationships, the term "PFIFO" refers to priority FIFO memory 2800, while FIFO refers to the FIFO memory 2802. As generally understood, "~" means negation.

PFIFO depth=FIFO depth+1. The depth of the priority FIFO memory 2800 is equal to the depth of the FIFO memory 2802 plus 1. This is due to the inclusion of register 2806 providing storage for one additional entry at the top of FIFO memory 2802.
   wr_tx=~full & wr
   rd_tx=~empty & rd
   data_out_reg_valid=(discard_count==0) & (entries !=EMPTY). "Entries" is a state machine register denoting which state the priority FIFO memory 2800 is in.
   data_out_reg_valid indicates whether data_out_reg (i.e., register 2806) has valid data.
   fifo_partial_discard=(entries !=EMPTY) & partial_discard. The partial discard operation need only discard entries from the FIFO memory 2802 when there may be entries stored in the FIFO memory 2802. Otherwise only the data_out_reg (i.e., register 2806) needs to be managed or cleared in this case.
   fifo_discard_count=(discard_count==0) ? 0: discard_count-1. The partial discard operation removes entries from the top of the priority FIFO memory 2800, i.e., the entry in data_out_reg (register 2806) will always be removed if one exists. Accordingly, the number of entries to be removed from the FIFO memory 2802 is 1 less (e.g., decremented by 1). The FIFO internal head address pointing to top of FIFO is updated as head=head+fifo_discard_count.
   fifo_almost_empty=fifo_empty+1. The signal fifo_almost_empty is asserted when there is exactly one entry in the FIFO memory 2802.
   bypass is asserted whenever either data_out_reg (register 2806) is already empty or will become empty in the next cycle due to the signal rd_tx in the current cycle.
   fifo_add_is_flag=add_is_flag. The initial state is added to the FIFO memory 2802 if the initial state cannot be written to data_out_reg (register 2806).

Using the relationships described above, operation of the state machine of FIG. 29 may be further described as follows. If partial_discard is asserted, each of the EMPTY, ONE_ENTRY, and TWO_OR_MORE operating states transition to the RECONFIG state regardless of any other transition criteria being met.

The EMPTY operating state means that the priority FIFO memory 2800 is empty. More particularly, both the FIFO memory 2802 and the register 2806 are empty. In the EMPTY operating state, the following conditions are observed.
   If the signal empty=1, data cannot be read and the signal rd has no effect.
   If the signal wr is asserted, data is written to data_out_reg (register 2806) via the bypass or "fall-through" functionality where the input to the FIFO memory 2800 is written directly to register 2806.

The ONE_ENTRY operating state means that the FIFO memory 2802 is empty and that the data_out_reg (register 2806) is not empty. In the ONE_ENTRY operating state, the following conditions are observed.
   The signal empty=0.
   If both the signals wr and rd are asserted, data is read and written into data_out_reg (register 2806) via the bypass functionality.
   If only signal wr is asserted, then set signal fifo_wr=wr and write data to FIFO memory 2802.
   If only the signal rd is asserted, then set fifo_rd=rd, read data from data_out_reg (register 2806) and the FIFO memory 2802, and the FIFO memory 2802 output is written to the data_out_reg (register 2806).

The TWO_OR_MORE operating state means that both the FIFO memory 2802 and the register 2806 are not empty (e.g., both have data stored therein). In the TWO_OR_MORE operating state, the following conditions are observed.
   bypass=0 so that if signal wr is asserted, then set fifo_wr=wr and data is always written into the FIFO memory 2802.
   If signal rd is asserted, then set fifo_rd=rd, data is read from data_out_reg (register 2806) and FIFO memory 2802, and the FIFO memory 2802 output is written to the data_out_reg (register 2806).

In the RECONFIG operating state, the following conditions are observed.
   empty=1 and the data_out is not valid.
   Read is not allowed.
   Depending upon the signals wr and add_is_flag, the priority FIFO memory 2800 updates internal signals and moves back to one of the other 3 operating states as discussed in connection with FIG. 30.

Figure 30:
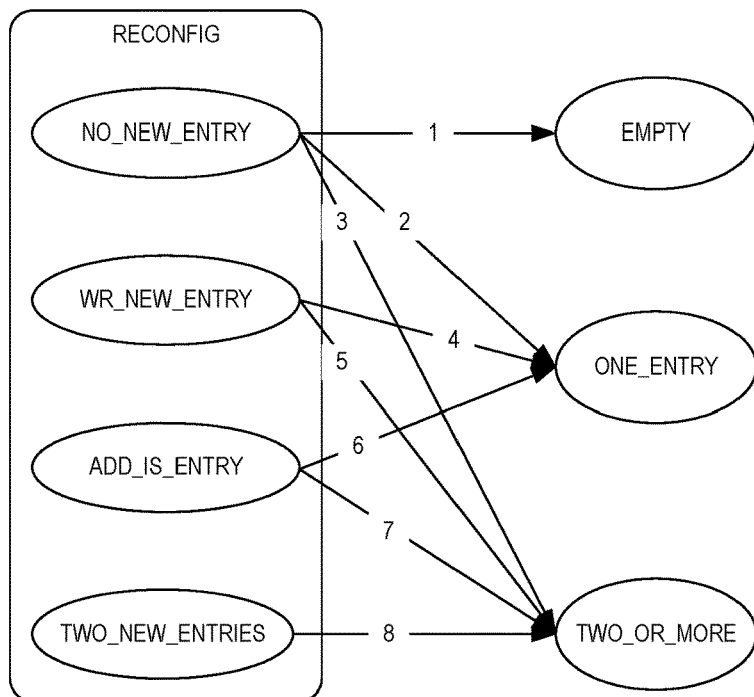
FIG. 30 illustrates a more detailed illustration of the reconfiguration operating state of FIG. 29.

FIG. 30 illustrates a more detailed illustration of the RECONFIG operating state of FIG. 29. In the example of FIG. 30, the reconfiguration operating state includes a plurality of substates. FIG. 30 illustrates the conditions that cause the state machine to transition from RECONFIG to each of the other three operating states of the state machine of FIG. 29. In general, when in the RECONFIG operating state, the priority FIFO memory 2800 enters an internal reconfiguration state. In the RECONFIG operating state, a partial discard is performed. Based on how many entries exist in priority FIFO memory 2800, the data_out_reg (register 2806) is cleared and the number of entries to be removed from the FIFO memory 2802 is determined. For example, the FIFO head address (e.g., the head address of FIFO memory 2802) is determined as head=head+fifo_discard_count. If both signals wr and add_is_flag are asserted, then two writes are enqueued at the end of the priority FIFO memory 2800. Depending upon how many entries remain in the priority FIFO memory 2800 after the partial discard operation, one or both of data_in entry and the initial state (IS) entry will be written in the FIFO memory 2802.

Referring to FIG. 30, scenarios 1-8 are shown that lead from various substates of the RECONFIG operating state to other ones of the EMPTY, ONE_ENTRY, and TWO_OR_MORE operating states. The particular scenario that is followed depends on which of the four substates arise based on the signals wr_tx and add_is_flag. The different cases, e.g., or substates of the RECONFIG operating state, are as follows.

NO_NEW_ENTRY: wr_tx==0 & add_is_flag==0. In this case, no new entries are to be written. There is no new input data and no IS state is to be written.

WR_NEW_ENTRY: wr_tx==1 & add_is_flag==0. In this case, one new entry is to be written. New input data is to be written, but on new IS state is to be written.

ADD_IS_ENTRY: wr_tx==0 & add_is_flag==1. In this case, one new entry to be written. No new input data is to be written, but a new IS state is to be written.

TWO_NEW_ENTRIES: wr_tx==1 & add_is_flag==1. In this state, two new entries are to be written. New input data and a new IS state are to be written. In one aspect, the controller determines whether a new state and an IS state are to be written considering the two active states FIFOs as a single memory. Load balancing, as described herein, determines which particular active states FIFO memory receives the new state and which active states FIFO memory receives the IS state.

The discussion below elaborates on each of the scenarios 0-7 and how the RECONFIG state transitions to either the EMTPY, ONE_ENTRY, or TWO_OR_MORE entries states.

Scenario 1: NO_NEW_ENTRY→EMPTY. In this scenario, the following conditions are observed.

~data_out_reg_valid & fifo_empty. Accordingly, the data_out_reg (register 2806) does not have valid data. One or more entries were discarded and the FIFO memory 2802 became empty after that operation. The whole priority FIFO memory 2800 is now empty. No new entries are being written so the priority FIFO memory 2800 will be empty at the end and goes to the EMPTY operating state.

Scenario 2: NO_NEW_ENTRY→ONE_ENTRY. In this scenario, the following conditions are observed.

~data_out_reg_valid & fifo_almost_empty. One or more entries were discarded and the FIFO memory 2802 has 1 entry. This 1 entry will be moved to the data_out_reg (register 2806) and the FIFO memory 2802 will become empty. Accordingly, the priority FIFO memory 2800 has 1 entry remaining. Since no new entries are being written, the priority FIFO memory 2800 moves to the ONE_ENTRY operating state.

data_out_reg_valid & fifo_empty. No entries were discarded and the data_out_reg (register 2806) still has valid data. The FIFO memory 2802 is empty. Accordingly, the priority FIFO memory 2800 has 1 entry. Since no new entries are being written, the priority FIFO memory 2800 moves to the ONE_ENTRY operating state.

Scenario 3: NO_NEW_ENTRY→TWO_OR_MORE. In this scenario, the following conditions are observed.

~data_out_reg_valid & ~fifo_almost_empty. The FIFO memory 2802 has more than 1 entry after the discard operation and since no more entries are being written, the priority FIFO memory 2800 moves to the TWO_OR_MORE operating state.

data_out_reg_valid & ~fifo_empty. Both the data_out_reg (register 2806) and the FIFO memory 2802 have entries so that the priority FIFO memory 2800 moves to the TWO_OR_MORE operating state.

Scenario 4: WR_NEW_ENTRY→ONE_ENTRY. In this scenario, the following conditions are observed.

~data_out_reg_valid & fifo_empty. The FIFO memory 2802 became empty and the data_out_reg (register 2806) has no data. Since data_in is being written as wr is asserted, the priority FIFO memory 2800 will have 1 entry that will be written to the data_out_reg (register 2806) directly via the bypass functionality. Accordingly, the priority FIFO memory 2800 moves to the ONE_ENTRY operating state.

Scenario 5: WR_NEW_ENTRY→TWO_OR_MORE. In this scenario, the following conditions are observed.

~data_out_reg_valid & ~fifo_empty. No data in stored in the data_out_register (register 2806), the FIFO memory 2802 has at least 1 entry, and a new wr will add another entry. The top entry of the FIFO memory 2802 is moved to the data_out_reg (register 2806) as the data_out_reg is empty and data_in will be written to the FIFO memory 2802. The priority FIFO memory 2800 will have at least two entries and moves to the TWO_OR_MORE operating state.

data_out_reg_valid. The data_out_reg (register 2806) has valid data and a new data_in entry will be written to the FIFO memory 2802 resulting in at least two entries in the priority FIFO memory 2800. Accordingly, the priority FIFO memory 2800 moves to the TWO_OR_MORE operating state.

Scenario 6: ADD_IS_ENTRY→ONE_ENTRY. In this scenario, the following conditions are observed.

~data_out_reg_valid & fifo_empty. This is the same as the WR_NEW_ENTRY case. The priority FIFO memory 2800 is currently empty and a new default initial state (IS) will be written to the data_in_reg (register 2806). Accordingly, the priority FIFO memory 2800 ends up with 1 entry and moves to the ONE_ENTRY operating state.

Scenario 7: ADD_IS_ENTRY→TWO_OR_MORE. In this scenario, the following conditions are observed.

~data_out_reg_valid & ~fifo_empty. The data_out_reg (register 2806) is empty but the FIFO memory 2802 is not. An entry from the FIFO memory 2802 is moved to the data_out_reg (register 2806) and an initial state (IS) entry is written to the FIFO memory 2802 by asserting the signal fifo_add_is_flag. Accordingly, the priority FIFO memory 2800 moves to the TWO_OR_MORE operating state.

data_out_reg_valid. The data_out_reg (register 2806) still has valid data and the initial state (IS) is added to the FIFO memory 2802 via assertion of signal fifo_add_is_flag. Since the priority FIFO memory 2800 has at least two entries, the priority FIFO memory 2800 moves to the TWO_OR_MORE operating state.

Scenario 8: TWO_NEW_ENTRIES→TWO_OR_MORE. In this scenario, the following conditions are observed.

Regardless of the current status of the priority FIFO memory 2800, a new wr entry and the initial state (IS) entry are written to the priority FIFO memory 2800. Accordingly, the priority FIFO memory 2800 will always move to the TWO_OR_MORE operating state. The data_in entry is always written first and then the initial state (IS) is written second. The data_in either goes directly to the data_out_reg (register 2806) via the bypass functionality or into the FIFO memory 2802 if the priority FIFO memory 2800 has at least one entry. The initial state (IS) always goes into the FIFO memory 2802.

Figure 31:
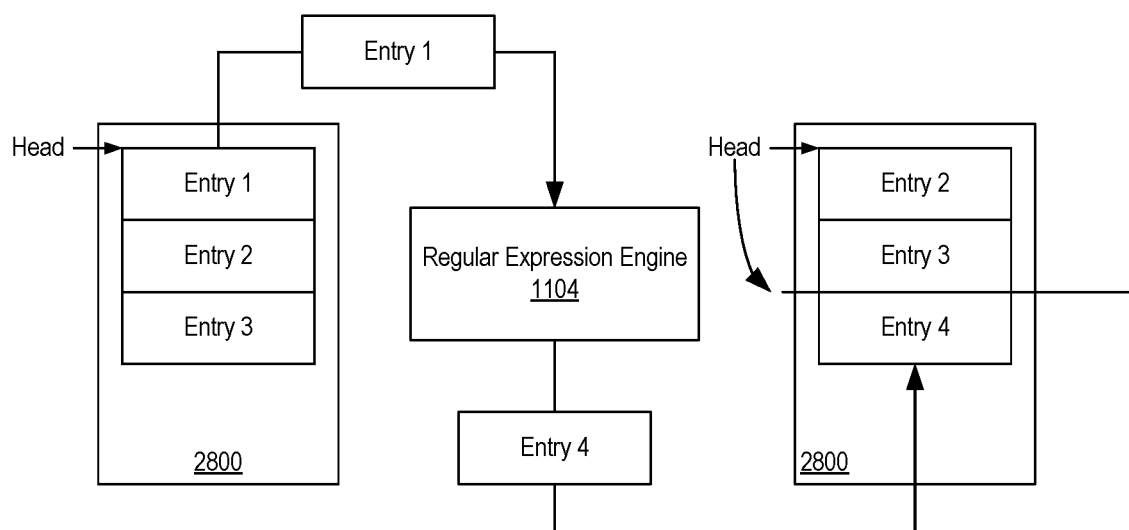
FIG. 31 is an example illustrating operation of the discard operation as performed by a priority FIFO memory.

FIG. 31 is an example illustration of the discard operation as performed by the priority FIFO memory 2800. In the example, the priority FIFO memory 2800 initially stores 3 entries pertaining to a particular character. The head of the FIFO memory 2802 is shown pointing to entry 1. Entry 1 is read out of the priority FIFO memory 2800 and processed through circuitry of the regular expression engine 1104. For example, the entry 1 is used to perform a lookup in the NRR memory 1102 with the output of the NRR memory 1102, e.g., entry 4, flowing through the decoder circuit 1106, and through the switching circuitry 1120. The entry 4 is written to the priority FIFO memory 2800 as shown. For purposes of illustration, entry 4 is a match state.

As discussed, the entries are stored in the priority FIFO memory 2800 in decreasing priority. Accordingly, entry 1 is the highest priority, followed by entry 2, and then entry 3. As the match state (entry 4) is written back to priority FIFO memory 2800, that state has a higher priority than entries 2 and 3 remaining the priority FIFO memory 2800. The priority FIFO memory 2800 may be cleared by incrementing the head to point to the match state (entry 4), which effectively clears the lower priority entries 2 and 3 from the priority FIFO memory 2800. The updating the head for the priority FIFO memory 2800 was previously described.

Figure 32:
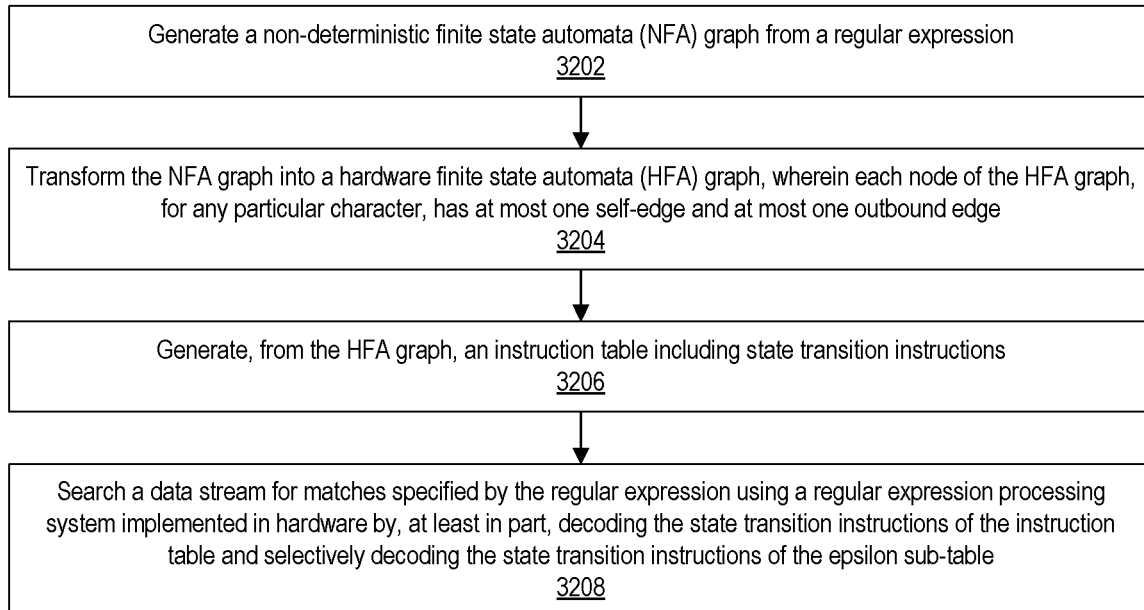
FIG. 32 illustrates an example method of implementing a regular expression processing system adapted for tracking paths and path priorities.

FIG. 32 illustrates an example method 3200 of implementing a regular expression processing system such as the regular expression processing system 130 of FIG. 1 as adapted for tracking paths and path priorities. The method 3200 may be implemented by a data processing system (system) as described herein in connection with FIG. 15 (e.g., data processing system 1500).

In block 3202, system generates an NFA graph 114 from a regular expression. In block 3204, the system transforms the NFA graph 114 into an HFA graph 118. The HFA graph 118 has nodes with edges. The HFA graph 118, for any particular character, has at most one self-edge and at most one outbound edge. In block 3206, the system generates, from the HFA graph 118, an instruction table 2200 including state transition instructions. The instruction table 2200 includes an epsilon sub-table configured to specify epsilon edges of the HFA graph 118. In block 3208, the system searches a data stream for matches specified by the regular expression using a regular expression processing system 130 implemented in hardware by, at least in part, decoding the state transition instructions of the instruction table 2200 and selectively decoding the state transition instructions of the epsilon sub-table.

The foregoing and other implementations can each optionally include one or more of the following features, alone or in combination. Some example implementations include all the following features in combination.

In one aspect, the state transition instructions specify a next state and a flag indicating that an outbound edge of a state is being processed or both an output edge of the state and a self-edge of the state are being processed.

In another aspect, the state transition instructions specify a flag, wherein the flag specifies whether the epsilon sub-table is used for decoding.

In another aspect, the instruction table includes an address portion formed of a received character and a state.

In another aspect, the edges of the nodes of the HFA graph are ordered to indicate path priority.

In another aspect, each state transition instruction of the epsilon sub-table has a same state associated therewith. Each state transition instruction of the epsilon sub-table also may be ordered according to path priority.

In another aspect, the method includes sorting edges of the HFA graph into categories including lazy self-edges, outbound edges, and greedy self-edges.

Figure 33:
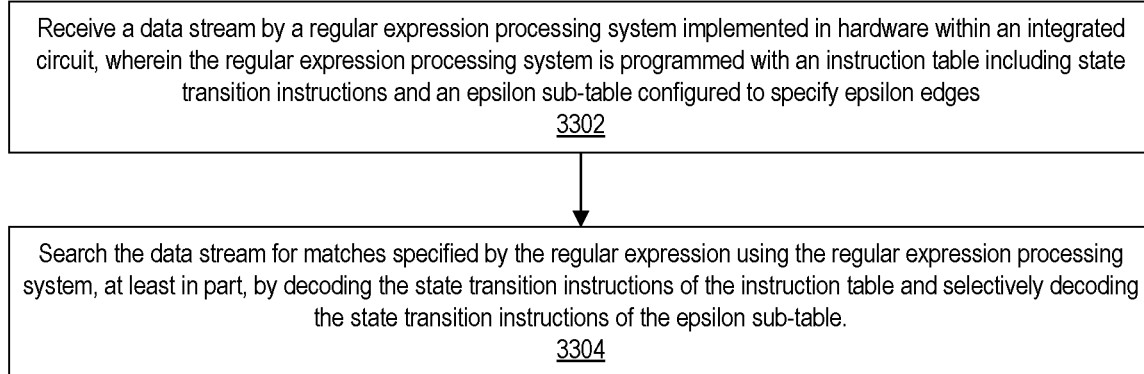
FIG. 33 illustrates certain operative features of a regular expression processing system adapted for tracking paths and path priorities.

FIG. 33 illustrates an example method 3300 of certain operative features of a regular expression processing system (system) such as the regular expression processing system 130 of FIG. 1 adapted for tracking paths and path priority.

In block 3302, the system receives a data stream. The system may be implemented in an IC 126. The system may be programmed with an instruction table 2200 including state transition instructions and an epsilon sub-table configured to specify epsilon edges. In block 3304, the system searches the data stream for matches specified by the regular expression using the regular expression processing system 130, at least in part, by decoding the state transition instructions of the instruction table 2200 and selectively decoding the state transition instructions of the epsilon sub-table.

The foregoing and other implementations can each optionally include one or more of the following features, alone or in combination. Some example implementations include all the following features in combination.

In one aspect, the method includes tracking a plurality of active paths for the regular expression and a priority for each active path while searching the data stream for the matches by, at least in part, ordering entries within one or more priority FIFO memories 2800 of the regular expression processing system 130 in decreasing order of priority.

In another aspect, the method includes, in response to detecting a match state for a selected active path of the plurality of active paths, discarding a selected number of entries of lower priority than the priority of the match state from at least one of the priority FIFO memories 2800.

In another aspect, the selected number of entries are discarded by, at least in part, incrementing a head pointer of the priority FIFO memory 2800 by the selected number of entries.

In one or more example implementations, a system includes a multi-port RAM, e.g., NRR memory 1102, configured to store an instruction table 2200, wherein the instruction table 2200 specifies a regular expression for application to a data stream. The system includes a regular expression engine (e.g., regular expression engine 1104 and/or regular expression engine 4150 described herein below) configured to process the data stream by tracking active paths for the regular expression and a priority of each active path while processing the data stream by, at least in part, storing entries corresponding to active states in a plurality of priority FIFO memories 2800 in decreasing priority order.

The foregoing and other implementations can each optionally include one or more of the following features, alone or in combination. Some example implementations include all the following features in combination.

In one aspect, the regular expression engine 1104, 4150 a decoder circuit configured to determine validity of active states output from the multi-port RAM. The plurality of priority FIFO memories operate concurrently, wherein each priority FIFO memory is configured to initiate a read from a different port of the multi-port RAM using an address formed of an active state output from the priority FIFO memory and a portion of the data stream. The regular expression engine 1104, 4150 includes switching circuitry configured to selectively route the active states from the decoder circuit to the plurality of priority FIFO memories according to the priority order.

In another aspect, in response to detecting a match state for a selected active path, the at least one of the plurality of priority FIFO memories continues storing the match state therein until each higher priority path has failed.

In another aspect, in response to detecting a match state for a selected active path, at least one of the priority FIFO memories 2800 is configured to discard each entry having a lower priority than the priority of the match state.

In another aspect, the entries are discarded by incrementing a head pointer of the priority FIFO memory 2800 by a selected number of entries.

In another aspect, the entries discarded from the at least one of the plurality of priority FIFO memories 2800 are contiguous entries and are discarded from a top of the at least one of the plurality of priority FIFO memories 2800.

In another aspect, the at least one of the plurality of priority FIFO memories 2800, in response to detecting the match state, enters a configuration operating state in which output of the at least one of the plurality of priority FIFO memories 2800 is invalid for a plurality of clock cycles.

In another aspect, in response to detecting the match state, the at least one of the plurality of priority FIFO memories 2800 is configured to write at least one of a new entry corresponding to an initial state or a new entry corresponding to a new active state.

In another aspect, in response to detecting a match state for a selected active path, at least one of the priority FIFO memories is configured to discard a selected number of entries having a lower priority than the priority of the match state. Each priority FIFO memory 2800 includes a FIFO memory 2802 having a data input port coupled to a data input signal, a switch 2804 coupled to the data input signal and an output of the FIFO memory 2802, and a register 2806 coupled to an output of the switch 2804, wherein an output of the register 2806 is an output of the priority FIFO memory 2800.

In another aspect, priority FIFO memory 2800 is configured to discard the selected number of entries by clearing contents of the register 2806, decrementing the selected number of entries by one, and incrementing a head pointer of the FIFO memory 2802 by the decremented number of entries.

In another aspect, each priority FIFO memory 2800 operates according to a state machine (e.g., FIGS. 29, 30) including an empty state, a one entry state, a two or more entries state, and a reconfiguration state, wherein the reconfiguration state includes a plurality of substates indicating a number of entries to be made during the reconfiguration state.

The regular expression language supports "capture groups" using the round bracket operator "()". A capture output is a portion of an input string being processed that matches a portion of the regular expression referred to as the "capture group", that is contained in the round bracket operator(s). Any non-overlapping portion of the input string that matches an expression inside the round brackets (e.g., the capture group), qualifies as a capture output for the capture group.

For purposes of illustration, consider the regular expression "a(.*)b" given an input string of "sdwefkafsdkwebewefjaefjafejb". In this example, the capture group is ".*" and the capture output is "fsdkwebewefjaefjafej" which corresponds to the characters received between the first occurrence of "a" and the second or last occurrence of "b". The capture output, in terms of the received data stream or string, may be referred to by way of the offset 7-27, where the first character of the capture output "f" has a starting position of "7" when starting from the first character having a starting position of 0. In specifying the last character of the capture output "j", the end position is specified as the location of the character+1, which is 27 in this example. The capture output is assigned a capture group identifier (ID), referred to as a "group identifier" or a "group ID" of 0 since there is only one capture group in the regular expression.

In another example, consider the regular expression "a(.*?)b" given the same input string "sdwefkafsdkwebewefjaefjafejb". In this example, the capture group is ".*?" and the capture output is "fsdkwe" corresponding to group ID 0, offset 7-13 and "efjafej" corresponding to group ID 0 and offset 20-27. Again, though there are two capture outputs, e.g., two instances of the capture group found in the input string, there is a single group ID deriving from the single capture group in the regular expression. As may be observed, the number of instances of each capture group in a given input string is not known ahead of time.

In another example, consider the regular expression "(abcd)|(ab)|(cef)", which includes the "OR" operator. In this example, since 3 different capture groups are specified, there are group IDs of 0 corresponding to the capture group "abcd", 1 corresponding to the capture group "ab", and 2 corresponding to the capture group "cef". Given an input string of "ejabcefheabcder", the capture output should be "ab" (group 1, offset 2-4), "cef" (group 2, offset 4-7), and "abcd" (group 0, offset 9-13).

In many CPU-based regular expression processing systems, generating correct output for certain regular expressions, e.g., those including the "OR" operator, may require backtracking on input data or multiple passes over the input data. Referring to the "(abcd)|(ab)|(cef)" example, the first capture output "ab" cannot be resolved in response to receiving the "b" character since the "c" character following the "b" character may be part of group 0 or the start of group 2. In this example, only when group 0 fails, can it be determined that the "c" is the start of group 2. Within CPU-based regular expression processing systems that perform capture, this type of processing relies on either backtracking or multiple passes on input data. In a non-CPU hardware implementation, both backtracking and multiple passes require significant hardware resources since data needs to be maintained as valid in buffers for longer periods of time and must be read multiple times.

In accordance with the inventive arrangements described within this disclosure, one or more example implementations are provided that are capable of concisely expressing capture rules on an NFA graph. The NFA graphs, with the capture rules annotated thereto, may be compiled and implemented in hardware, e.g., an IC. The hardware implementation provides parallel processing while consuming reduced resources than other conventional hardware-based regular expression processing systems capable of performing capture operations.

A regular expression may be converted into an NFA graph as previously described herein. The regular expression compiler 100 is capable of implementing capture functionality in the resulting hardware by augmenting, or annotating, the NFA graph 114 used for determining matches with additional information that may be used by the hardware to implement capture groups. This information may be carried forward by the regular expression compiler 100 to the HFA graph 118. For example, states of the HFA graph 118 may be annotated with "capture commands". As the capture-enabled hardware described herein processes, or enters, a marked state of the HFA graph 118, as implemented as an instruction table 2200 and a corresponding capture table to be described herein, the hardware is capable of decoding, or executing, the capture command for that state. The hardware is capable of maintaining one capture register per active path. If, for example, a capture group is encountered on that path, then, in response to determining a match completed successfully, the register contains position information for the capture output. The position information may include a start position, an end position, and a capture ID. In cases where the hardware encounters no capture commands for a given active path, the capture register values remain in a default state indicating a lack of, or no, capture group for the active state.

Table 1 below illustrates example capture commands that may be added to states of the NFA graph 114 and the HFA graph 118. The "effect when executed" in column 2 specifies the actions taken by a decoder circuit implemented in a capture engine portion of the hardware to be described herein in greater detail below. The decoder circuit may include a capture register that may be loaded with an offset entry. The decoder circuit acts on the contents of the capture register (e.g., an offset entry) by executing the capture commands. Each offset entry, to be described in greater detail hereinbelow, specifies a start position, an end position, and a group ID.

TABLE 1

| Capture Command | Effect when Executed |
| --- | --- |
| Reset (R) | SP = EP = Current, ID = N/A |
| Add (+) | EP = Current, Set ID |
| Shift ( -->) | SP = EP, EP = Current, Set ID |

In Table 1, "SP" stands for the "start position", "EP" stands for the "end position", and "ID" represents the group ID of the capture register. "Current" is the position of the current input character being processed within the input string. Though not specified in Table 1, a null or "blank" capture command may be specified that results in the contents of the capture register being left intact or unmodified.

Referring to Table 1, the reset command is used at the beginning of a capture group or for multiple capture groups started simultaneously. The reset command sets each of the start position and the end position to that of the current input character. The ID at this point is not determined. By setting the end position to equal the current input character, the add command extends the capture output, or range, to include the current input character without disturbing or changing the start position. The add command may be encountered one or more times on a given path. The ID is set to that of the capture group being completed and/or extended. The shift command moves the start position to the end position and then moves the end position to the current input character. The shift command is used only in cases of restarting capture groups. The shift command also sets the ID to that of the capture group being completed.

FIGS. 34-40 illustrate examples of HFA graphs annotated with capture commands as generated by the regular expression compiler 100 described herein.

Figure 34:
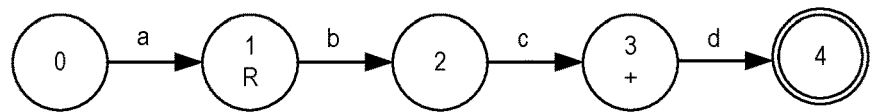
FIG. 34 illustrates an example of an HFA graph for a regular expression having one capture group.

FIG. 34 illustrates an example of an HFA graph for the regular expression "a(bc)d" having one capture group. In the example, the HFA graph is annotated with capture commands. As shown, state 0 is annotated with a reset command and state 3 is annotated with an add command. For purposes of illustration, consider the input string "abcd" as applied to the HFA graph of FIG. 34. When state 1 is reached after receiving an "a", the current input position is 1 having matched "a" at position 0. At state 1, the hardware executes the reset command, which sets the start position SP and the end position EP both to 1. After matching characters "b" and "c", the hardware is on state 3 at input position 3. The add command is executed to set the EP to 3 and the ID to 0 and leaves the SP at 1.

Figure 35:
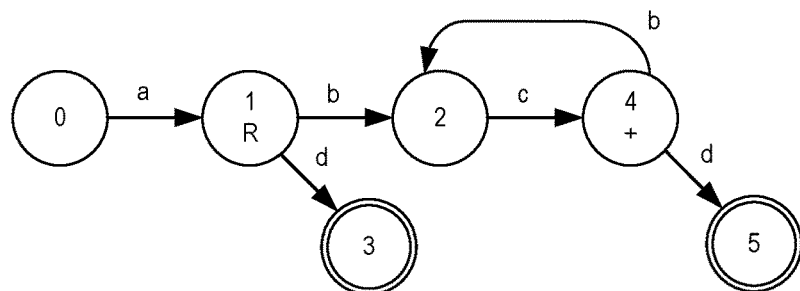
FIG. 35 illustrates another example of an HFA graph for a regular expression having one capture group.

FIG. 35 illustrates an example of an HFA graph for the regular expression "a((?:bc)*)d" having one capture group. The HFA graph is annotated with capture commands. The example of FIG. 35 demonstrates the repeated application of the add command. The "(?:)" operator, per the regular expression language, has no functionality beyond grouping and is not a capture group in this example. This regular expression matches an "a" followed by 0 or more "bc" followed by "d".

For purposes of illustration, the hardware may be provided with the input string "abcbcd". At state 1, by execution of the reset command, SP and EP are set to 1, which is the position of the first "b". After processing input characters "b" and "c", the hardware is at state 4, where through execution of the add command, the EP is set to 3 and the ID to 0. Another "bc" input sends the engine back through states 2 and 4 again. Arriving at state 4 again and through a second execution of the add command, EP is set to 5, which adds to the range of the capture output. With input "d", the hardware reaches state 5, which is a match state. In response to reaching the match state, the hardware has determined position information specifying the capture output with reference to the received string as SP=1, EP=5, and ID=0. The hardware may parse the input string using the position information to provide the capture output.

Referring again to the example of FIG. 35, if a different input string of "ad" is received, the hardware does not encounter the add command at state 4. Instead, at state 1, through execution of the reset command, SP and EP are set to 1 as before. The match completes, however, at state 3. In this example, the final state for the capture group is SP=1, EP=1, and ID being undefined. A host application in communication with the hardware is configured to interpret this state, e.g., where EP-SP=0, as an empty-capture where no ID is used.

Figure 36:
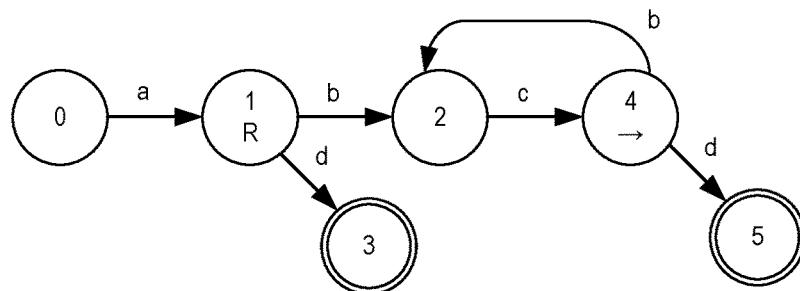
FIG. 36 illustrates another example of an HFA graph for a regular expression having one capture group.

FIG. 36 illustrates an example of an HFA graph for the regular expression "a(bc)*d" having one capture group. The HFA graph is annotated with capture commands. The example of FIG. 36 illustrates the shift command. In the example of FIG. 36, the capture group is repeatedly restarted. For example, in the regular expression "a(bc)*d", the "*" quantifier causes the capture group to repeat.

The HFA graph of FIG. 36 is the same as the HFA graph of FIG. 35, with the exception that state 4 has a shift command instead of an add command. For the input "abcbcd" provided to the hardware, as before, upon reaching state 1, SP and EP are set to 1 corresponding to the position of the first "b". After processing the additional characters "bc" the hardware is at state 4 where the shift command sets SP to the current value of EP, which is 1, sets EP to 3, and sets the ID to 0. After the second "bc", the hardware is again at state 4 where the shift command sets SP to the current value of EP which is 3, sets EP to 5, and maintains the ID at 0. In executing the shift command the second time, the capture of the first "bc" has been replaced with the position information for the second "bc" in the input string. The final "d" input ends the match successfully at state 5. The position information determined for the capture group is SP=3, EP=5, and ID=0.

Figure 37:
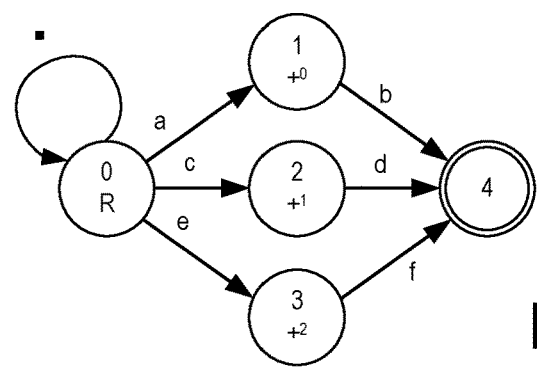
FIG. 37 illustrates an example of an HFA graph for a regular expression having a plurality of capture groups.

FIG. 37 illustrates an example of an HFA graph for the regular expression ".*?(?:(a)b|(c)d|(e))f". The regular expression ".*?(?:(a)b|(c)d|(e))f" includes 3 capture groups. The HFA graph is annotated with capture commands. In accordance with the inventive arrangements described herein, the ID for a capture group is not assigned until the end of the capture. FIG. 37 illustrates the practicality of this technique.

For an input of "cd", the matching path through the HFA graph is state 0 to state 2, to state 4. At state 0, through execution of the reset command, SP and EP are set to 0 and the ID remains unspecified. At state 2, through execution of the add command, EP is set to 1 and ID is set to 1 for the second capture group. Within the figures, the superscripted numbers after the commands (e.g., + in this example) indicate the ID to be set.

In the example of FIG. 37, all three capture groups begin at state 0. Also, state 0 starts a loop for matching any character. This loop, or self-edge, at the start of the regular expression is typical for regular expressions that do "partial matching". Partial matching refers to a matching process that skips over irrelevant input characters until the start of a desired pattern is found. Leaving the group ID ambiguous until the end of the capture allows the start state to be shared among the capture groups. Without this approach, the state would need to be split with epsilons. Because epsilon paths require more resources to implement in hardware, and because every input character will cause multiple epsilon paths to be executed, sharing the capture start state improves the efficiency of the search and resulting hardware implementation.

The following description details adaptations to elements of the regular expression compiler 100 to support capture groups. The adaptations may be applied to the parser 108, the NFA builder 112 and to the HFA builder 118 to generate an HFA graph 118 annotated with the capture commands as described in connection with FIGS. 34-37. Further, the NFA graph 114 and HFA graph 118, both being implemented as data structures, may be adapted so that states and/or edges may specify the capture information.

With respect to states and edges of the NFA graph 114 and HFA graph 118, a capture tuple is added. The capture tuple includes a capture command and a group ID. The capture command may be one of the 3 capture commands of Table 1 or left blank to indicate no capture command. The group ID may be "NoID" to indicate an unspecified ID.

In one aspect, the parser 108 is adapted to generate a capture group operator. The capture group operator is used to indicate, to the NFA builder 112, which syntax nodes 110 (e.g., NFA fragments) are to be included in a capture group. In one aspect, the standard shunting-yard algorithm can be modified to produce and process the capture group operator by inserting the capture group operator in the token stream after processing the close parenthesis indicating the end of a capture sub-expression.

In an example implementation, the process used by the NFA builder 112, which is illustrated in Example 1 above, may be adapted to include the pseudo code from Example 11 below.

Example 11

```
case CaptureGroup:
    arg=fragStack.pop( )
    if arg.startState.hasInboundEdges( )
        arg.split( )
    arg.startState.capture={Reset, NoID}
    id=getUnusedCaptureId( )
    for each edge in arg.end
        Edges edge.capture={Add, id}
        if edge.isPlaceholder( )AND edge.from.capture.
           command==Blank
           edge.from.capture=edge.capture
    fragStack.push(arg)
```

Referring to Example 11, the NFA builder 112 is capable of operating on a fragment by setting the start state of the fragment to contain a reset command and all fragment edges to an add command with the ID set to a unique integer. The NFA builder 112 may begin by splitting, via a split operation, the fragment start state if the fragment start state has any inbound edges. Inbound edges indicate a loop of some sort as may be produced by a quantifier such as, for example, "*", "+", etc. The split operation is used because the capture group should be started only for the first time entering the loop (as the entire loop is enclosed in a capture group). A separate state is needed to start the capture group as being distinct from a loop return point, hence the split operation. The new start state serves as the entry point into the capture group with the reset command. The original state is the loop return point.

Next, regular expression compiler 100 marks each edge with the add command and the ID (e.g., group ID) for the capture group. The group ID is assigned the next available integer starting from 0. The capture information annotated on edges does not propagate to the hardware directly. Rather, the capture information on edges propagates to states during fragment building as performed by the NFA builder 112. In terms of capture information propagation for edges, as a special case, the regular expression compiler 100 immediately propagates capture information on placeholder edges to the source state of the placeholder edge if the source state does not already have a capture command. The regular expression compiler 100 then pushes the capture-marked fragment back onto the fragment stack.

The patch operation may be updated to support capture. With the ability to annotate the edges of a fragment with one or more capture group ends (e.g., add commands), during the patching operation, the NFA builder 112 may need to split the target state in multiple ways so that each copy can be assigned a separate group ID.

Figure 38:
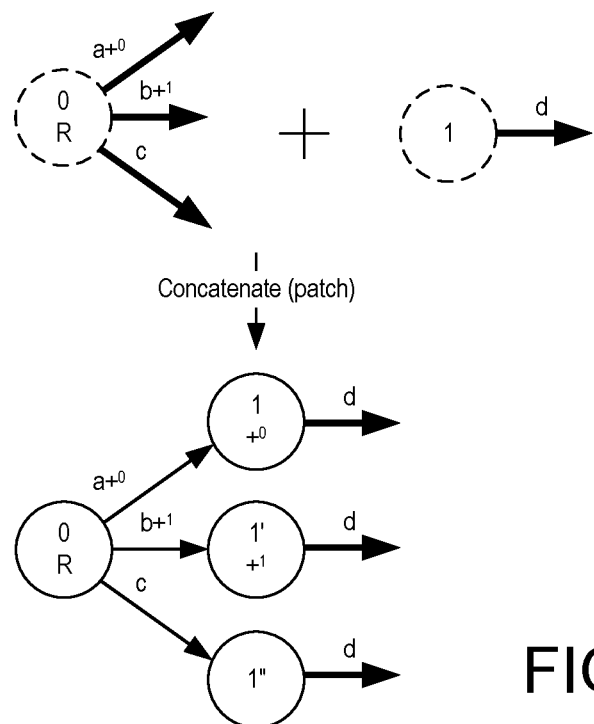
FIG. 38 illustrates an example of a patch operation as performed by a regular expression compiler.

FIG. 38 illustrates an example of a patch operation as performed by the NFA builder 112 supporting capture. In the example, the NFA builder 112 is building the expression "(?:(a)|(b)|c)d", which includes 2 capture groups corresponding to "a" and "b". The regular expression also has a non-capture path "c". Each of the paths leads to a same target node "d". In this example, to propagate the capture information, the target node "d" must be split three ways to accommodate all path endings separately. In the example, for hardware efficiency, the "c" path creates an empty capture.

In another aspect, the regular expression compiler 100 may split the target state if the target state has an inbound edge. An example where the target state includes an inbound edges is for the regular expression "(?:(a)|(b)|c)d*e".

The patch examples above including FIG. 38 illustrate non-loop cases wherein the patch to the target state is in the "forward" direction from the fragment to a state not in that fragment.

Figure 39:
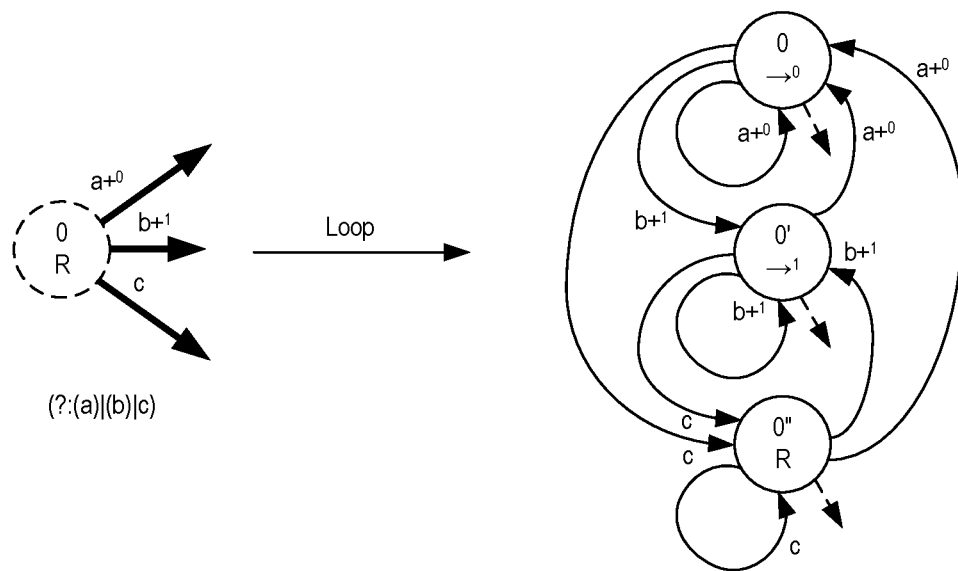
FIG. 39 illustrates an example of a loop case with the target state within a fragment as processed by a regular expression compiler.

FIG. 39 illustrates an example of a loop case with the target state within the fragment. The example of FIG. 39 illustrates the loop case in building the fragment corresponding to the regular expression "(?:(a)|(b)|c)*". The original goal of the star operator was to add a placeholder edge to the fragment start state (dashed line state) and loop all the fragment edges shown in bold on the left to the start state. In the example of FIG. 39, since there are three different edge types (ID=0, ID=1, ID=none), the regular expression compiler 100 creates three copies of the target state 0. Each copy has duplicates of edges "a", "b", and "c". All 9 edges are looped back to the now-duplicated start state in the graph on the right so that each edge connects to the state whose group ID matches the edge's group ID. The state 0" is the fragment start and the placeholder edges, which have also been duplicated, are the exit from the loop.

Example 12 provides pseudo code illustrating the path operation supporting loop and non-loop target splitting that may be performed by the regular expression compiler 100.

Example 12

```
patch(edges, targetState, isLoop)
  capEndDestStates = {}
  normDestState = targetState
  if isLoop
    foreach id in getIds(edges)
      if id == NoCaptureId
        continue
      capEndDestStates[id] = normDestState
      normDestState = normDestState.split( )
  else
    skipNormalState = !targetState.hasInboundNonEndEdge( ) AND
      !hasNonCapEdge(edges)
    curDestState = targetState
    for each id in getIds(edges)
      if id == NoCaptureId
        continue
      if skipNormalState
        capEndDestStates[id] = curDestState
        skipNormalState = false
      else
        capEndDestStates[id] = curDestState.split( )
        curDestState = capEndDestStates[id]
    capEndDestStates[NoCaptureId] = normDestState
  foreach e in edges
    if !e.isPlaceholder( )
      e.to = capEndDestStates[getId(e)]
      capEndDestStates[getId(e)].setCapture(e, isLoop)
  foreach e in edges
    if e.isPlaceholder( )
      targetState = capEndDestStates[getId(e)]
      if targetState.hasInboundEdges( )
        targetState = targetState.split( )
      e.from.mergeCaptureInfo(targetState)
      e.from.edges += targetState.edges.clone( )
```

Example 12

```
      capEndDestStates[getId(e)].setCapture(e, isLoop)
      edges.remove(e)
      if (targetState.isMatch)
        e.from.isMatch = true
```

In Example 12, an "isLoop" argument is added. The argument is set to true when called from a loop operator (e.g., star, plus) and set to false for straight-line patches (e.g., concatenation, OR). The argument determines how the target state is duplicated into multiple target states and stored in capEndDestStates, a map from group ID to target state copy.

For loop patches, the regular expression compiler 100 uses the newest state of the multiple splits to serve as the target for "normal" (non-capture end) edges. The split operation of Example 3 produced two states with identical outbound edges, but was not symmetric in that for a state with inbound edges, the new state created by the split operation had no inbound edges while the original (old) state retained the inbound edges. As such, the new state served as the first entry to the loop while the old state served as the return point for another round of the loop.

Returning to Example 12, the regular expression compiler 100 is capable of iterating through each of the unique group IDs found in the "edges" set. The normal edge case is skipped as the non-capture edges are handled outside the loop. Each time a new target state is needed for a unique group ID, the targetState is split and the old state is assigned to the group ID and the new state is assigned to the normDestState pointer. Accordingly, the new state generated by a split operation is split repeatedly until no more states are needed at which point normDestState points to the newest of all split states and is assigned to the "no capture ID" case.

For non-loop patches operations, the oldest of the split states will become the "no capture ID" case, if there is one, if not skipped. A "no capture ID" targetState copy is needed if either (1) the targetState has any inbound edges without capture ends (e.g., the state would need to remain free of capture commands), or (2) there are "no capture ID" edges amongst the "edges" set. If neither of these conditions are true, the regular expression compiler 100 may skip creating a target state for the "no capture ID" case. In that case, the state that would have been created for that case can be assigned to a different group ID. The regular expression compiler 100 iterates over the set of capture IDs found among "edges" as in the loop patch case, splitting targetState as needed. The "no capture ID" case is skipped as that case is handled after the loop. In skipping the "no capture ID" case, the regular expression compiler 100 can assign the original targetState to the first capture ID. Otherwise, the regular expression compiler 100 splits the state, assigning the new state to the group ID and preparing to split that new state if another target state for the next time through the loop is needed.

After the set of target states is produced for each group ID, the regular expression compiler 100 connects the edges to the states of the set according to group ID. The regular expression compiler 100 makes the connections by first connecting the non-placeholder edges and then the placeholder edges. During edge connection, the regular expression compiler 100 transfers the capture information stored on the edge to the destination state as represented by the setCapture(edge, isLoop) function.

Table 2 shows the result of applying each possibility of edge capture information to a state already containing each possibility of state capture information. The result replaces the state's capture information.

TABLE 2

| | State | | | |
|---|---|---|---|---|
| Edge | Blank | Reset | Add | Shift |
| Blank | Blank | Reset | Error | Error |
| Add | Add, with edge's IDs | If loop: Shift Else: Error | Add | Shift |

In the case of placeholder edges, as targetState is being merged together with the edge's source state (e.from), the regular expression compiler 100 blends the capture info of targetState and edge source state. Table 3 illustrates the result of such blending, which is applied to the edge's source state. In the example of Table 3, "original" refers to the state receiving the new capture information (the edge's source), while "incoming" refers to the state contributing new capture information (targetState).

TABLE 3

| | Original | | | |
|---|---|---|---|---|
| incoming | Blank | Reset | Add | Shift |
| Blank | Blank | Reset | Error | Error |
| Reset | Reset | Reset* | Reset* | Reset* |
| Add | Add | Add** | Add** | Add** |
| Shift | Shift | Shift** | Shift** | Shift** |

In the example of Table 3, "*" indicates the capture command may override the previous group ID in the same path since the hardware supports only one capture per path. The "**" indicates that the result is performed only if the group ID is the same for both states, otherwise an error is generated.

The HFA builder 116 is capable of supporting capture groups and may be adjusted with respect to generation of new HFA states given a list of NFA states. Similar to the case with the match-or-continue scenario, an HFA state may need to be split into a complex involving a master state, one or more normal substates, and zero or one pure match states. For capture groups, each unique group ID (including the "no group ID" case) will need one HFA state. If any NFA state is a match state, a pure match state is needed. If the final count of all these states is greater than one, the HFA will be created as a complex.

Figure 40:
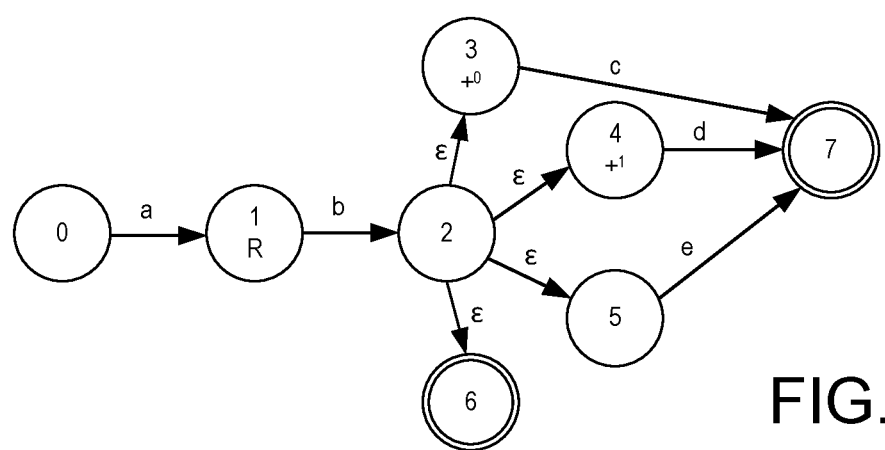
FIG. 40 illustrates an example of an HFA generated by a regular expression compiler.

FIG. 40 illustrates an example of an HFA generated by HFA builder 116. The example of FIG. 40 corresponds to the regular expression "a(?:(b)c|(b)d|be|b)", which includes two capture groups, a no group ID, and a match state. In the example, the regular expression contains four alternatives each having a common prefix "b". Since each alternative has a different ending after the common portion, a 4-way state complex is needed for which each alternative has a dedicated complex sub-state (states 3 through 6). The first two alternatives, "(b)c" and "(b)d", have capture groups which are assigned group IDs 0 and 1, respectively. Accordingly, the states 3 and 4 have capture add commands for their IDs. The third alternative "be" has no capture group and, as such, state 5 has no capture command. The final alternative "b" is a prefix of the others, meaning that alternative "b" is a match-or-continue scenario. That is, if the "b" alternative matches, the regular expression completes at that point. Otherwise, the regular expression continues to match additional characters for other alternatives.

Figure 41:
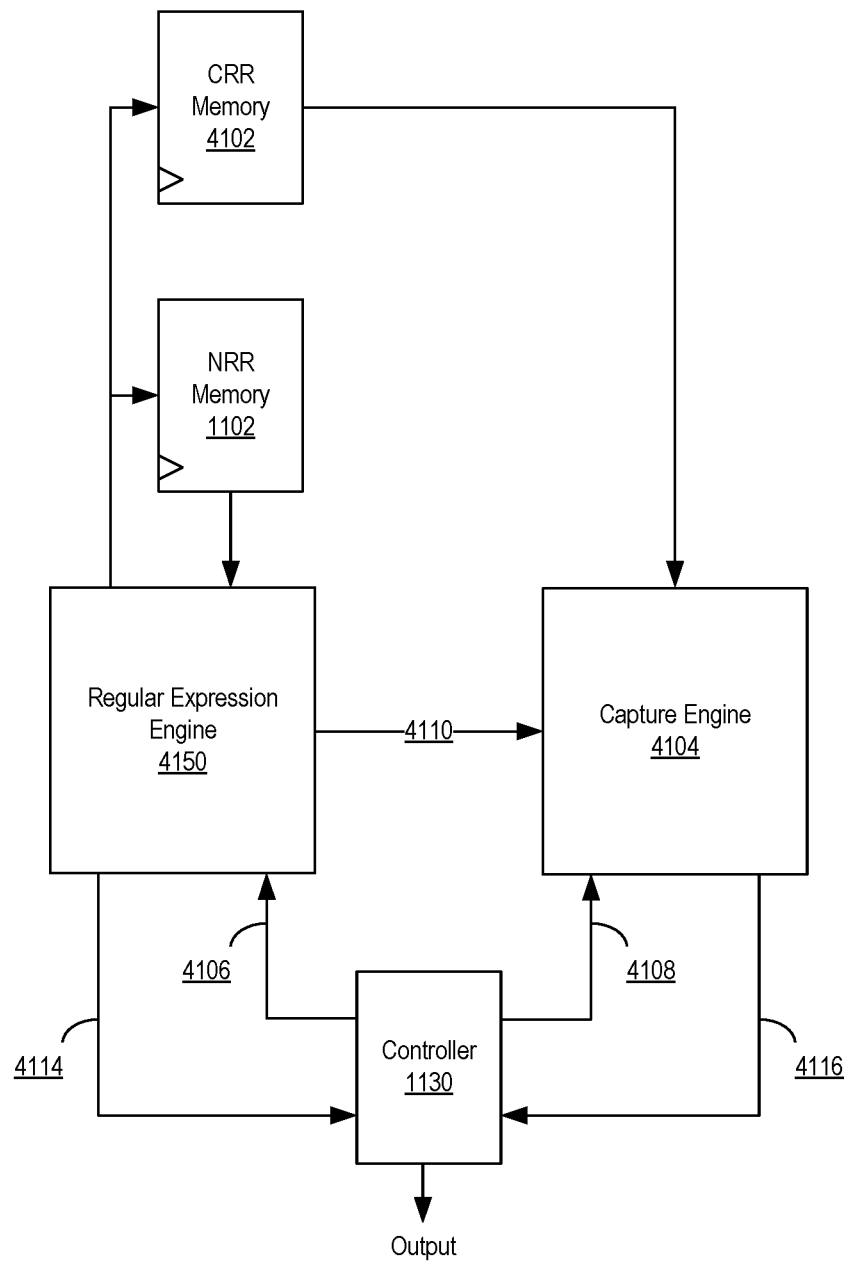
FIG. 41 illustrates an example architecture for a regular expression processing system.

FIG. 41 illustrates another example architecture for a regular expression processing system 130. In the example of FIG. 41, the regular expression processing system 130 implements two distinct data paths that operate in parallel and in coordination with one another. The first data path is implemented by one or more regular expression engines 4150. Each regular expression engine 4150 may be implemented substantially as previously described in connection with FIGS. 11 and 14. In the example of FIG. 41, however, the active states memories are replaced with the priority FIFO memories 2800 as described in connection with FIG. 28. Other updates to the regular expression engines 4150 are described in connection with FIG. 42. The second data path is implemented by one or more capture engines 4104. The capture engines 4104 are described in greater detail in connection with FIG. 43.

In the example, the regular expression engine 4150 operates as a master to capture engine 4104 in that one or more control signals are generated by regular expression engine 4150 and provided to capture engine 4104. The regular expression engine 4150 may operate as previously described albeit with the priority FIFO memories 2800 to support priority tracking. Capture engine 4104 provides support for implementing capture. In the example, controller 1130 is capable of providing control signals 4106 to regular expression engine 4150 and providing control signals 4108 to capture engine 4104 to control, at least in part, operation of each respective engine. Further, regular expression engine 4150 is capable of providing control signals 4110 to capture engine 4104. In one aspect, control signals 4110 may be output from decoder 1106 of regular expression engine 4150. The control signals 4110, for example, may be used to control operation of certain switching circuitry (e.g., multiplexers) implemented within capture engine 4104 so that certain aspects of operation of regular expression engine 4150 and capture engine 4104 are synchronized.

As pictured, a capture rule register (CRR) memory 4102 is included. CRR memory 4102 is coupled to capture engine 4104. CRR memory 4102 may store a capture table therein that is used to drive operation of capture engine 4104. An example of a capture table is illustrated in Example 13 below. In one aspect, instructions may be looked up from CRR memory 4102 using one or more states determined by regular expression engine 4150 that are output to both CRR memory 4102 and NRR memory 1102. While in general, NRR memory 1102 may receive input characters along with states to be used as addresses, CRR memory 4102 need only receive states to be used as addresses to perform lookup (e.g., read) operations.

In the example, output from regular expression engine 4150 may be provided to controller 1130 via signals 4114. Controller 1130, for example, is capable of detecting whether any received outputs from regular expression engine 4150 are match states and/or end of string conditions. Similarly, capture engine 4104 is capable of providing output to controller 1130 by way of signals 4116. Whereas the output of regular expression engine 4150 are states, the output of capture engine 4104 is position information corresponding to states output from regular expression engine 4150. The position information may specify the location of capture output within the input string being processed by regular expression engine 4150 in the case of a match condition. As previously discussed, the position information may specify a start position, an end position, and a group ID for each of a plurality of different captures.

Example 13 illustrates an example of a capture table that may be stored in CRR memory 4102. In Example 13, the capture table may be generated with, or as part of (e.g., an extension of), the instruction table 2200 of FIG. 22 by the NRR generator 120 of FIG. 1. The capture table illustrated in Example 13 is for the example HFA graph of FIG. 34.

Example 13 (Capture Table)

| Address | Instruction | |
|---|---|---|
| State | Group Identifier | Capture Command |
| 0 | 0 × 3 (Ignored) | 0 (No Command) |
| 1 | 0 × 3 (Ignored) | 0 × A (Reset) |
| 2 | 0 × 3 (Ignored) | 0 (No Command) |
| 3 | 0 × 00 (ID = 0) | 0 × 9 (Add) |
| 4 | 0 × 3 (Ignored) | 0 (No Command) |

The capture table of Example 13 includes a plurality of capture entries. Each capture entry includes an address portion and an instruction portion. The address portion, or index, is the state number alone unlike FIG. 10, which uses {input character, state number}. The instruction portion is formed of two fields: a group ID and a capture command. In accordance with Example 13, the capture commands may be encoded as follows:
Blank: 0x0
Reset: 0xA
Add: 0x9
Shift: 0xB It should be appreciated that the capture commands may be encoded using other techniques and the examples provided are for purposes of illustration only. The group ID may be specified as a 2-bit value. In the example, for any situation in which the capture ID is not needed, the NRR Generator 120 sets the group ID to the maximum value which is 0x3 in Example 13. It should be appreciated that any value may be designated as an "ignore" value and the use of the maximum value is for purposes of illustration. The group ID is used for the Add capture command and the Shift capture command, but not for "Blank" or the Reset capture command.

Referring to the example of FIG. 34, one can see that states 0, 2, and 4 do not have capture commands. Correspondingly, the rows in the table for states 0, 2, and 4 have a "Blank" command and an arbitrary value for the group ID, which is ignored. State 1 in FIG. 34 has a Reset command. Correspondingly, the row corresponding to state 1 in Example 13 has a reset command and an arbitrary value for the group ID, which is ignored. State 3 in FIG. 34 has an Add command. Correspondingly, the row for state 3 in Example 13 has an Add command and the group ID is set to 0.

Figure 42:
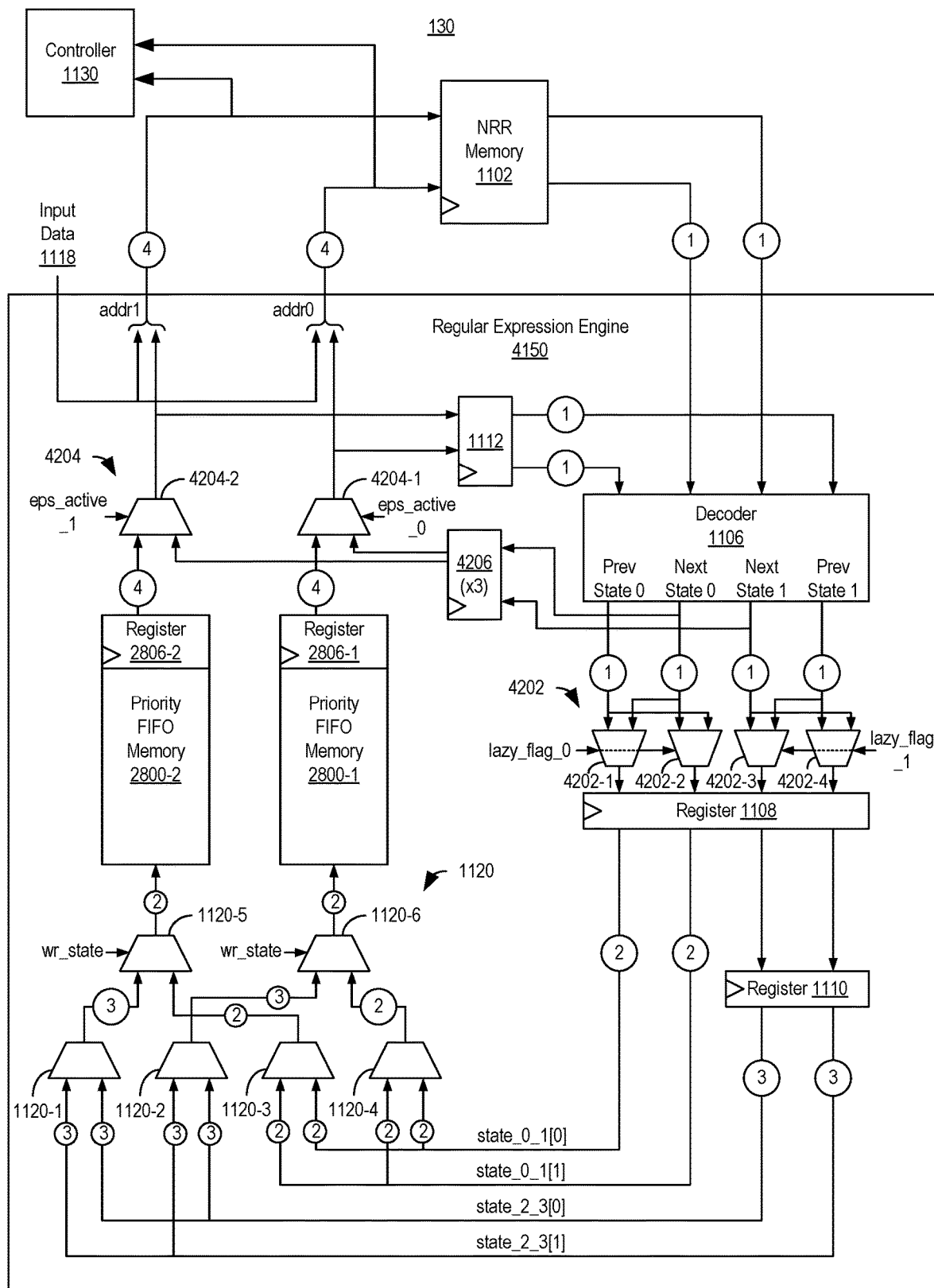
FIG. 42 illustrates an example implementation of the regular expression engine of FIG. 41.

FIG. 42 illustrates an example implementation of the regular expression engine 4150 of FIG. 41. In the example of FIGS. 41 and 42, the active states memories are replaced with the priority FIFO memories 2800 of FIG. 28, though the priority FIFO memories 2800 still store active states. The regular expression engine 4150 is also updated to include additional switching circuitry 4202 and 4204. Further, a plurality of registers 4206, e.g., 3, are included that couple the output of decoder 1106 (e.g., the next state 0 and next state 1) to switching circuitry 4204 to implement the epsilon operating mode.

In one aspect, the example circuit architecture of FIG. 42 may be used to implement the regular expression processing system 130 that is capable of tracking path priorities as previously described herein. In cases where capture is not required, for example, regular expression engines 4150 may be used to replace regular expression engines 1104 in the examples of FIGS. 11 and 14 to implement a regular expression processing system 130 capable of tracking paths and path priorities.

In the example, as data is output from the instruction table 2200 of FIG. 22 stored in NRR memory 1102, the next states, DIFF, and EPS data is output to decoder 1106. In the example, the EPS data is used as the control signal to switching circuitry 4204. That is, in response to the epsilon flag being set in the instruction table 2200, the signal provided to switching circuitry 4204 (e.g., multiplexers), causes each of switches 4204-1 and 4204-2 to pass the output taken directly from decoder 1106 rather than take output from the priority FIFO memories 2800. This implements processing of the epsilon sub-table (e.g., epsilon processing) within instruction table 2200. While processing the entries of the epsilon sub-table, regular expression engine 4150 does not accept a new input character for processing. Rather, the same input character is used along with the output of each of switches 4204-1 and 4204-2 to provide addresses addr0 and addr1 to NRR memory 1102. In the example of FIG. 42, the eps_active control signals may be provided by decoder 1106.

For example, while performing epsilon processing, the circular path that is executed is from decoder 1106, to registers 4206, to switching circuitry 4204, to performing a lookup in NRR memory 1102, to decoder 1106, and so forth. This cycle continues until decoder 1106 detects the end of the epsilon sub-table, which is when the eps_active flag is de-asserted and switching circuitry 4204 resumes reading states from priority FIFO memories 2800.

In the example, to compensate for the path delay when output from decoder 1106 is passed by switching circuitry 4204, three registers may be added (shown as 4206) that account for the registers 1108, 1110, and 2806 that were bypassed to maintain timing. Within this disclosure, the switching circuitry 4204 may be referred to as the epsilon (EPS) switching circuitry or multiplexers, while the switching circuitry 4202 may be referred to as the lazy switching circuitry or multiplexers.

The switching circuitry 4202, formed of switches 4202-1, 4202-2, 4202-3, and 4202-4 (e.g., multiplexers), is capable of implementing path priority processing. That is, the lazy flag used to control each of switches 4202 is dictated by the state of the DIFF output of instruction table 2200 from NRR memory 1102. Depending on the state of the lazy flag, for example, the previous state or next state is permitted to flow into the priority FIFO memories 2800 first. In the example of FIG. 42, the lazy_flag control signals may be generated by decoder 1106.

While operation of the eps_active signal and the lazy_flag signal are generally described, it should be appreciated that each of the "_0" and "_1" versions of the signals operate in the same manner albeit independently of the other to support the concurrent and independent lookup operations supported by the dual-port CRR memory 4102 and the dual-port NRR memory 1102.

In processing priorities of active state, priority FIFO memory 2800-1 is considered of higher priority than priority FIFO memory 2800-2. This means that for a given entry number, e.g., entry 1, that entry 1 in priority FIFO memory 2800-1 is of higher priority than entry 1 in priority FIFO memory 2800-2. In this regard, load balancing is varied somewhat from the scheme described previously. Still, the restrictions that the difference in number of entries between the two priority FIFO memories 2800 be 1 or 0 is maintained. Switches 4202 ensure that the higher priority active state of a set of two active states is provided or routed to priority FIFO memory 2800-1, while the lower priority state of the pair is routed to priority FIFO memory 2800-2.

Figure 43:
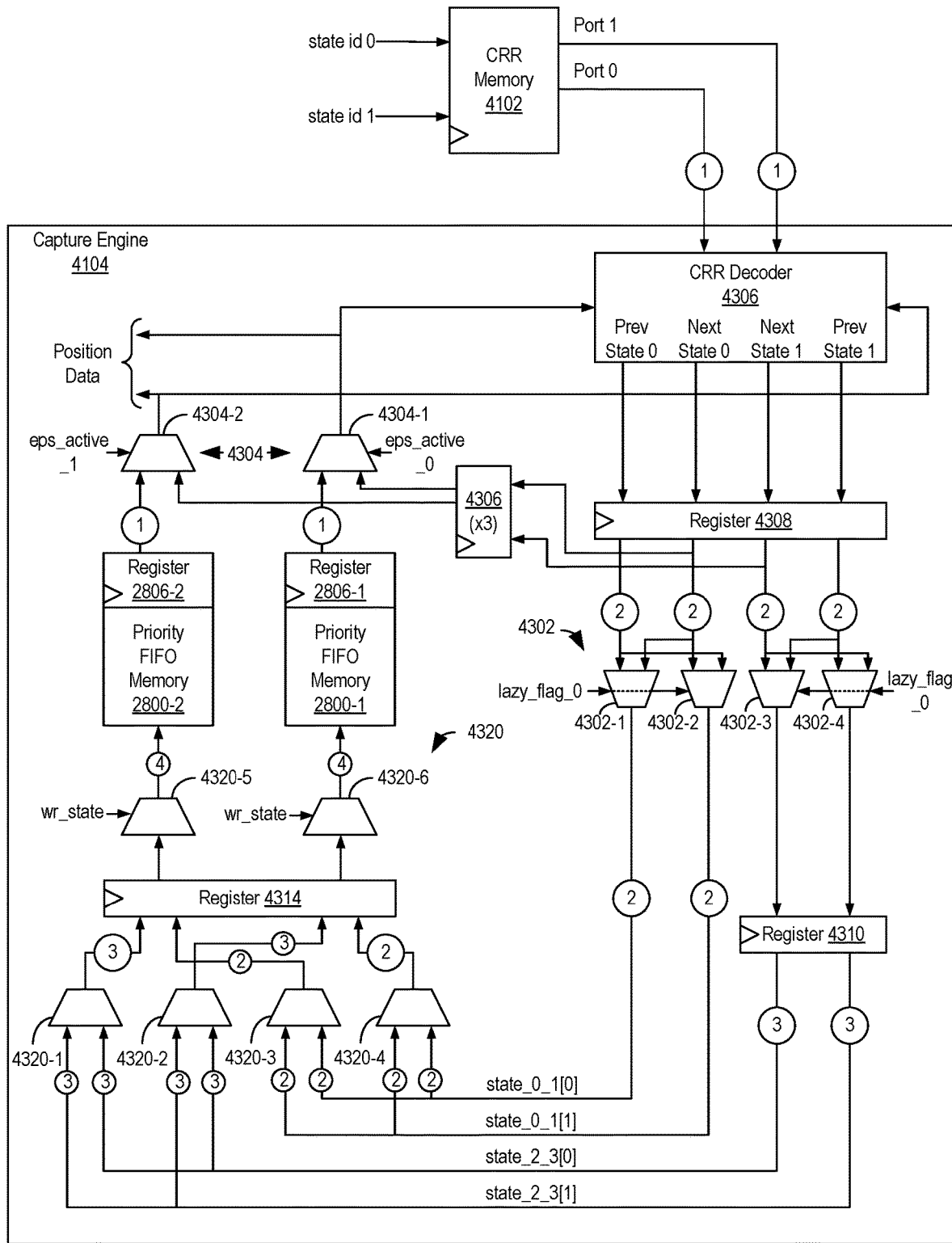
FIG. 43 illustrates an example implementation of the capture engine of FIG. 41.

FIG. 43 illustrates an example implementation of the capture engine 4104 of FIG. 41. In the example of FIG. 43, the data path that is implemented is similar to the data path described in connection with regular expression engine 4150. In this regard, certain components illustrated in FIG. 42 function similar to corresponding components in FIG. 43. For example, switching circuitry 1120, 4202, and 4204 corresponds to switching circuitry 4320, 4202, and 4204, respectively, and operates similar thereto. The registers 4206 correspond to registers 4306 (e.g., 3 serial registers). Registers 4308, 4310, and 4314 regulate the data path. Register 4310, for example, delays a set of data so that the priority FIFO memories 2800 may each write one value on each clock cycle (e.g., 4 values every 2 clock cycles as previously described). Whereas the regular expression engine 4150 tracks active states, paths, and priorities to determine whether matches are determined, the capture engine 4104 tracks position information for the active states. Capture engine 4104 further is capable of operating in a synchronized manner with regular expression engine 4150 to perform capture group processing.

In the example of FIG. 43, the various control signals such as eps_active and lazy_flag control signals may be provided from decoder circuit 1106 of regular expression engine 4150 (e.g., control signals 4110). The control signals provided to switches 4320 may be provided from controller 1130 and may implement the same routing as implemented in regular expression engine 4150. That is, the position information tracked by capture engine 4104 for a given active state may be routed to the same priority FIFO memory (e.g., either the −1 or −2 instance) as the active state to which the position information in the regular expression engine 4150 corresponds.

The CRR memory 4102 may be implemented as a multi-port RAM as previously described. In the example of FIG. 43, the CRR memory 4102 is implemented as a dual-port RAM as described in connection with NRR memory 1102. CRR memory 4102 stores a capture table.

In the example of FIG. 43, the switching circuitry 4204 outputs an active state that is also provided to the CRR memory 4102 as "state id 0" and "state id 1" specifying states or pointers that may be used to lookup instructions. In response to receiving the state information from the regular expression engine 4150, CRR memory 4102 outputs an instruction including a capture command (which may be blank) and a group ID to CRR decoder 4306.

CRR decoder 4306 is capable of creating and modifying offset entries. That is, in the example of FIG. 43, the priority FIFO memories 2800 are used to store offset entries specifying the position information as opposed to active states or state data. Accordingly, the priority FIFO memories 2800 used in capture engine 4104 may be referred to as "capture FIFO memories". Each offset entry may correspond to a particular active state that is stored in the priority FIFO memories 2800 of regular expression engine 4150. The offset entry specifies position information for any active state and, as such, capture output that corresponds to the active state. As noted, each offset entry, for example, specifies a start position, an end position, and a group ID.

The CRR decoder 4306 receives offset entries from the priority FIFO memories 2800 and processes the received offset entries based on the instructions provided from CRR memory 4102. For example, for a given offset entry received in the −1 data path, the CRR decoder 4306 processes the offset entry using the instruction received on the corresponding port of CRR memory 4102. The instruction includes the capture command that is decoded for the offset entry. The CRR decoder 4306 updates the start position, the end position, and/or the group ID of the offset entry in accordance with the capture command. The group ID, for example, may be modified or kept the same (e.g., remain unchanged) based on the capture command from the capture table (e.g., as depicted in Example 13).

The capture engine 4104 is capable of implementing an epsilon operating mode akin to the epsilon operating mode of the regular expression engine 4150. For example, in response to the control signal eps_active being set, epsilon operating mode is activated. The eps_active control signals may be set independently for each of switches 4304-1 and 4304-2 due to the dual-port nature of NRR memory 1102. In response to the eps_active control signal being set, switch 4304-1 and/or 4304-2 outputs the offset entr(ies) from register 4308 via register 4306 directly to CRR decoder 4306. In the epsilon operating mode in the regular expression engine 4150, active states output from the decoder circuit 1106 are processed without pulling active states from the priority FIFO memories 2800. Similarly, in the capture engine 4104, offset entries from the CRR decoder 4306 are processed without having to pull offset entries from the priority FIFO memories 2800.

The lazy switching circuitry 4302 implements the priority processing for offset entries as described in connection with the switching circuitry 4202 of regular expression engine 4150. Similarly, switching circuitry 4320 implements the same load balancing described in connection with the regular expression engine 4150. It should be appreciated that, for example, if a given active state is routed to a particular priority FIFO memory 2800 of the regular expression engine 4150, the offset entry corresponding to, or paired with, the active state will be routed to the same or corresponding FIFO memory 2800 in capture engine 4104. For example, if the active state is routed to the priority FIFO memory 2800-1 in the regular expression engine 4150, the offset entry corresponding to the active state will be routed to the priority FIFO memory 2800-1 in the capture engine 4104.

In the epsilon operating mode, while no reads are occurring from the priority FIFO memories 2800 of either the regular expression engine 4150 and the capture engine 4104, new active states are being generated (along with corresponding offset entries) that are stored in the priority FIFO memories 2800 of the regular expression engine 4150 and the capture engine 4104. As noted, in the epsilon operating mode, the regular expression engine 4150 does not consume new characters from the input data stream. Rather, the regular expression engine 4150 performs sequential lookup operations without consuming an input character to move through the epsilon sub-table of the instruction table 2200.

In the example of FIG. 43, stages 1, 2, 3, and 4 are shifted relative to the corresponding stages of the regular expression engine 4150. That is, similar portions of the data path of the regular expression engine 4150 are offset with respect to those of capture engine 4104 to improve overall timing of the regular expression processing system 130. Thus, while the regular expression engine 4150 and the 4104 operate in a synchronized manner, the timing of the data path implemented by 4104 may be shifted with respect to the timing of the data path implemented by the regular expression engine 4150. One reason for the shift is that the data path for the capture engine 4104 is somewhat more complex than that of the regular expression engine 4150.

In the example of FIG. 43, there may be multiple captures in an input string where each is represented by a group ID. The CRR Decoder 4306 is capable reading capture commands from the CRR memory 4102 and determining if a new capture group was found and sets the start and end positions in the offset entry depending on the particular capture command received. The NRR decoder 1106 indicates whether a previously started capture group was continued or died.

As discussed, implementing capture requires a priority mechanism along with the epsilon operating mode that supports spontaneous transition in the epsilon sub-table. This priority mechanism introduces additional controls in the data paths (e.g., switching circuitry 4204 and 4304). Control signals (eps_active) are added for processing epsilon states, which are stored as a set of epsilon next states in chain fashion as discussed in connection with FIG. 22. The epsilon operating mode may be implemented in hardware by continuously performing lookup from the NRR 1102 and from the CRR memory 4102 without consuming an input character. In the epsilon operating mode, both data paths skip the priority FIFO memories 2800 since no new states from the priority FIFO memories 2800 are processed until all of the epsilon states are looked up.

The switching circuitry 4202 and 4302 is introduced to account for lazy vs. greedy qualifiers in the regular expression being implemented. The lazy_flag_0 and lazy_flag_1 within the regular expression engine 4150 and the capture engine 4104 control whether the previous state info (and corresponding offset entry) is written into the priority FIFO memories 2800 first (e.g., greedy) or the new state is written to the priority FIFO memories 2800 first (e.g., lazy). Logic to generate the lazy_flag control signals was previously described to implement path priority. The control signals provided to switching circuitry 1120 and 4320 may be the same with the exception that the control signals provided to switching circuitry 4320 may be delayed by one clock cycle relative to the control signals provided to switching circuitry 1120.

Figure 44:
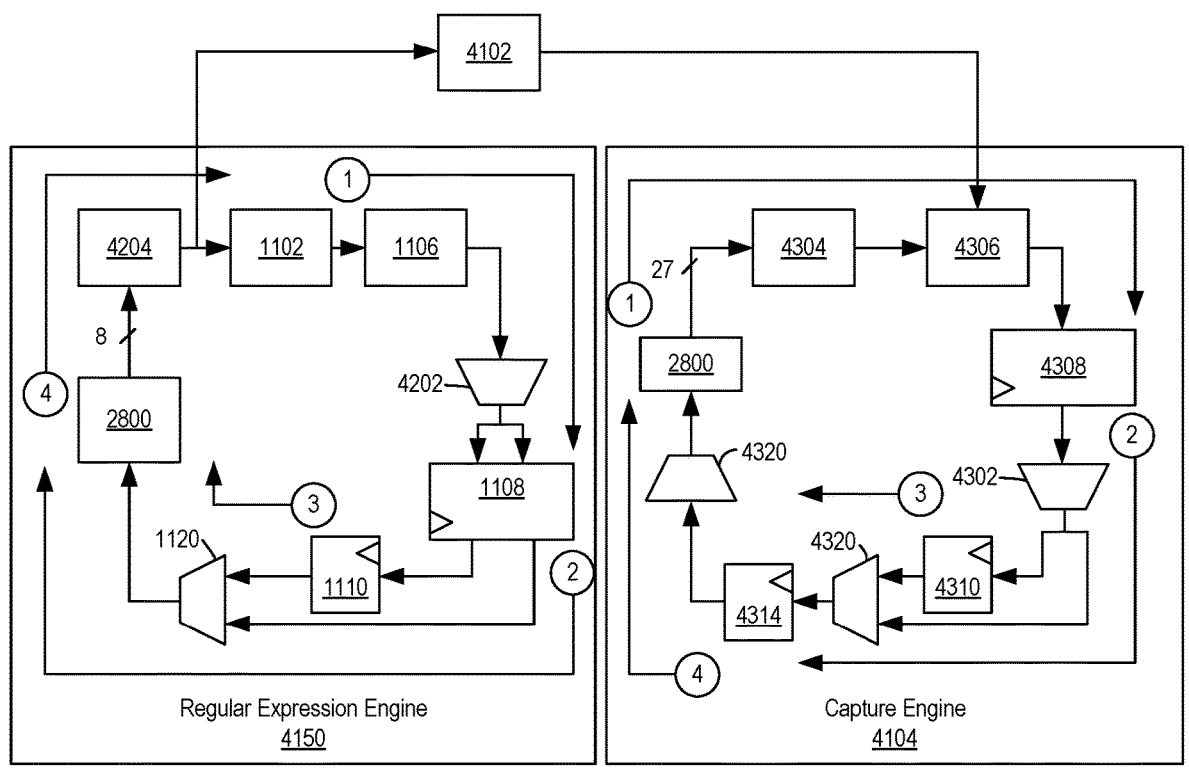
FIG. 44 illustrates independent and synchronous data paths of the regular expression processing system of FIG. 41 for performing match and capture.

FIG. 44 illustrates the independent and synchronous data paths for performing match and capture. In the example of FIG. 44, structural details of regular expression engine 4150 and capture engine 4104 have been removed to better illustrate certain timing features.

The two independent data paths for match and capture facilitate optimization in the hardware implementation that results in improved performance and throughput. The regular expression engine 4150 generally uses data paths that are narrower than those of the capture engine 4104. For example, the data path of regular expression engine 4150 may be 8 bits, while the data path of the capture engine 4104 may be 27 bits to store position data.

The example of FIG. 44 illustrates that the pipeline stages are coordinated between the two data paths allowing a continuous stream of input data so that the regular expression engine 4150 may serve as the master control. Both data paths are generally split into 4 different stages as previously described. The stages are generally illustrated in the example of FIG. 44.

In stage 4, the priority FIFO memories of the regular expression engine 4150 are read to obtain the address to be used (at least in part) for the NRR memory 1102 and for the CRR memory 4102. In stage 1, both of the NRR memory 1102 and the CRR memory 4102 output data after a latency of 1 clock cycle. The capture engine 4104 reads its priority FIFO memories 2800 to obtain position information of the active states that were read out of the regular expression engine 4150 priority FIFO memories 2800 in the previous clock cycle. The CRR decoder 4306 receives the instructions from the CRR memory 4102 and the offset entries to be modified in the same clock cycle.

Stages 2 and 3 correspond to the priority FIFO memory 2800 write preparation. In stage 2 and 3, in the regular expression engine 4150, the control signals to select which active states are written to the respective priority FIFO memories 2800 in the two available clock cycles. The capture engine 4104 takes 3 clock cycles (e.g., corresponding to registers 4310, 4314 and the register in the priority FIFO memories 2800) to write to the priority FIFO memories therein. Since the contents are not needed until stage 1, this is permissible. That is, since the state ids provided to the CRR memory 4102 are provided from the priority FIFO memories of the regular expression engine 4150 and not from the priority FIFO memories of the capture engine 4104, an extra clock cycle is available to process the data. There is an additional pipeline stage that can be inserted. As shown, the register 4314 is moved between the multiplexers 4320. This facilitates partitioning of the capture engine 4104 to meet timing in view of the larger amount of circuitry required to support the larger bit widths of the signals.

In accordance with the inventive arrangements described herein, the output generated by the priority FIFO memories 2800 of the regular expression engine 4150 may be monitored by the controller 1130. The controller 1130, in response to detecting an end condition, may store any matched states and corresponding position information as output from the CRR decoder 4306. For example, in the case where the end of string character is seen in the input data 1118, the controller 1130 is capable of pulling the unfinished active states off of the priority FIFO memories 2800 of the regular expression engine 4150 until a final state (e.g., SF1) is seen. If no final state is seen, a valid capture output is not found and no capture output is generated. If a final state is seen, the corresponding offset entry from capture FIFO memories is output and may be stored in another memory.

If the controller 1130 determines that the highest priority path finishes (e.g., a match state reaches the top of the priority FIFO memories 2800 of the regular expression engine 4150) prior to reaching the end of string character in the input data 118, the controller 1130 determines that the matched state is the result along with the corresponding offset entry from the capture FIFO memories in capture engine 4104.

Figure 45:
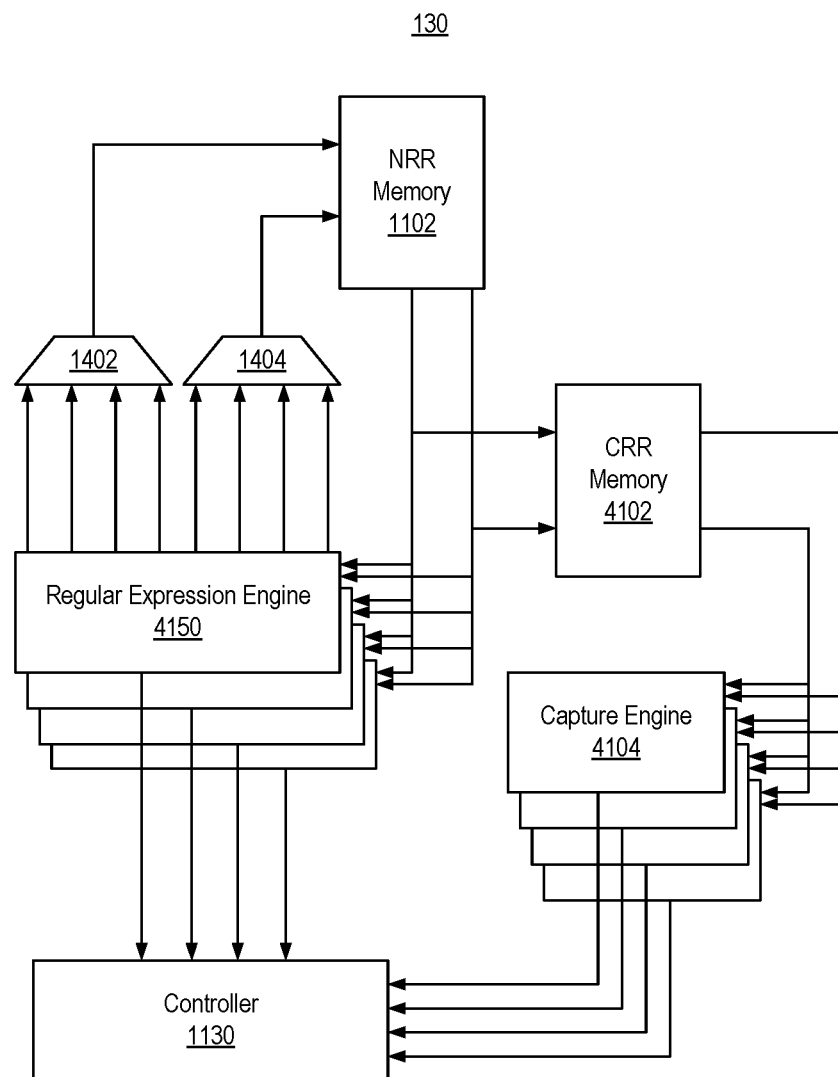
FIG. 45 illustrates another example implementation of a regular expression processing system configured to perform match using priority and capture.

FIG. 45 illustrates another example implementation of a regular expression processing system 130 configured to perform match using priority and capture. FIG. 45 may operate substantially similar to the example of FIG. 14, albeit using regular expression engines 4150 and capture engines 4104. Each regular expression engine 4150 is capable of initiating two simultaneous lookups from NRR memory 1102 each clock cycle. Similarly, each capture engine 4104 is capable of receiving a pair (e.g., 2) of instructions from CRR memory 4102 each clock cycle.

FIG. 46 is an example method 4600 of implementing a regular expression processing system 130 that is capable of performing capture. In the example of FIG. 46, blocks 4602 and 4604 may be performed by a data processing system such as data processing system 1500 of FIG. 15. In block 4602, the system is capable of generating an HFA graph 118 for a regular expression. The system is capable of annotating the HFA graph 118 with capture commands that, upon execution by hardware, update position information maintained for characters in a data stream that are matched to a capture sub-expression of the regular expression. In block 4604, the system is capable of generating, from the HFA graph 118, an instruction table 2200 including state transition instructions and a capture table (e.g., Example 13) including the capture commands.

Referring to FIG. 46, a regular expression engine circuit is configured, using the state transition table, to determine, from the data stream, one or more characters that match the capture sub-expression. A capture engine is configured, using the capture table, to determine position information for the one or more characters in the data stream. For example, blocks 4606 and 4608 may be performed using the regular expression processing system 130 described herein as adapted for performing capture (e.g., FIGS. 41, 45). In block 4606, using a regular expression engine (e.g., regular expression engine 4150), one or more characters that match the capture sub-expression can be determined. The regular expression engine 4150 is capable of tracking active states of the regular expression by decoding state transition instructions of the instruction table 2200. In block 4608, a capture engine 4104 is capable of determining position information for the one or more characters in the data stream by decoding the capture commands from the capture table in coordination with the active states tracked by the regular expression engine 4150.

The foregoing and other implementations can each optionally include one or more of the following features, alone or in combination. Some example implementations include all the following features in combination.

In one aspect, each node of the HFA graph 118, for any particular character, has at most one self-edge and at most one outbound edge, wherein the capture commands are applied to the HFA graph 118.

In another aspect, the generating the HFA graph 118 includes generating an NFA graph 114 from the regular expression by combining fragments. One or more of the fragments are annotated with the capture commands. The capture commands may be propagated from edges of the fragments to states of the fragments during the combining. The NFA graph 114 can be transformed into the HFA graph 118.

In another aspect, the capture table includes a plurality of capture entries. Each capture entry includes an address portion including an active state identifier used as an address and an instruction portion including one of the capture commands and a group identifier for the capture sub-expression to which the capture command applies.

In another aspect, the method can include, using the capture engine 4104, processing offset entries corresponding to the active states at least in part, by determining capture entries corresponding the offset entries and, for selected ones of the offset entries, modifying at least one of a start position or an end position based on the capture commands of the corresponding capture entries and matching group identifiers of the offset entries to the group identifiers of the instruction portions of the respective capture entries.

Figure 47:
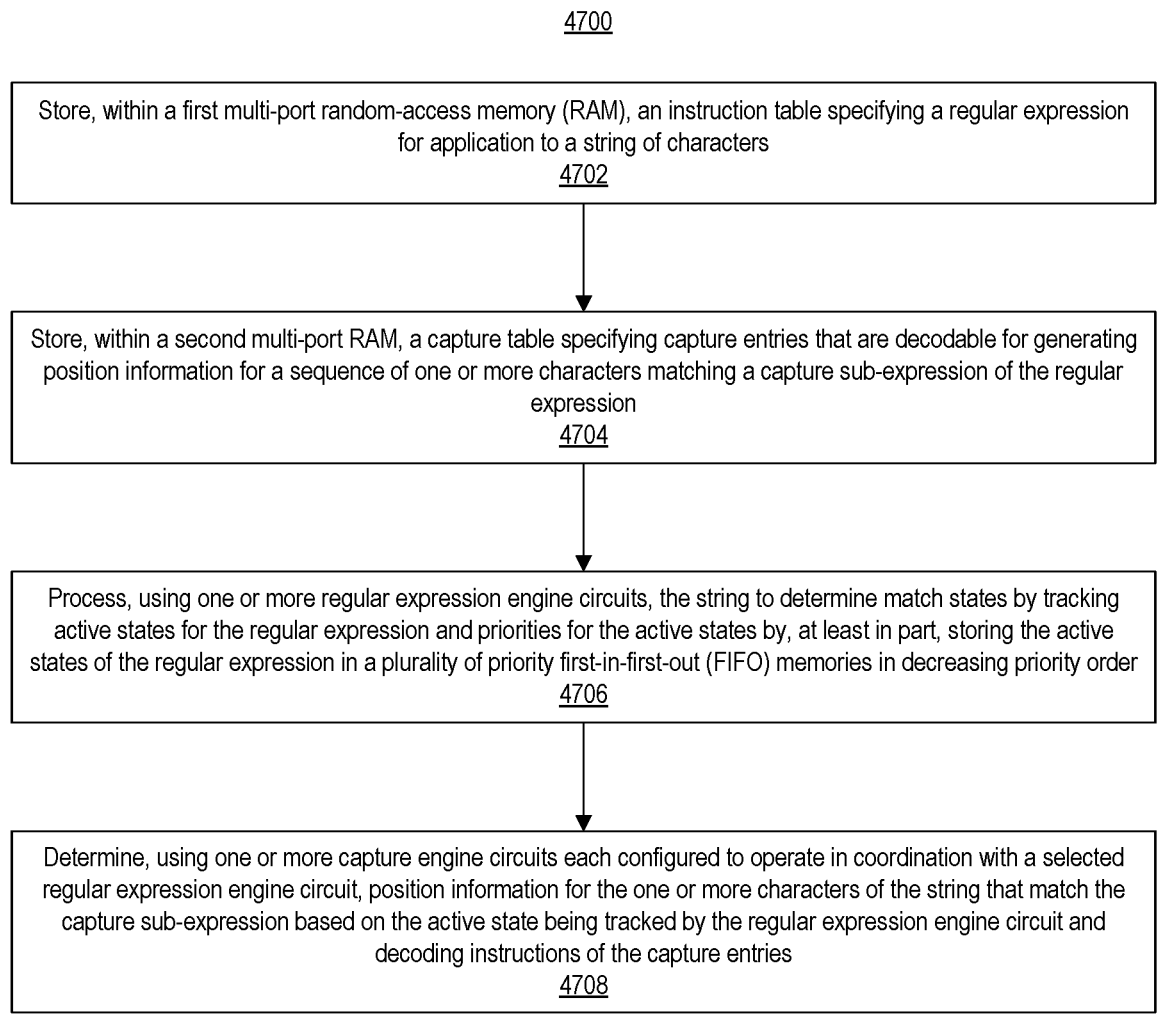
FIG. 47 is another example method of implementing a regular expression processing system capable of performing capture.

FIG. 47 is an example method 4700 of implementing a regular expression processing system 130 that is capable of performing capture. Method 4700 may be performed by such a system.

In block 4702, the system is capable of storing, within a first multi-port RAM (e.g., NRR memory 1102), an instruction table 2200 specifying a regular expression for application to a string of characters. In block 4704, the system is capable of storing, within a second multi-port RAM (e.g., CRR memory 4102), a capture table (e.g., Example 13) specifying capture entries that are decodable for generating position information for a sequence of one or more characters of the string of characters matching a capture sub-expression of the regular expression. In block 4706, the system is capable of processing, using one or more regular expression engines 4150, the string to determine match states by tracking active states for the regular expression and priorities for the active states by, at least in part, storing the active states of the regular expression in a plurality of priority FIFO memories 2800 in decreasing priority order. In block 4708, the system is capable of determining, using one or more capture engine 4104 each configured to operate in coordination with a selected regular expression engine 4150, position information for the one or more characters of the string that match the capture sub-expression based on the active state being tracked by the regular expression engine 4150 and decoding instructions of the capture entries.

The foregoing and other implementations can each optionally include one or more of the following features, alone or in combination. Some example implementations include all the following features in combination.

In one aspect, the method includes outputting the one or more characters of the string that match the capture sub-expression by parsing the string using the position information.

In another aspect, determining the position information further includes processing offset entries corresponding to the active states, wherein each offset entry specifies a start position, an end position, and a group identifier for the one or more characters.

In another aspect, the method includes updating at least one of the start position or the end position of selected offset entries based on decoding the instructions from the capture entries.

In one or more example implementations, a system includes a first multi-port RAM (e.g., NRR memory 1102) configured to store an instruction table 2200. The instruction table 2200 specifies a regular expression for application to a data stream. The system includes a second multi-port RAM (e.g., CRR memory 4102) configured to store a capture table (e.g., Example 13), wherein the capture table specifies capture entries that are decodable for tracking position information for a sequence of one or more characters of the data stream matching a capture sub-expression of the regular expression. The system includes one or more regular expression engines 4150 each configured to process the data stream to determine match states by tracking active states for the regular expression and priorities for the active states by, at least in part, storing the active states of the regular expression in a plurality of priority FIFO memories 2800 in decreasing priority order. The system includes one or more capture engine circuits 4104 each configured to operate in coordination with a selected regular expression engine 4150 to determine one or more characters of the data stream that match the capture sub-expression based on the active state being tracked by the regular expression engine 4150 and decoding the capture entries of the capture table.

The foregoing and other implementations can each optionally include one or more of the following features, alone or in combination. Some example implementations include all the following features in combination.

In one aspect, each capture engine 4104 includes a plurality of capture FIFO memories (e.g., priority FIFO memories) configured to store offset entries corresponding to the active states stored in the plurality of priority FIFO memories 2800 of the regular expression engine 4150. Each offset entry specifies position information for at least a portion of the sequence of characters of the data stream matching the capture sub-expression.

In another aspect, each offset entry includes a start position, an end position, and a capture identifier.

In another aspect, each capture entry includes an instruction having a capture command and a group identifier. Each capture engine 4104 includes a decoder circuit (e.g., CRR decoder 4306) configured to update selected offset entries based on decoding the instructions from the capture entries.

In another aspect, the decoder circuit (e.g., CRR decoder 4306) is configured to perform at least one of updating the start position or the end position of the selected offset entries based on the capture commands decoded from the instructions.

In another aspect, the system includes a plurality of multiplexers (e.g., switching circuitry 4304) that route offset entries as output from the plurality of capture FIFO memories to the decoder circuit for processing or route offset entries as output from the decoder circuit directly back to the decoder circuit for processing. The plurality of multiplexers perform the routing based on a control signal provided from a respective regular expression engine 4150.

In another aspect, the control signal indicates that a selected active state processed by the regular expression engine 4150 corresponds to an epsilon state of the instruction table 2200.

In another aspect, the respective regular expression engine 4150 only processes a new character from the data stream while the decoder of the capture engine 4104 circuit receives offset entries from the plurality of capture FIFO memories.

In another aspect, each capture engine 4104 includes switching circuitry 4302 configured to selectively route the offset entries from the decoder circuit to the plurality of capture FIFO memories based, at least in part, on control signals specifying a prioritization of corresponding active states processed by respective regular expression engine circuits self-edges or outbound edges.

In another aspect, the prioritization is determined based on whether each active state corresponds to a self-edge or an outbound edge.

In another aspect, the switching circuitry 4320 is configured to selectively route the offset entries from the decoder circuit to the plurality of capture FIFO memories based, at least in part, on a load balancing technique.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A system, comprising:
   a first multi-port random-access memory (RAM) configured to store an instruction table, wherein the instruction table specifies a regular expression for application to a data stream;
   a second multi-port RAM configured to store a capture table, wherein the capture table specifies capture entries that are decodable for tracking position information for a sequence of one or more characters of the data stream matching a capture sub-expression of the regular expression;
   one or more regular expression engine circuits each configured to process the data stream to determine match states by tracking active states for the regular expression and priorities for the active states by, at least in part, storing the active states of the regular expression in a plurality of priority first-in-first-out (FIFO) memories in decreasing priority order; and one or more capture engine circuits each configured to operate in coordination with a selected regular expression engine circuit to determine one or more characters of the data stream that match the capture sub-expression based on the active state being tracked by the regular expression engine circuit and decoding the capture entries of the capture table.

2. The system of claim 1, wherein each capture engine circuit includes a plurality of capture FIFO memories configured to store offset entries corresponding to the active states stored in the plurality of priority FIFO memories; and
wherein each offset entry specifies position information for at least a portion of the sequence of characters of the data stream matching the capture sub-expression.

3. The system of claim 2, wherein each offset entry includes a start position, an end position, and a capture identifier.

4. The system of claim 3, wherein each capture entry includes an instruction having a capture command and a group identifier, and wherein each capture engine circuit includes a decoder circuit configured to update selected offset entries based on decoding the instructions from the capture entries.

5. The system of claim 4, wherein the decoder circuit is configured to perform at least one of updating the start position or the end position of the selected offset entries based on the capture commands decoded from the instructions.

6. The system of claim 4, further comprising:
a plurality of multiplexers that route offset entries as output from the plurality of capture FIFO memories to the decoder circuit for processing or route offset entries as output from the decoder circuit directly back to the decoder circuit for processing, wherein the plurality of multiplexers perform the routing based on a control signal provided from a respective regular expression engine circuit.

7. The system of claim 6, wherein the control signal indicates that a selected active state processed by the regular expression engine circuit corresponds to an epsilon state of the instruction table.

8. The system of claim 6, wherein:
the respective regular expression engine circuit only processes a new character from the data stream while the decoder of the capture engine circuit receives offset entries from the plurality of capture FIFO memories.

9. The system of claim 2, wherein each capture engine circuit includes switching circuitry configured to selectively route the offset entries from a decoder circuit to the plurality of capture FIFO memories based, at least in part, on control signals specifying a prioritization of corresponding active states processed by respective regular expression engine circuits self-edges or outbound edges.

10. The system of claim 9, wherein the prioritization is determined based on whether each active state corresponds to a self-edge or an outbound edge.

11. The system of claim 9, wherein the switching circuitry is configured to selectively route the offset entries from the decoder circuit to the plurality of capture FIFO memories based, at least in part, on a load balancing technique.

12. A method, comprising:
generating a hardware finite state automata (HFA) graph for a regular expression;
wherein the HFA graph is annotated with capture commands that, upon execution by hardware, update position information maintained for characters in a data stream that are matched to a capture sub-expression of the regular expression;
generating, from the HFA graph, an instruction table including state transition instructions and a capture table including the capture commands;
wherein a regular expression engine circuit is configured, using the instruction table, to determine, from the data stream, one or more characters that match the capture sub-expression; and
wherein a capture engine circuit is configured, using the capture table, to determine position information for the one or more characters in the data stream.

13. The method of claim 12, wherein each node of the HFA graph, for any particular character, has at most one self-edge and at most one outbound edge, wherein the capture commands are applied to the HFA graph.

14. The method of claim 12, wherein the generating the HFA graph comprises:
generating a non-deterministic finite state automata (NFA) graph from the regular expression by combining fragments, wherein one or more of the fragments are annotated with the capture commands;
propagating capture commands from edges of the fragments to states of the fragments during the combining; and
transforming the NFA graph into the HFA graph.

15. The method of claim 12, wherein the capture table includes a plurality of capture entries, each capture entry including an address portion including an active state identifier used as an address and an instruction portion including one of the capture commands and a group identifier for the capture sub-expression to which the capture command applies.

16. The method of claim 15, further comprising:
using the capture engine circuit, processing offset entries corresponding to active states tracked by the regular expression engine circuit at least in part, by determining capture entries corresponding the offset entries and, for selected ones of the offset entries, modifying at least one of a start position or an end position based on the capture commands of the corresponding capture entries and matching group identifiers of the offset entries to the group identifiers of the instruction portions of the respective capture entries.

17. A method, comprising:
storing, within a first multi-port random-access memory (RAM), an instruction table specifying a regular expression for application to a string of characters;
storing, within a second multi-port RAM, a capture table specifying capture entries that are decodable for generating position information for a sequence of one or more characters matching a capture sub-expression of the regular expression;
processing, using one or more regular expression engine circuits, the string to determine match states by tracking active states for the regular expression and priorities for the active states by, at least in part, storing the active states of the regular expression in a plurality of priority first-in-first-out (FIFO) memories in decreasing priority order; and
determining, using one or more capture engine circuits each configured to operate in coordination with a selected regular expression engine circuit, position information for the one or more characters of the string that match the capture sub-expression based on the active state being tracked by the regular expression engine circuit and decoding instructions of the capture entries.

18. The method of claim 17, further comprising:

outputting the one or more characters of the string that match the capture sub-expression by parsing the string using the position information.

19. The method of claim 17, wherein the determining the position information further comprises:

processing offset entries corresponding to the active states, wherein each offset entry specifies a start position, an end position, and a group identifier for the one or more characters.

20. The method of claim 19, further comprising:

updating at least one of the start position or the end position of selected offset entries based on decoding the instructions from the capture entries.

* * * * *